US011080485B2

(12) United States Patent
Toplyn

(10) Patent No.: US 11,080,485 B2
(45) Date of Patent: Aug. 3, 2021

(54) SYSTEMS AND METHODS FOR GENERATING AND RECOGNIZING JOKES

(71) Applicant: Twenty Lane Media, LLC, Rye, NY (US)

(72) Inventor: Joseph E. Toplyn, Harrison, NY (US)

(73) Assignee: Twenty Lane Media, LLC, Rye, NY (US)

( * ) Notice: Subject to any disclaimer, the term of this patent is extended or adjusted under 35 U.S.C. 154(b) by 0 days.

(21) Appl. No.: 17/247,482

(22) Filed: Dec. 13, 2020

(65) Prior Publication Data
US 2021/0103700 A1    Apr. 8, 2021

Related U.S. Application Data

(63) Continuation-in-part of application No. 16/831,526, filed on Mar. 26, 2020, now Pat. No. 10,878,817.
(Continued)

(51) Int. Cl.
G10L 15/22    (2006.01)
G06F 40/289    (2020.01)
(Continued)

(52) U.S. Cl.
CPC ........... G06F 40/289 (2020.01); G06F 40/10 (2020.01); G06F 40/211 (2020.01); G06F 40/253 (2020.01); G06N 20/00 (2019.01)

(58) Field of Classification Search
CPC ....................................................... G10L 15/22
See application file for complete search history.

(56) References Cited

U.S. PATENT DOCUMENTS 5,708,822 A    1/1998 Wical
6,144,938 A *  11/2000 Surace ................. G10L 13/033
                                                    704/257
(Continued)

FOREIGN PATENT DOCUMENTS

WO    2018045081 A1    3/2018

OTHER PUBLICATIONS

Augello, Agnese, et al. "Humorist bot: Bringing computational humour in a chat-bot system." 2008 International Conference on Complex, Intelligent and Software Intensive Systems. IEEE, 2008. (Year: 2008).*
(Continued)

Primary Examiner — Douglas Godbold
(74) Attorney, Agent, or Firm — Law Office of Paul B. Johnson; Paul B. Johnson

(57) ABSTRACT

Joke recognition methods include using server(s) coupled with data store(s) to communicatively couple with a first computing device through a telecommunications network. A first communication is provided to a user through a user interface of the first computing device or is received through the user interface. A second communication is provided to the user through the user interface or is received through the user interface. In response to providing or receiving the second communication, the server(s) determine whether the second communication, relative to the first communication, includes a joke and/or a punchline. Upon determining that the second communication includes a joke and/or a punchline, the server(s) initiate sending one or more responses to the first computing device. The response(s) initiate providing, through the user interface, an indication to the user that the second communication is recognized as a joke/punchline. Systems for joke recognition provide the disclosed joke recognition methods.

20 Claims, 20 Drawing Sheets

Related U.S. Application Data which is a continuation-in-part of application No. 16/250,972, filed on Jan. 17, 2019, now Pat. No. 10,642,939.

(60) Provisional application No. 62/634,845, filed on Feb. 24, 2018.

(51) Int. Cl.
*G06F 40/10* (2020.01)
*G06N 20/00* (2019.01)
*G06F 40/211* (2020.01)
*G06F 40/253* (2020.01)

(56) References Cited

U.S. PATENT DOCUMENTS

| | | | | |
|---|---|---|---|---|
| 6,385,584 | B1* | 5/2002 | McAllister | G10L 15/22 |
| | | | | 379/10.01 |
| 6,510,411 | B1* | 1/2003 | Norton | H04M 3/4936 |
| | | | | 379/76 |
| 7,376,551 | B2 | 5/2008 | Powell et al. | |
| 7,487,081 | B2 | 2/2009 | Shimomura et al. | |
| 7,912,720 | B1* | 3/2011 | Hakkani-Tur | G06F 40/253 |
| | | | | 704/270 |
| 8,150,020 | B1* | 4/2012 | Blanchard | H04M 3/5175 |
| | | | | 379/265.03 |
| 9,015,033 | B2 | 4/2015 | De Andrade Barbosa et al. | |
| 10,642,939 | B2 | 5/2020 | Toplyn | |
| 10,904,611 | B2* | 1/2021 | Van Os | H04N 21/4882 |
| 2002/0059072 | A1* | 5/2002 | Quibria | G10L 15/22 |
| | | | | 704/270 |
| 2002/0097848 | A1* | 7/2002 | Wesemann | H04M 3/4936 |
| | | | | 379/88.18 |
| 2003/0115066 | A1* | 6/2003 | Seeley | H04M 3/24 |
| | | | | 704/270.1 |
| 2003/0185359 | A1* | 10/2003 | Moore | H04M 3/46 |
| | | | | 379/114.01 |
| 2004/0015344 | A1 | 1/2004 | Shimomura et al. | |
| 2004/0088327 | A1 | 5/2004 | Shimomura et al. | |
| 2005/0043953 | A1* | 2/2005 | Winterkamp | G10L 15/22 |
| | | | | 704/275 |
| 2005/0075878 | A1* | 4/2005 | Balchandran | G10L 15/1822 |
| | | | | 704/257 |
| 2006/0018440 | A1* | 1/2006 | Watkins | H04M 3/4936 |
| | | | | 379/88.01 |
| 2006/0025996 | A1* | 2/2006 | Ju | G10L 15/22 |
| | | | | 704/255 |
| 2006/0067352 | A1 | 3/2006 | John et al. | |
| 2006/0069728 | A1* | 3/2006 | McEvilly | G06F 40/166 |
| | | | | 709/206 |
| 2006/0200734 | A1 | 9/2006 | Goradia | |
| 2008/0033724 | A1* | 2/2008 | Block | G10L 15/22 |
| | | | | 704/257 |
| 2008/0205601 | A1* | 8/2008 | Lavoie | H04M 3/4938 |
| | | | | 379/88.01 |
| 2010/0138377 | A1* | 6/2010 | Wright | G06F 40/284 |
| | | | | 706/52 |
| 2010/0241963 | A1* | 9/2010 | Kulis | G06F 16/685 |
| | | | | 715/727 |
| 2012/0117101 | A1 | 5/2012 | Unruh | |
| 2012/0316865 | A1 | 12/2012 | Miyazaki et al. | |
| 2014/0288932 | A1* | 9/2014 | Yeracaris | G10L 15/30 |
| | | | | 704/249 |
| 2015/0348551 | A1* | 12/2015 | Gruber | G06F 40/205 |
| | | | | 704/235 |
| 2015/0382047 | A1* | 12/2015 | Van Os | H04N 21/84 |
| | | | | 725/38 |
| 2016/0077794 | A1* | 3/2016 | Kim | G06F 3/167 |
| | | | | 704/275 |
| 2016/0239762 | A1* | 8/2016 | McCord | H04M 3/5232 |
| 2017/0060849 | A1 | 3/2017 | Allen et al. | |
| 2017/0109345 | A1* | 4/2017 | Bauer | G06F 3/04847 |
| 2017/0169325 | A1* | 6/2017 | McCord | H04M 3/5233 |
| 2017/0214779 | A1* | 7/2017 | Moran | G10L 15/26 |
| 2017/0310613 | A1* | 10/2017 | Lalji | H04L 67/20 |
| 2017/0337261 | A1* | 11/2017 | Wang | G06F 40/30 |
| 2017/0371859 | A1 | 12/2017 | Allen et al. | |
| 2018/0226067 | A1 | 8/2018 | Dhoolia et al. | |
| 2018/0255180 | A1* | 9/2018 | Goldberg | G06F 40/279 |
| 2019/0193273 | A1 | 6/2019 | Favis et al. | |
| 2019/0266250 | A1 | 8/2019 | Toplyn | |
| 2019/0355240 | A1* | 11/2019 | Razak | G06F 40/35 |
| 2020/0042596 | A1 | 2/2020 | Ravi et al. | |
| 2020/0183928 | A1* | 6/2020 | Wu | H04L 67/16 |
| 2020/0227032 | A1 | 7/2020 | Toplyn | |
| 2020/0244700 | A1* | 7/2020 | Moon | G06F 21/44 |
| 2020/0273089 | A1* | 8/2020 | Siefken | G06Q 50/12 |
| 2020/0364702 | A1* | 11/2020 | Peng | G06F 16/383 |
| 2020/0380953 | A1* | 12/2020 | Maruta | G01C 21/36 |

OTHER PUBLICATIONS

Excerpts from Joe Toplyn, "Comedy Writing for Late-Night TV: How to Write Monologue Jokes, Desk Pieces, Sketches, Parodies, Audience Pieces, Remotes, and Other Short-Form Comedy," published 2014 by Twenty Lane Media, LLC of Rye, NY.

Standup: System to Augment Non-Speakers' Dialogue Using Puns, published online at https://www.abdn.ac.uk/ncs/departments/computing-science/standup-315.php at least as early as Feb. 23, 2018, available online at https://www.abdn.ac.uk/ncs/departments/computing-science/standup-315.php, last visited Dec. 26, 2018.

Computational Humor Wikipedia page, published online at https://en.wikipedia.org/wiki/Computational_humor at east as early as Feb. 23, 2018, available online at https://en.wikipedia.org/wiki/Computational_humor, last visited Dec. 26, 2018.

JAPE Summary, published online at http://www.nlg-wiki.org/systems/JAPE at least as early as Feb. 23, 2018, available online at http://www.nlg-wiki.org/systems/JAPE, last visited Dec. 26, 2018.

HAHAcronym: Humorous Agents for Humorous Acronyms, published online at https://www.researchgate.net/publication/249929592_HAHAcronym_Humorous_Agents_for_Humorous_Acronyms at least as early as Feb. 23, 2018, available online at https://www.researchgate.net/publication/249929592_HAHAcronym_Humorous_Agents_for_Humorous_Acronyms, last visited Dec. 26, 2018.

Chloe Kiddon and Yuriy Brun, "That's What She Said: Double Entendre Identification," Proceedings of the 49th Annual Meeting of the Association for Computational Linguistics: shortpapers, pp. 89-94, Portland, Oregon, Jun. 19-24, 2011, published online at https://people.cs.umass.edu/~brun/pubs/pubs/Kiddon11.pdf at least as early as Feb. 23, 2018, available online at https://people.cs.umass.edu/~brun/pubs/pubs/Kiddon11.pdf, last visited Dec. 26, 2018.

Becky Ferreira, "Joke Telling Robots Are the Final Frontier of Artificial Intelligence," published online Mar. 15, 2016 at https://motherboard.vice.com/en_us/article/z43nke/joke-telling-robots-are-the-final-frontier-of-artificial-intelligence, available online at https://motherboard.vice.com/en_us/article/z43nke/joke-telling-robots-are-the-final-frontier-of-artificial-intelligence, last visited Jan. 11, 2019.

Alexander Martin, "IBM's Watson to Help Pepper Robot Learn Faster," published online Jan. 7, 2016 at https://blogs.wsj.com/japanrealtime/2016/01/07/ibms-watson-to-help-pepper-robot-learn-faster/, available online at https://blogs.wsj.com/japanrealtime/2016/01/07/ibms-watson-to-help-pepper-robot-learn-faster/, last visited Jan. 11, 2019.

International Search Report and Written Opinion of the International Searching Authority for PCT/US19/19326, which is a PCT application of a parent of the instant application, dated May 2, 2019.

Rada Mihalcea and Carlo Strapparava, "Making Computers Laugh: Investigations in Automatic Humor Recognition," published Oct. 2005, available online at https://digital.library.unt.edu/ark:/67531/metadc30968/m2/1/high_res_d/Mihalcea-2005-Making_Computers_Laugh-Investigations_in_Automatic.pdf, last visited Nov. 26, 2020.

Rada Mihalcea and Carlo Strapparava, "Learning to Laugh (Automatically): Computational Models for Humor Recognition," published in 2006 in Computational Intelligence vol. 22 No. 2, available online at http://citeseerx.ist.psu.edu/viewdoc/download;jsessionid=

(56) References Cited

OTHER PUBLICATIONS

3380E2BFFCC918965C5AE1C5B50FF2ED?doi=10.1.1.726.6439&rep=rep1&type=pdf, last visited Nov. 26, 2020.
Lydia Xu and Vera Xu, "Project Report: Sarcasm Detection," published in 2019, available online at http://web.stanford.edu/class/cs224n/reports/custom/15791781.pdf, last visited Nov. 26, 2020.
Diyi Yang, Alon Lavie, Chris Dyer, Eduard Hovy, "Humor Recognition and Humor Anchor Extraction," Proceedings of the 2015 Conference on Empirical Methods in Natural Language Processing, p. 2367-2376, Lisbon, Portugal, Sep. 17-21, 2015, available online at https://www.cs.cmu.edu/~alavie/papers/D15-1284.pdf, last visited Nov. 26, 2020.
Tomas Ptacek, Ivan Habernal and Jun Hong, "Sarcasm Detection on Czech and English Twitter," Proceedings of COLING 2014, the 25th International Conference on Computational Linguistics: Technical Papers, p. 213-223, Dublin, Ireland, Aug. 23-29, 2014, available online at https://www.aclweb.org/anthology/C14-1022.pdf, last visited Nov. 26, 2020.
Antonio Reyes, Paolo Rosso, Tony Veale, "A multidimensional approach for detecting irony in Twitter," Lang Resources & Evaluation (2013) 47:239-268, published 2013, available online at http://citeseerx.ist.psu.edu/viewdoc/download;jsessionid=149C43D7492224083D466A6E9036BEB9?doi=10.1.1.385.4-408&rep=rep1&type=pdf, last visited Nov. 26, 2020.
Julia M. Taylor and Lawrence J. Mazlack, "Computationally Recognizing Wordplay in Jokes," Proceedings of the Anual Meeting of the Cognitive Science Society, 26(26), published 2004, available online at https://escholarship.org/content/qt0v54b9jk/qt0v54b9jk.pdf?t=op32ia, last visited Nov. 26, 2020.

* cited by examiner

SYSTEMS AND METHODS FOR GENERATING AND RECOGNIZING JOKES

CROSS REFERENCE TO RELATED APPLICATIONS

This document is a continuation-in-part of U.S. Nonprovisional patent application Ser. No. 16/831,526, entitled "Systems and Methods for Generating Comedy," naming as first inventor Joseph E. Toplyn, which was filed on Mar. 26, 2020, which in turn is a continuation-in-part of U.S. Nonprovisional patent application Ser. No. 16/250,972, entitled "Systems and Methods for Generating Jokes," naming as first inventor Joseph E. Toplyn, which was filed on Jan. 17, 2019, which in turn claims the benefit of the filing date of U.S. Provisional Patent Application No. 62/634,845, entitled "System and Method for Generating Jokes," naming as first inventor Joseph E. Toplyn, which was filed on Feb. 24, 2018, the disclosures of each of which are hereby incorporated entirely herein by reference.

BACKGROUND

1. Technical Field

Methods and systems disclosed herein relate generally to methods and systems for generating and recognizing jokes and, more particularly, to methods and systems for generating original, contextually integrated jokes based on text that has been obtained from an external source.

2. Background Art

Non-computerized methods of creating monologue jokes having three components, i.e., topic, angle or bridge words, and punchline, exist in the art as discussed in, for example, Joe Toplyn, "Comedy Writing for Late-Night TV," published by Twenty Lane Media, LLC (2014) (for example pages 53-57, 68-79, 85-87, and 98-111 of that publication discuss these elements).

Computational humor is a relatively new branch of computational linguistics and artificial intelligence (AI). One computational humor challenge that researchers have attempted to address is using a computer to generate jokes in a more humanlike, engaging, and effective fashion.

For example, the JAPE (Joke Analysis and Production Engine) program generates punning riddles. STANDUP (System To Augment Non-speakers' Dialogue Using Puns) was developed as an extension to JAPE. The HAHA (Humorous Agents for Humorous Acronyms) acronym generator creates witty acronyms. The DEVIANT (Double Entendre via Noun Transfer) program finds sentences that can be turned into jokes by adding the sentence "That's what she said." But those joke generation programs are limited to certain joke formulas and formats.

The developers of AI virtual assistants like AMAZON's ALEXA, APPLE's SIRI, MICROSOFT's CORTANA, and GOOGLE ASSISTANT sidestep the challenge of generating original jokes. Instead of ad-libbing newly created, contextually integrated jokes during their interactions with humans, those AI virtual assistants merely deliver, on request, jokes prewritten by humans that have been stored in a database.

Another computational humor challenge that researchers have attempted to address is using a computer to recognize jokes. For example, in their papers "Making Computers Laugh: Investigations in Automatic Humor Recognition" and "Learning to Laugh (Automatically): Computational Models for Humor Recognition," Rada Mihalcea and Carlo Strapparava use machine learning techniques to distinguish between humorous and non-humorous texts. Lydia Xu and Vera Xu, in their paper "Project Report: Sarcasm Detection," use language models to detect sarcasm. Diyi Yang, Alon Lavie, et al., in their paper "Humor Recognition and Humor Anchor Extraction," use particular semantic structures to construct computational classifiers to recognize humor. Antonio Reyes, Paolo Rosso and Tony Veale, in their paper "A multidimensional approach for detecting irony in Twitter," construct a model to detect irony. And Julia Taylor and Lawrence Mazlack, in their paper "Computationally Recognizing Wordplay in Jokes," describe a program to recognize certain knock-knock jokes. But those joke recognition systems are limited to certain joke formulas and features.

SUMMARY

Embodiments of systems for generating and recognizing jokes may include: one or more databases; one or more servers communicatively coupled with the one or more databases; and a first computing device communicatively coupled with at least one of the one or more servers through a telecommunications network, wherein the one or more servers are configured to receive text from an external source communicatively coupled with the one or more servers through the telecommunications network and, in response, select one or more topic keywords, generate one or more punch words using words stored in the one or more databases which are related to the one or more topic keywords, use the one or more punch words to generate one or more jokes, and communicate a signal to the first computing device; and wherein the first computing device is configured to, in response to receiving the signal, display or speak one of the one or more jokes.

Embodiments of systems for generating and recognizing jokes may include one or more or all of the following:

The external source may be the first computing device.

The received text may be text typed or spoken to a virtual assistant using the first computing device.

The external source may be a third party server and not the first computing device.

The one or more servers may be further configured to select a topic sentence from the received text.

The one or more servers may be further configured to add one or more bridges to the one or more punch words to generate the one or more jokes.

The one or more servers may be further configured to determine a highest ranking joke from among the one or more jokes.

Embodiments of methods for generating and recognizing jokes may include: providing one or more servers communicatively coupled with one or more databases; in response to receiving text, at the one or more servers through a telecommunications network or at a first computing device: selecting one or more topic keywords from the received text using the one or more servers or using the first computing device; generating one or more punch words with the one or more servers using words stored in the one or more databases which are related to the one or more topic keywords; generating one or more jokes with the one or more servers using the one or more punch words; communicating a signal to the first computing device through the telecommunications network using the one or more servers; and in response to receiving the signal at the first computing device, displaying or speaking one of the one or more jokes using the first computing device.

Embodiments of methods for generating and recognizing jokes may include one or more or all of the following:

The received text may be received at the one or more servers from the first computing device through the telecommunications network.

The received text may be text typed or spoken to a virtual assistant using the first computing device.

The received text may be received at the one or more servers from a third party server and not from the first computing device.

The method may further include selecting a topic sentence from the received text using the one or more servers or the first computing device.

The method may further include adding one or more bridges to the one or more punch words, using the one or more servers, to generate the one or more jokes.

The method may further include, using the one or more servers, determining a highest ranking joke from among the one or more jokes.

Embodiments of methods for generating and recognizing jokes may include: providing one or more servers communicatively coupled with one or more databases; receiving text at the one or more servers from an external source communicatively coupled with the one or more servers through a telecommunications network; in response to receiving the text at the one or more servers: selecting a topic sentence from the received text using the one or more servers; selecting one or more topic keywords of the topic sentence using the one or more servers; generating one or more punch words with the one or more servers using words stored in the one or more databases which are related to the one or more topic keywords; adding one or more bridges to the one or more punch words, using the one or more servers, to generate one or more jokes; communicating a signal to a first computing device through the telecommunications network using the one or more servers; and in response to receiving the signal at the first computing device, displaying or speaking one of the one or more jokes using the first computing device.

Embodiments of methods for generating and recognizing jokes may include one or more or all of the following:

Generating the one or more punch words may further include selecting a group of words stored in the one or more databases which are related to the one or more topic keywords, sorting the group of words into pairs, and calculating a wordplay score for each pair.

The method may further include, using the one or more servers, determining a highest ranking joke from among the one or more jokes, and further may include, in response to receiving the signal at the first computing device, displaying or speaking the highest ranking joke using the first computing device.

The one or more topic keywords may include a first topic keyword and a second topic keyword, and the method may further include, using the one or more servers, determining whether the first topic keyword is a string consisting of two or more tokens and, if so, calculating a wordplay score for each pairing of at least one of the two or more tokens with one of a plurality of words related to the second topic keyword.

Generating the one or more punch words may further include generating a portmanteau word using at least a portion of one of the words related to the one or more topic keywords.

The one or more topic keywords may include a first topic keyword and a second topic keyword, and generating the one or more punch words may include selecting a word chunk which is related to the first topic keyword and replacing one or more words of the word chunk with one or more words that are related to the second topic keyword.

Embodiments of methods for generating and recognizing jokes may include: providing an electronic device including a processor and memory storing instructions for execution by the processor; accepting a text string from a text input or from a speech input received from a user or obtained from documents; extracting a sentence for a joke topic from a text string based on features such as whether the sentence is short enough and where the sentence falls in the text string; via the processor, analyzing the joke topic and identifying nouns, noun phrase chunks, named entities, and other words and phrases that are potentially the most useful for generating jokes; eliminating from consideration of potential use in generating jokes any of a plurality of text units in a list of stop words stored in a database and text units that are too similar to each other; determining, via the processor, which pair of words or phrases in the topic sentence is least likely to share the same context in a large, relevant text corpus and selecting those as the topic keywords to be used for generating jokes; determining, via the processor, a plurality of words related to the topic keywords in that they are semantically associated with the topic keywords in the context of a large, relevant, text corpus; scoring wordplay based on a set of scoring rules that take into account features of a pair of words including but not limited to edit distance based on pronunciation, edit distance based on spelling, number of stop consonants based on spelling, number of stop consonants based on pronunciation, alliteration, assonance, syllabification, rhyming, stemming, and lemmatization; via the processor, pairing words related to the topic keywords with each other and with the topic keywords themselves and determining which word pairs have the best wordplay so as to create punch word(s) with which to end the joke; to create a joke, adding bridge words selected from a database to the topic keywords and the punch word(s).

Embodiments of methods for generating and recognizing jokes may include one or more or all of the following:

The method may include creating punch word(s) for a second type of joke by using wordplay to pair words related to one topic keyword with a token of a second topic keyword that consists of more than one token, or by using wordplay to pair words related to one topic keyword with words related to a token of a second topic keyword that consists of more than one token.

The method may include creating punch word(s) for a third type of joke by exploiting wordplay to form a portmanteau word out of a word related to one topic keyword and a word related to a second topic keyword.

The method may include creating punch word(s) for a fourth type of joke by substituting a word related to one topic keyword for one or more words with which it has adequate wordplay that are contained in a word chunk related to a second topic keyword.

The method may include, in order to create a joke, adding to the topic and the punch word(s) bridge words that incorporate a definition, selected from a database, that pertains to one of the punch word(s).

The method may include, in order to create a joke, starting with a topic, then creating punch word(s) based on that topic, and then adding bridge words that link that topic to the punch word(s) in such a way that the topic, bridge words, and punch word(s) taken together constitute a natural-sounding unit of text.

The method may include, in order to create a joke that may strike a user as humorous, arranging the parts of the joke in this order: topic, bridge words, punch word(s).

The method may include, in order to create a joke, adding to the topic sentence and the punch word(s) bridge words that have been generated using language models that make predictions based on the topic sentence and the punch word(s).

The method may include, in order to create a joke using machine learning models, using a language model predicting forward from the topic, or a language model predicting backward from the punch word(s), or both.

The method may include, in order to create a joke that may strike a user as more humorous, training the machine learning language models used in the joke generation process on personal language data that has been obtained from sources relating to that particular user.

The method may include, in order to create a joke that may strike a user as more humorous, training the machine learning language models used in the joke generation process on a corpus of professionally written, monologue-style jokes.

The method may include ranking jokes by the probability that they would occur in the context of a corpus of user-relevant text or in the context of a corpus of professionally written jokes, with the joke of highest probability considered to be the best joke.

The method may include ranking jokes by their wordplay score and determining whether the wordplay score for a joke meets a preset threshold that indicates sufficient confidence in the funniness of the joke.

The method may include providing an output to the user, wherein the output is a joke that is original, humorous, natural-sounding, and integrated into the context of the input received by the system.

The method may include, in order to create a joke based on a topic, linking in a surprising way two topic keywords and words related to them by using reasoning informed by common knowledge and informed by the anticipated world knowledge, beliefs, and attitudes of the intended audience of the joke to be generated.

The method may include, in order to create a joke based on a topic, utilizing expert-based rules and machine learning, either individually or in combination.

Implementations of jokes generated using systems and methods disclosed herein include three elements: a topic sentence or topic words; one or more bridge words or angles; and one or more punch words or punchlines. Other implementations of jokes generated using systems and methods disclosed herein include two elements generated in response to receiving a topic sentence: one or more bridge words or angles; and one or more punch words or punchlines (for example, in those implementations the topic may only be in the topic sentence that was received). Implementations of systems for recognizing jokes may include: one or more data stores; and one or more servers communicatively coupled with the one or more data stores; wherein the one or more servers are configured to: communicatively couple with a first computing device through a telecommunications network; receive a first communication through a user interface of the first computing device; determine, in response to receiving the first communication, whether the first communication includes a joke and/or a punchline; and upon determining that the first communication includes a joke and/or a punchline, initiate sending of one or more responses to the first computing device through the telecommunications network; wherein the one or more responses are configured to initiate providing, through the user interface, an indication to the user that the first communication is recognized as a joke and/or a punchline.

Implementations of systems for recognizing jokes may include one or more or all of the following.

The first communication provided through the user interface may be provided to a chatbot and/or a virtual assistant.

The communication provided through the user interface may be a sound that the user interface picks up passively, such as a sound from a television or radio or conversation that is not directed toward the user interface, but which is heard using one or more microphones of the user interface.

The first communication provided through the user interface may include text input by the user.

The first communication provided through the user interface may include audio provided by the user or passively picked up by the user interface, such as by a microphone of the user interface picking up a conversation, television audio, radio audio, etc.

The one or more servers may be further configured to initiate sending one or more initial signals to the first computing device, the one or more initial signals configured to initiate providing, through the user interface, an initial communication to the user, and the first communication may include a user response to the initial communication.

The indication may include an audio representation and/or a visual representation of laughter.

Implementations of methods for recognizing jokes may include: providing one or more data stores; providing one or more servers communicatively coupled with the one or more data stores; and using the one or more servers: communicatively coupling with a first computing device through a telecommunications network; receiving a first communication provided through a user interface of the first computing device; determining, in response to receiving the first communication, whether the first communication includes a joke and/or a punchline; and upon determining that the first communication includes a joke and/or a punchline, initiating sending of one or more responses to the first computing device through the telecommunications network; wherein the one or more responses are configured to initiate providing, through the user interface, an indication to the user that the first communication is recognized as a joke and/or a punchline.

Implementations of methods for recognizing jokes may include one or more or all of the following.

Receiving the first communication may include receiving a communication provided to a chatbot and/or a virtual assistant.

Receiving the first communication may include receiving text input by the user through the user interface.

Receiving the first communication may include receiving audio provided by the user through the user interface or audio picked up passively by the user interface, such as audio of a television, radio, or conversation not directed at the user interface but picked up by a microphone of the user interface (for example the user interface may hear a joke on a television show and a laughing noise may be output using the user interface, to laugh along with a user watching the show).

The method may further include, using the one or more servers, initiating sending of one or more initial signals to the first computing device, the one or more initial signals configured to initiate providing, through the user interface, an initial communication to the user. The first communication may include a user response to the initial communication.

The indication may include an audio representation and/or a visual representation of laughter.

Implementations of methods for recognizing jokes may include: using one or more servers, the one or more servers communicatively coupled with one or more data stores: communicatively coupling with a first computing device through a telecommunications network; providing a first communication to a user through a user interface of the first computing device or receiving the first communication through the user interface of the first computing device; providing a second communication to the user through the user interface or receiving the second communication through the user interface; determining, in response to providing or receiving the second communication, whether the second communication, in relation to the first communication, includes a joke and/or a punchline; and upon determining that the second communication includes a joke and/or a punchline, initiating sending of one or more responses to the first computing device through the telecommunications network; wherein the one or more responses are configured to initiate providing, through the user interface, an indication to the user that the second communication is recognized as a joke and/or a punchline.

Implementations of methods for recognizing jokes may include one or more or all of the following:

Determining that the second communication includes a joke and/or a punchline may include determining that the second communication includes one of a plurality of joke types.

The first communication and the second communication may each form a part or portion of a single communication (in other words, a single communication may include both the first communication and the second communication).

Determining that the second communication includes a joke and/or a punchline may include one or more of: determining that a wordplay exists between adjacent words or word chunks of the second communication; determining that the second communication includes a portmanteau; determining that the second communication includes one or more words or word chunks that have a probability of occurrence below a predetermined threshold and that also have a relatedness score, relative to one or more words or word chunks of the first communication, beyond a predetermined threshold; calculating a probability of one or more words, word chunks or concepts in the second communication being understood by more than half of an intended audience; and calculating a probability of one or more words, word chunks or concepts in the second communication being consistent with the usage patterns of less than half of an intended audience.

The method may further include, upon determining that the second communication includes a joke and/or a punchline, calculating a funniness score using the one or more servers.

The funniness score may be based at least in part on one or more of: a length of the first communication, the second communication, or both; how close one or more words or words chunks (punch words or otherwise) are to an end of the second communication; a calculation of how closely related one or more words or word chunks of the second communication are to one or more words or word chunks of the first communication; a calculation of wordplay between one or more words or word chunks of the first communication or the second communication and one or more other words or word chunks of the first communication and/or the second communication; a calculation of wordplay between one or more words or word chunks of the first communication or the second communication and one or more words or word chunks not in the first communication and not in the second communication but having a relatedness score, relative to one or more other words or word chunks of the first communication or the second communication, beyond a predetermined threshold; and a parallelism calculation related to a degree to which the first communication and the second communication share words and grammatical structure and/or a calculation of how closely related a topic of the first communication is to another topic of the first communication.

The method may further include determining, based at least in part on the funniness score, which of a plurality of predetermined responses to initiate sending to the first computing device. The determination of which predetermined response to initiate sending may be a random selection.

Determining that the second communication includes a joke and/or a punchline may be based at least in part on generating one or more expected communications and comparing the second communication with the one or more expected communications.

The indication may repeat one or more words of the second communication. In implementations the repeated words may be punch words, but they could also be, by non-limiting example, unexpected words, or other words.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements.

DESCRIPTION

Figure 1:
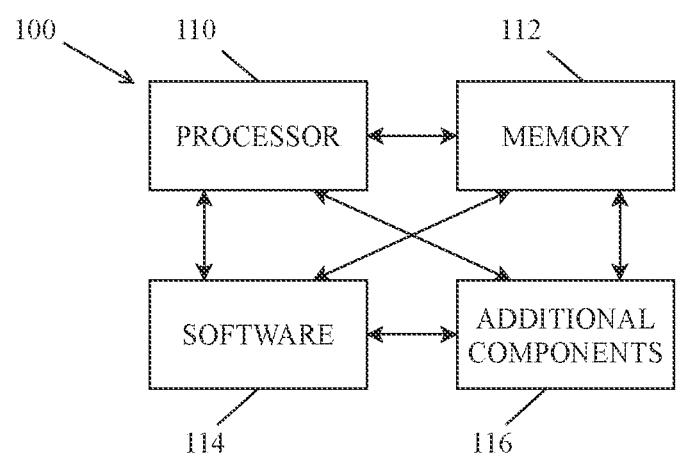
FIG. 1 illustrates an example of a computing environment that may be used in the systems to implement the methods.

Implementations/embodiments disclosed herein (including those not expressly discussed in detail) are not limited to the particular components or procedures described herein. Additional or alternative components, assembly procedures, and/or methods of use consistent with the intended systems and methods for generating and recognizing jokes may be utilized in any implementation. This may include any materials, components, sub-components, methods, sub-methods, steps, and so forth.

It is an object of the present invention to provide novel joke generating and recognizing systems and methods free from the limitations inherent in the above-described conventional joke generation and recognition systems. Various of the disclosed embodiments concern systems, methods, and computer-readable storage media for responding to input obtained from a user via an interactive device, or from a database, by generating an original, contextually integrated (relevant), and humorous joke that requires no human editing. In some embodiments, a user may interact with the system via a mobile device, tablet, desktop computer, laptop computer, robot (including social robot), doll, toy, game, telephone, audio/video interface, chatbot, voicebot, digital assistant, voice assistant, AI virtual assistant, conversational agent, smart speaker, virtual reality (VR) interface, augmented reality (AR) interface, virtual agent, embodied virtual agent, avatar, embodied avatar, virtual being, smart home appliance, smart home device, smart furniture, smart environment, or the like. During the interaction, the system may receive a text string as an input. In some implementations this may involve software of the system converting a user's audio input (spoken sentence, paragraph, etc.) into a text string and inputting that text string into a component or element of the system. A topic sentence is selected from the text string and keywords in the topic sentence are identified and extracted. For each keyword, related words or phrases previously stored in a database of the system are identified and various features are extracted from them. The most promising related words or phrases are linked in various ways to form candidate punch words. The system ranks the candidate punch words and then selects the punch words that rank the highest and that also meet a preset threshold. To those punch words and the topic sentence, the system adds bridge words that are related to the topic sentence and to the punch words, thus creating an original, contextually integrated, and humorous joke response. The joke response is then output to the user in audio and/or visual format.

Disclosed embodiments include methods and systems which receive and analyze textual data and respond with textual jokes. Textual data may include written or audio text. The textual data can be obtained, for example, from web pages, social media posts, or other documents available over a global computer network such as the Internet. The textual data can also be obtained from a speech-to-text converter which recognizes speech received from audio sources including, but not limited to, words spoken by a user to an AI virtual assistant, chatbot, robot, smart speaker, and the like and transforms it into text.

The methods and systems can be implemented using a variety of computing environments and devices, including personal computers, server computers, mobile devices, smart speakers, data stores, database servers, databases, web servers, smart watches, smart glasses, tablets, laptops, a telecommunications network (such as the Internet), etc. Before describing the embodiments in detail, a discussion of example computing environments in which the embodiments can be implemented may be useful. FIG. 1 depicts a high-level block diagram of a general-purpose computing device suitable for use in performing some of the functions described herein. As depicted in FIG. 1, the computing device 100 comprises a processor 110 (e.g. a CPU); memory 112, e.g. random-access memory (RAM) and/or read-only memory (ROM); software 114 for implementing the method (or portions of the method) described herein for generating and recognizing one or more jokes; and various additional components 116 which may be implemented as hardware and/or software (such as, by non-limiting example, a receiver and transmitter for communicating with other computing devices of the system locally and/or through a telecommunications network, wireless communication elements, a speaker for delivering generated jokes in audio format, a display for delivering generated jokes in visual format, a text-to-speech synthesizer for converting text to speech, a speech-to-text converter, user input elements such as a keyboard, keypad, touchscreen, mouse, microphone, and the like). The double-arrowed connectors of FIG. 1 representatively illustrate the individual elements being able to communicate with one another.

It should be noted that portions of the system and method can be implemented using software and/or a combination of software and hardware, e.g. using application specific integrated circuits (ASIC), general purpose computers, or any other hardware equivalents. In one embodiment, the method may be implemented using software 114 for generating and recognizing one or more jokes, the software loaded into memory 112 and executed by processor 110 to implement the functions as discussed above. As such, in implementations the methods for generating and recognizing jokes (including associated data structures) can be implemented using a non-transitory computer-readable storage medium, e.g. RAM memory, magnetic or optical drive or diskette, and the like.

Figure 14:
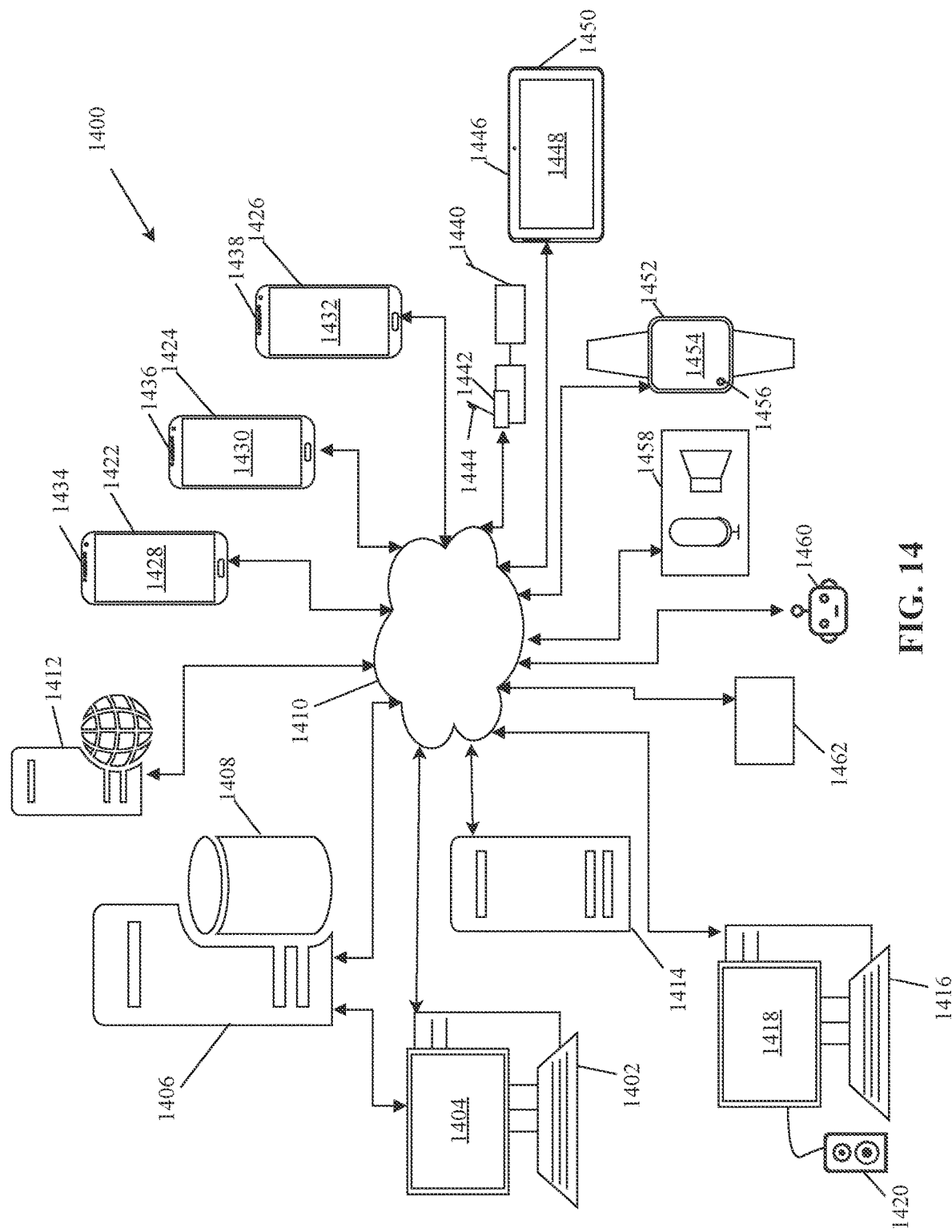
FIG. 14 illustrates a representative example of a system for generating jokes.

Referring now to FIG. 14, a more detailed example of a system 1400 for implementing joke generation and recognition methods (system for generating and recognizing jokes) (system) is shown. The system includes a plurality of computing devices, each of which may include some or all of the elements described previously with respect to FIG. 1.

For example, computing device (device) 1402 includes interface 1404 and is an administrator device. This device may be used by an administrator (admin) to populate a data store (such as database 1408, using database server (DB server) 1406), with some of the elements of the system as will be described hereafter, and to make changes to the database elements. In implementations data stores other than databases may be used. As used herein, a database is considered a subset of a data store. In the implementation shown the admin device is coupled with the DB server directly, though also through a telecommunications network 1410 which may be, by non-limiting example, the Internet, though it could also be a local area network (LAN) in a more localized deployment of the system. The admin device could also communicatively couple with the database/DB server through a web server 1412, such as by accessing a website using credentials. The admin device is shown as a desktop computer but could be a laptop, mobile phone, tablet, smart watch, smart speaker, smart glasses, and so forth.

In implementations the admin computer, DB server, database, web server, and the like could all be implemented on a single machine (such as using virtual servers on a single machine) but in large network deployments there will more likely be a plurality of cloud-connected server racks used to implement these various elements as the number of users scales up. For example, AMAZON WEB SERVICES (AWS) server racks may be utilized to implement the database server, the database, the web server, and so forth so that the number of users may be increased to very large numbers.

In implementations the system may interact with third party server(s)/database(s) 1414 to gather information. As has been described to some extent above, for example, the system may scour the Internet for contextual information which will be used in joke generation and recognition. This may involve processing online news stories, online encyclopedia articles, online social media content, and so forth (all of which will be stored on third party servers/databases) and storing portions of the same in database 1408 to be used in joke generation and recognition.

System 1400 shows a number of user devices simultaneously communicatively coupled with the database 1408 via the telecommunications network, including a personal computer (computer) 1416 having a display 1418 and an associated microphone/speaker 1420, a number of mobile phones 1422-1426 each having a display (1428-1432) and microphone/speaker elements (1434-1438), smart glasses 1440 including a display 1442 and microphone/speaker elements 1444 (a representative example of this would be GOOGLE GLASS), a mobile tablet (tablet) 1446 including display 1448 and microphone/speaker elements 1450, a smart watch 1452 including a display 1454 and microphone/speaker elements 1456, a smart speaker 1458 including microphone/speaker elements (representative examples would be GOOGLE HOME, AMAZON ECHO, APPLE HOMEPOD, and the like), a robot 1460 (which may be a humanoid robot, social robot, talking head, avatar, embodied virtual agent, embodied avatar, or otherwise and which may include microphone/speaker elements for user interaction), and any other human interaction device (device) 1462 which may include microphone/speaker and other input/output elements for user interaction (by non-limiting example, user interfaces integrated in automobiles, trucks, buses, airplanes, telephones, interactive advertising displays, street furniture, Internet of Things devices, wearable technology, virtual receptionist kiosks, and any other human interaction device now known or hereafter discovered/invented).

The system at any given moment may have fewer or more user devices communicatively coupled with it, and each type of device may be scaled up to any number of users, so that FIG. 14 is a simplified diagram. In implementations, for example, there may be thousands of users or more simultaneously interacting with the system for joke generation and recognition, and the system and methods herein may interact with third party software/elements on the user devices (which may involve their own accessing of remote servers and databases and the like). For example, GOOGLE ASSISTANT, AMAZON'S ALEXA, or APPLE's SIRI may interact with the system so that the jokes generated are then relayed to the user through those elements. The system may also have other elements for implementing the method(s), such as one or more application servers communicatively coupled with one or more other elements of the system.

While various embodiments of joke generating and recognizing systems have been described above at a high level, these have been presented by way of example only, and not limitation. Thus, the breadth and scope of a preferred embodiment of a joke generating and recognizing system should not be limited by any of the above-described exemplary embodiments.

Following are joke generation methods which can be implemented using joke generating and recognizing systems such as those shown in FIGS. 1 and 14.

Figure 2:
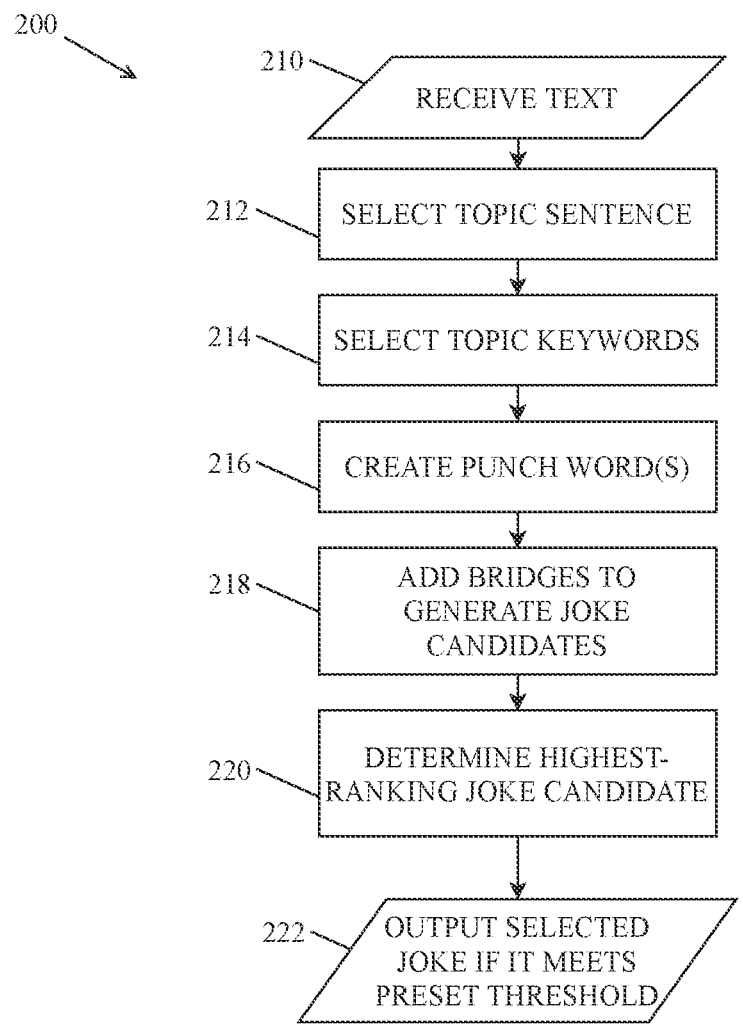
FIG. 2 illustrates a flowchart of an example of a method for generating jokes implemented using the system of FIG. 14.

FIG. 2 illustrates an example high-level flowchart of a method 200 for generating jokes, which jokes may be original, contextually integrated jokes based on text that has been obtained from a source external to the server(s) of the system. In this exemplary embodiment, the jokes to be generated comprise three parts, in this order: A) the topic sentence, which is received from a source external to the server(s) of system 1400 (for example from end user devices 1416, 1422, 1424, 1426, 1440, 1446, 1452, 1458, 1460, 1462, and/or from one or more news websites and/or one or more other websites); B) bridge words, which smoothly connect the topic sentence to the punch word or punch words in a way that results in a joke consisting of a natural-sounding sentence or sentences (generated/supplied by one or more of the servers of the system in conjunction with the one or more databases 1408); and C) a punch word or punch words, which are intended to surprise the user by introducing an incongruity into the joke that suddenly turns out to be harmless and thereby to cause the user to laugh (generated/supplied by one or more of the servers of the system in conjunction with the one or more databases 1408). At step 210, one or more servers of the system receive text from an external text source, by non-limiting examples from a website or from a human interaction device (such as by non-limiting examples elements 1416, 1422, 1424, 1426, 1440, 1446, 1452, 1458, 1460, 1462, one or more news or other websites (such as by scraping websites), etc.). At step 212, the method selects from that text a topic sentence from which the joke generation process will begin. From that topic sentence, a pair of topic keywords is selected in step 214; in an alternative embodiment, only one keyword may be selected. From those topic keywords, a punch word or punch words intended to trigger a laugh from the user in the context of the joke are created in step 216. In step 218, the punch word(s) are linked together with the topic and with bridge words to form candidates for jokes; the bridge words are words that the method generates which smoothly connect the topic sentence to the punch word(s) to form a joke that consists of a natural-sounding sentence or sentences. The bridge words may in implementations be called the "angle" and may include characteristics and/or elements of angles disclosed in Joe Toplyn, "Comedy Writing for Late-Night TV," published by Twenty Lane Media, LLC (2014), the entirety of which is hereby incorporated herein by reference (for example pages 68-70 of that publication discuss angles). The joke candidates that have been generated are ranked in order of their humor potential in step 220 and the highest-ranking joke is determined. Finally, if the highest-ranking joke meets a preset threshold, it is output to the user in step 222, such as by being displayed visually or output in audio format using interfaces of devices 1416, 1422, 1424, 1426, 1440, 1446, 1452, 1458, 1460, 1462. To illustrate in more detail the method broadly outlined in FIG. 2, detailed examples of block diagrams that describe the various steps in the method follow.

Topic Sentence Selection

Figure 3:
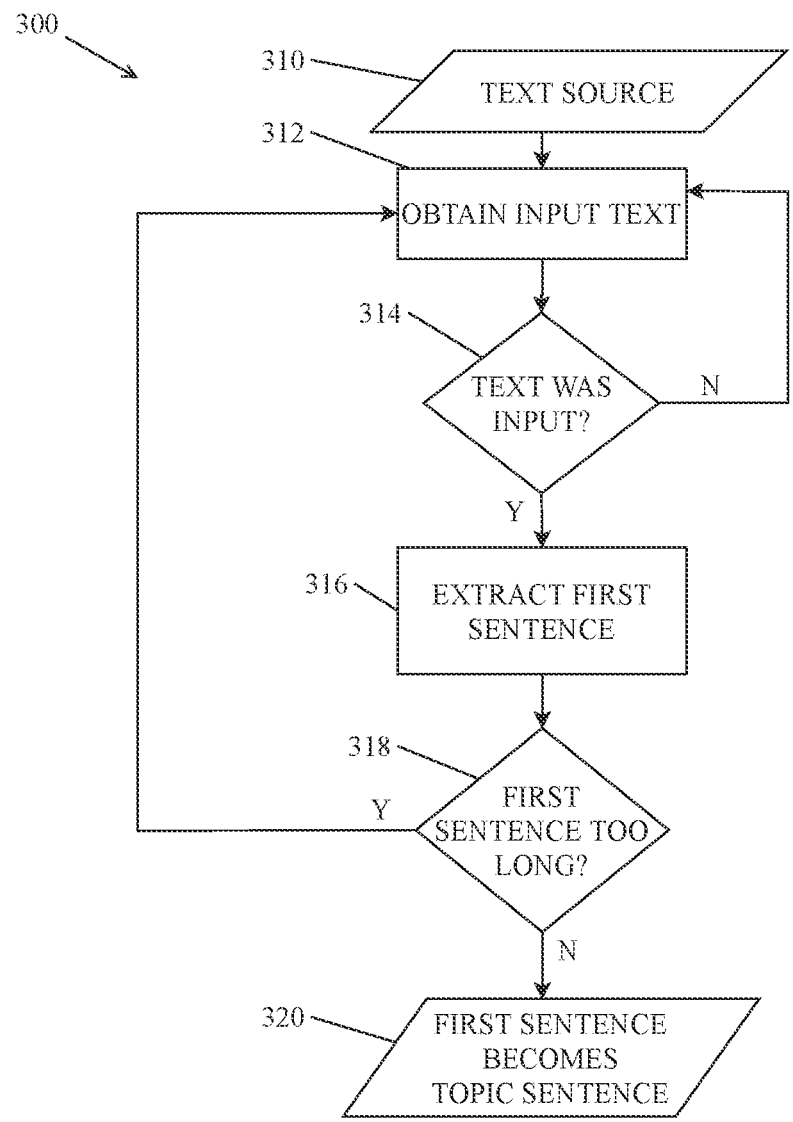
FIG. 3 illustrates a flowchart of an example of a method of selecting a topic sentence using the system of FIG. 14.

Referring now to FIG. 3, shown is a block diagram of a method 300 to select a topic sentence from which the joke generation process will begin. This method may be implemented, by non-limiting example, using software of the database server and/or other server(s) of the system and/or software installed on the end user device. In an exemplary embodiment, this method attempts to obtain input text at step 312, for example, from text source 310. In an exemplary embodiment, text source 310 may be the output of a speech-to-text converter such as GOOGLE CLOUD SPEECH-TO-TEXT, which would be the case if, in an exemplary embodiment, the user were speaking to one of the user interaction devices shown in FIG. 14, or if some other device were supplying speech input, by non-limiting example, speech from the audio tracks of a movie or television show, though it could also be text typed into one of the interaction devices (by non-limiting example, devices 1416, 1422, 1424, 1426, 1440, 1446, 1452, 1458, 1460, 1462) or obtained from one or more news or other websites or from a language model, etc. In another exemplary embodiment, text source 310 may be a text description of an image, which text description has been output by image captioning software such as a deep learning caption generation model, which would be the case if, in an exemplary embodiment, one of the user interaction devices shown in FIG. 14 were presented with an image. In that exemplary embodiment, the system may generate a joke in response to the image that was presented to one of the user interaction devices. If at decision step 314 it is determined that no text has been input, then the method may attempt again to obtain input text.

Once input text has been obtained, the sentences in the text are listed at step 316 and the first sentence is extracted. The first sentence of a text string may be the most likely candidate to be the topic of a joke because it may be most likely to be the most attention-getting sentence in the text string.

Decision step 318 determines whether the number of words in the first sentence of the input text exceeds a preset threshold, for example, 20 words (or some other threshold input by the admin using the admin computer and, for example, stored in the database). A long sentence may be an unlikely candidate to be the topic of a joke because it likely contains too many distracting elements that can divide the attention of the joke's intended audience. If at decision step 318 it is determined that the first sentence is too long, then the method may attempt to obtain new input text. If at decision step 318 the first sentence is determined to be of acceptable length, then at step 320 that sentence is output as the topic sentence from which joke generation will be attempted. If the first sentence is too long, in implementations the method may include reviewing the next listed sentences, in order, until one at or below the threshold is found.

By non-limiting example, and referring back to FIG. 14, any individual user device (mobile phone, tablet, etc.) may have software installed on it that performs some of these functions, such as selecting the topic sentence using the above method, and then the topic sentence may be communicated to the database server (or another system-coupled server) for other method steps to be performed, such as the remainder of the joke generation steps, and then the joke is communicated from the database server to the user device using the telecommunications network. In other implementations, the user device may communicate all of the sentences to the database server (or another system-coupled server) and the server may perform the step of selecting the topic sentence and other method steps to generate the joke and send the joke to the user device. In other implementations the database server or other system-coupled servers may perform some functions of the joke generation but the remainder of the joke generation may be done at the user device end, for example the database server or other server(s) sending certain elements of a joke to the user device and software installed on the user device then incorporating those elements of the joke to form a completed joke for communication to the user. In other implementations all of the steps may be performed by the user device using software installed on the user device and using locally-stored elements instead of accessing a remote database. In short, the steps of joke generation and recognition described herein may be divvied up between software installed on user devices and other elements of the system of FIG. 14 in any manner to best accomplish the method. Nevertheless, implementations having a larger overall system such as in FIG. 14 may allow for much larger libraries of information stored in the database for the system to be able to create contextualized jokes (such as jokes based on recent news) and may allow the joke generation and recognition methods to be implemented simultaneously for very large numbers of users. Furthermore, software at the user-device end or at servers or other elements of the system may be used to implement the various logic steps/trees displayed in the Figures, as will be understood by the practitioner of ordinary skill in the art.

Any of a variety of known natural language processing packages can be used to extract the first sentence and count the number of words in it. In one exemplary embodiment, the NATURAL LANGUAGE TOOLKIT (NLTK) developed by Steven Bird and Edward Loper of the University of Pennsylvania has sentence and word tokenizers that can accomplish the tasks.

Topic Keyword Selection

Figure 4:
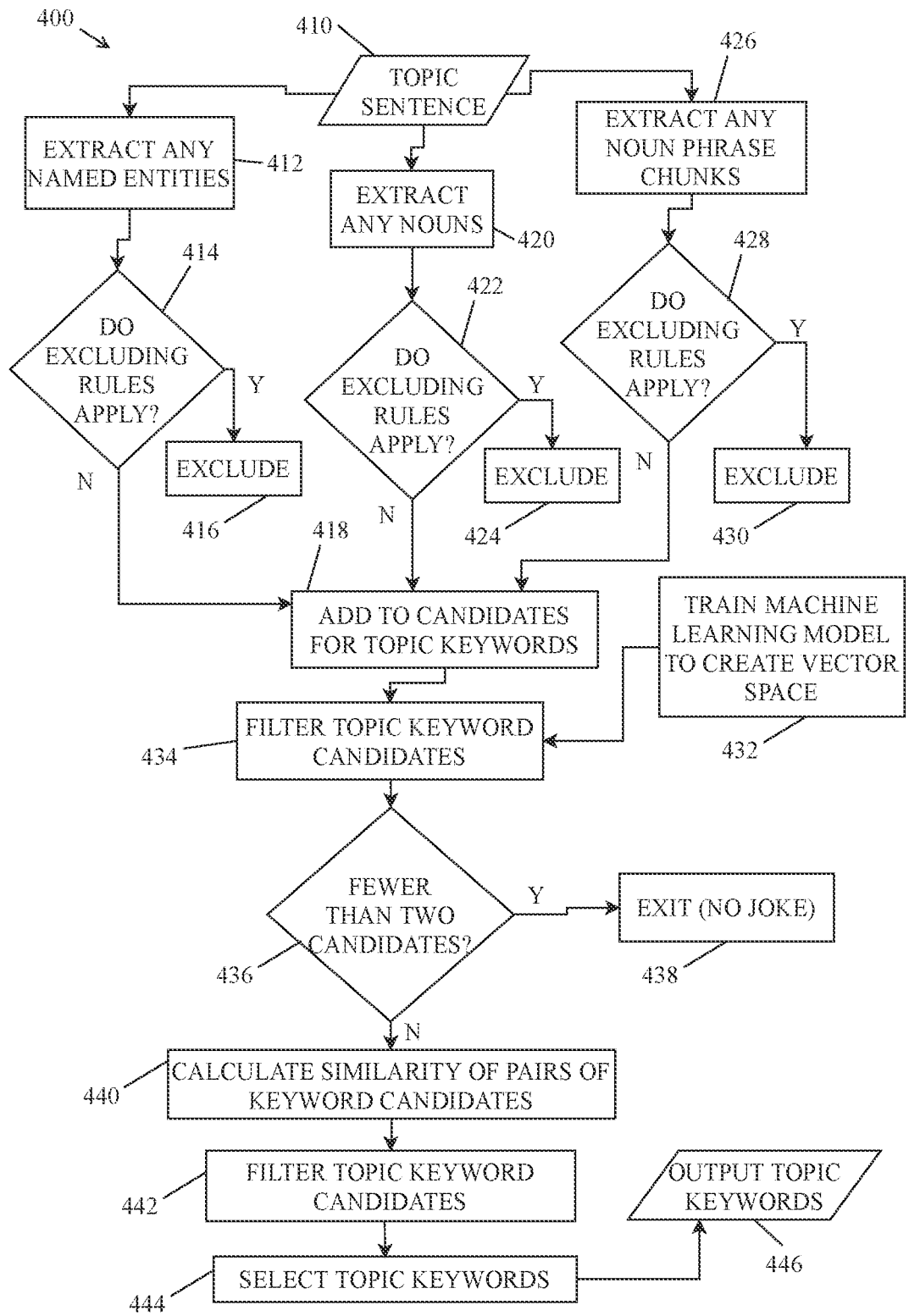
FIG. 4 illustrates a flowchart of an example of a method for selecting topic keywords using the system of FIG. 14.

Once a topic sentence has been selected and output as in FIG. 3, topic keywords are extracted from it. FIG. 4 shows an exemplary embodiment of a method 400 for extracting topic keywords. Again, some or all of these steps may be performed at the user device level using installed software and other aspects may be performed using the DB server and/or other servers of the system.

One example set of topic keyword candidates consists of nouns, noun phrase chunks, and named entities. Nouns are self-explanatory. Noun phrase chunks are multi-word sequences that correspond to individual noun phrases. For example, "long-running reality show" is a noun phrase chunk. Named entities are definite noun phrases that refer to specific types of entities such as organizations, persons, locations, dates, times, amounts of money, percentages, facilities, and geopolitical entities. For example, "Mount Everest" is a named entity.

Nouns, noun phrase chunks, and named entities are the most likely candidates to be useful topic keywords because they are likely to be the most attention-getting words or phrases in the topic sentence. And the most attention-getting words or phrases in the topic sentence are the elements of the topic sentence that are most likely to lead to the generation of a funny joke. Other embodiments of this system may also include verbs, verb phrase chunks, and adjectives in the set of candidates for topic keywords.

Word-level tokenization, part-of-speech (POS) tagging, chunking, and named entity recognition can be accomplished with any of a number of natural language processing tools. One exemplary embodiment will use the tools provided in the NLTK.

Turning to FIG. 4, block 410 represents the topic sentence that was output in step 320. In step 412, the named entities in the topic sentence are extracted using the tools of word-level tokenization, POS tagging, chunking, and named entity recognition, or the like. At decision step 414 a determination is made as to whether any of a set of excluding rules apply to the list of extracted named entities. One example of an excluding rule involves the number of letters in the named entity. If a named entity is shorter than two letters, it is excluded in step 416. Another example of an excluding rule involves the presence of the named entity or its lower-case version on a list of stop words stored in a database. Any named entity on the list of stop words is excluded in step 416. Any named entity that is not excluded by the excluding rules is added, in step 418, to the list of candidates for topic keywords. The excluding rules may in implementations be set by an admin using the admin computer. Also, the system may couple with third-party databases and use third-party excluding rules, and in general the system may include more servers, database servers, application servers, and the like. For example some of the functionalities described herein (such as selecting topic sentences, applying excluding rules, and other steps described below) could be handled by one or more application servers of the system before querying the database using the database server to obtain elements to generate a joke, which joke may be generated by the application server and merely communicated to the user device.

Referring back to stop words, the stop words used by the method include the most common words in the English language and other words that are unlikely to be useful as topic keywords from which to generate a funny joke. An exemplary, but not exhaustive, list of some stop words is as follows: afternoon; anybody; both; company; dozen; everyone; four; guy; hello; hundred; itself; look; Monday; nowhere; outside; regards; self; sort; thanks; thing; week; whatever; woman; yourself; and so forth. The stop words may be chosen by the admin using the admin computer and/or may be chosen using static or dynamic third-party lists of stop words accessed by elements of the system.

In step 420, the nouns in the topic sentence are extracted using the tools of word-level tokenization and POS tagging, or the like. Singular and plural nouns are extracted, including singular and plural proper nouns. At decision step 422 a determination is made as to whether any of a set of excluding rules apply to the list of extracted nouns. Examples of excluding rules are rules that exclude a noun if it is shorter than two letters or if it or its lower-case version is on the list of stop words used by the method. Nouns are also excluded if they are not alphanumeric but are included if they start with "$." Another reason to exclude a noun may be that the noun is present as a separate word in one of the named entities extracted from the topic sentence. To apply this excluding rule, the named entities extracted from the topic sentence have first been split into separate words. Step 424 excludes any noun excluded by the excluding rules. Any noun that is not excluded by the excluding rules is added, in step 418, to the list of candidates for topic keywords.

In step 426, the noun phrase chunks in the topic sentence are extracted using the tools of word-level tokenization and POS tagging, or the like. Also used is a chunk grammar consisting of rules that indicate how the topic sentence should be chunked. In one exemplary embodiment, the chunk grammar rules say that a noun phrase chunk should be formed whenever the chunker finds an optional adjective followed by one or two singular or plural nouns, excluding proper nouns. Another rule of the chunk grammar says that dollar amounts should be extracted as chunks. Using this chunk grammar, a chunk parser is created using, for example, the RegexpParser chunker in the NLTK. The chunk parser is used to extract noun phrase chunks, including dollar amounts, from the topic sentence.

At decision step 428 a determination is made as to whether any of a set of excluding rules applies to the list of extracted noun phrase chunks. Examples of excluding rules are rules that exclude a noun phrase chunk if it is shorter than two letters, if it or its lower-case version is on the list of stop words, or if it is present as a separate word or phrase in one of the named entities that were extracted from the topic sentence. Step 430 excludes any noun phrase chunks excluded by the excluding rules. Any noun phrase chunk that is not excluded by the excluding rules is added, in step 418, to the list of candidates for topic keywords and any duplicate candidates are removed from that list.

In implementations, to generate a joke based on the selected topic sentence, the most promising two keywords are chosen from the list of candidates for topic keywords. A funny joke may start with a topic sentence that gets the attention of its audience. So the most promising two keywords in the selected topic sentence may be the two most attention-getting keywords in that sentence. And the two most attention-getting keywords in the topic sentence may be those two keywords which are least likely to appear together in a sentence, that is, the two keywords which an audience would consider to be the least likely to share the same context.

To measure how likely it is that two particular words will share a common context it is possible, in an exemplary embodiment, to measure how close their word vectors are in an appropriate vector space. This vector space can be produced by a machine learning model trained on a very large corpus of audience-relevant text in step 432. An exemplary embodiment might use GOOGLE's pretrained WORD2VEC model trained on approximately 100 billion words from a GOOGLE NEWS dataset; that model includes word vectors for a vocabulary of 3 million English words and phrases. Other embodiments might use machine learning models that were also trained on data scraped from online social media; pop culture websites; online forums, message boards, and discussion groups; and other data sources that represent the anticipated knowledge, beliefs, and attitudes of the intended audience for the joke or jokes to be generated. Other embodiments might use machine learning models that are even more tailored to an individual user because they have also been trained on that user's most frequently visited websites, websites in the user's online search and browsing history, social media posts made by or "liked" by the user, the user's email or text messages, the user's communications with an AI virtual assistant, and other personal data sources.

In implementations the first step in selecting two topic keywords from the list of candidates for topic keywords is step 434, which filters out candidates that are not in the vocabulary of the machine learning model being used. Decision step 436 determines whether fewer than two candidates for topic keywords remain after the filtration process. In implementations, if fewer than two candidates remain then the method exits, as shown at step 438, and the method will not attempt to generate a joke. In other implementations, if fewer than two candidates for topic keywords remain, then the method may attempt again to obtain input text. If two or more candidates for topic keywords remain then the similarity, based on the machine learning model being used, of each and every pair of remaining candidates is calculated in step 440. An exemplary embodiment might use the "similarity" function of GOOGLE's pretrained WORD2VEC model trained on GOOGLE NEWS data to calculate the similarity of each pair of candidates. An exemplary embodiment would also filter out, in step 442, any pair of candidates with a calculated similarity less than zero; such pairs of candidates may tend to be too dissimilar to be useful as topic keywords.

Whichever two remaining topic keyword candidates are the least similar, as indicated by their pairwise similarity calculation, become the two selected topic keywords in step 444 and are outputted in step 446. These are the two topic keywords that the method will use in attempting to generate jokes. Because those two topic keywords are the least similar pair, they may be the elements in the topic sentence that are most likely to attract an audience's attention. This means that a joke based on those two topic keywords may be most likely to strike the audience as funny. In implementations, if the two remaining topic keyword candidates that are the least similar, as indicated by their pairwise similarity calculation, have a calculated similarity that does not fall below a certain preset threshold, which in implementations may be set by the admin, then the method may not attempt to generate jokes. This is because a joke based on two topic keywords that are not sufficiently dissimilar may be unlikely to strike the audience as funny. Other embodiments of this system may select as topic keywords those two keywords in the topic sentence that are computationally determined to convey the most information to the anticipated audience or are computationally determined to be the elements of the topic sentence that are likely to be the most distinctive, attention-getting, unexpected, or surprising to the anticipated audience. If no two keywords in the topic sentence are computationally determined to be sufficiently informative, distinctive, attention-getting, unexpected, or surprising to the anticipated audience, then the method may not attempt to generate jokes.

Generation of Joke of Type #1

Figure 5:
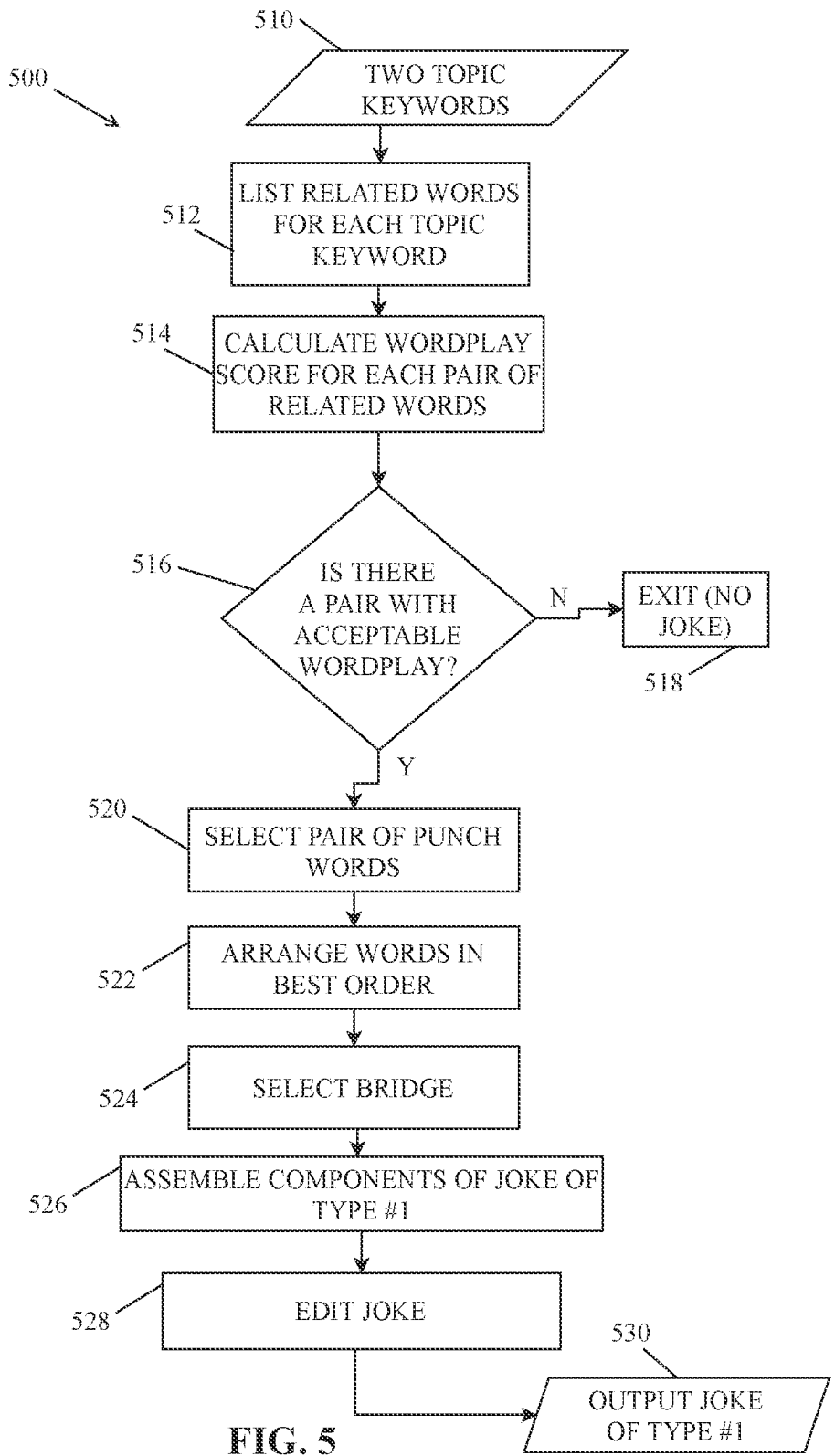
FIG. 5 illustrates a flowchart of an example of a method for generating a joke of a first type (Type #1) using the system of FIG. 14.

In implementations, after two topic keywords have been selected as in FIG. 4, a joke of Type #1 is generated from them. FIG. 5 shows an exemplary embodiment of a method 500 of generating a first type of joke (Type #1). Block 510 represents the two topic keywords that were outputted in step 446. In step 512, the machine learning model trained in step 432, or another language model, is used to list the words that are most similar to each topic keyword. That is, for each of the two topic keywords, a list is created of the top fifty, for example (which number in implementations may be selected by the admin), words that occur most frequently in contexts where the topic keyword appears. An exemplary embodiment might use the "most_similar" function of GOOGLE's pretrained WORD2VEC model trained on GOOGLE NEWS data to build the list of most similar words, which we'll refer to as related words. The topic keyword or one or more of its related words may consist of more than one token. The list of related words for a topic keyword may be filtered to exclude words that are poorly suited for use in assembling punch words, by non-limiting example, duplicate words, misspelled words, acronyms, abbreviations, words with non-alphabetic characters, or words unrelated to the sense of the topic keyword as it is used in the topic sentence. In other implementations, related words, associated words, or most similar words for a topic keyword, including words that occur most frequently in contexts where the topic keyword appears, may also be generated by a language model such as, by non-limiting example, OPENAI's GPT-3 or may be selected from a database or databases such as, by non-limiting example, a spreadsheet, knowledge base, graph database, knowledge graph, relational database, semantic network, entity relationship model, dictionary, thesaurus, ontology, lexicon, or WORDNET (created by George A. Miller), or may be selected by using a common knowledge model such as those described below in step 2012 or by using any other language model or database that allows a determination to be made of how closely connected two words, two word chunks, or a word and a word chunk are in the minds of most people in the intended audience for the joke. In still other implementations, related words may be selected from a database or databases including words related to an entity or entities that are not a topic keyword, by non-limiting example, words related to dogs, which related words may be used to generate or recognize jokes from the perspective of a dog.

A separate list of related words is compiled for each topic keyword, i.e. for topic keyword A and for topic keyword B. Then each and every related word on the list for topic keyword A, including topic keyword A itself, is paired with each and every related word on the list for topic keyword B, including topic keyword B itself. The wordplay score of each pair of words is calculated in step 514. The process of calculating a wordplay score is described in detail with regards to FIG. 6. Decision step 516 determines whether a pair of related words exists with a wordplay score that is better than a certain preset threshold (which threshold may be determined by the admin in implementations). If such a word pair does not exist, then the method exits, as shown at step 518, and the method will not attempt to generate a joke of Type #1.

If there does exist a pair of related words with a wordplay score that is better than the preset threshold, then the pair of related words with the best wordplay score better than the threshold becomes the pair of punch words for a joke of Type #1 at step 520. The wordplay between the two punch words, because it is unexpected and surprising in the context of the rest of the joke, may result in the joke's humorous effect.

In step 522 the two punch words, punch word A and punch word B, are arranged in an optimal order that will make the joke read and sound as much as possible like natural English speech. To do this, each of the two punch words is first tagged with its part of speech using the tools of word-level tokenization and POS tagging. If punch word A is any type of adjective, it is placed before punch word B in the joke, and its related topic keyword A is placed before topic keyword B. If punch word B is any type of adjective, it is placed before punch word A in the joke, and its related topic keyword B is placed before topic keyword A. If neither punch word is any type of adjective but punch word B begins with a capital letter, punch word B is placed before punch word A in the joke, and its related topic keyword B is placed before topic keyword A.

Once the pair of topic keywords and the pair of punch words are arranged in the optimal order, a bridge is added to the joke. A bridge is a string of words or a template of words that connects the topic sentence or topic keywords to the punch words in a way that results in a natural-sounding, logical-sounding, syntactically well-formed sentence or two, completing the joke. By guiding the audience smoothly and efficiently from the topic sentence or topic keywords to the punch words, the bridge may help set up the audience to be surprised by the punch words, thereby enhancing the humorous effect of the punch words.

In one exemplary embodiment, a bridge is selected in step 524 from a list stored in the database. Any one of various random number generators can be used to select a bridge at random from the list in the database.

One exemplary embodiment will draw from a list of bridges like these: "Or maybe," "I have an idea," "That reminds me of," "Instead, how about," "Is that anything like," "Or here's something," "What's next . . . ," "Then before you know it," "Makes me think of," "Next you'll be talking about," "Here's a brainstorm," and so forth. This list of bridges is merely an example and is not exhaustive.

Additionally, a filler word or filler words may be added to the selected bridge. The filler word(s) may be selected, possibly at random, from a list stored in a database. One exemplary embodiment will draw from a list of filler words like these: "Yeah," "Well," "Um," "Oh," "Ha," "Like," "Sure," "You know," "Mmm-hmm," "Hey," and so forth. This list of filler words is merely an example and is not exhaustive. Adding a filler word or filler words may result in a joke that is more natural-sounding.

Once a bridge is selected, the components of the joke of Type #1 are assembled in step 526. First in the joke come the two topic keywords, arranged in their optimal order as detailed above, followed by a question mark. Next comes the bridge that was selected from the list in the database, along with any filler word(s). Last come the two punch words, arranged in their optimal order as detailed above. The result of this assembly process is a rough draft of the joke of Type #1.

In step 528 the rough draft of the joke of Type #1 is edited to make the joke read and sound as much as possible like natural English speech. If the topic keyword in second position is a singular noun, the word "a" or "an" may be inserted before the topic keyword in first position. Then the first letter of the first word of the joke is capitalized. If the punch word in second position is a singular noun, the word "a" or "an" may be inserted before the punch word in first position.

After editing, the completed joke of Type #1 is output in step 530. In implementations the wordplay score of the completed joke is the wordplay score that was calculated in step 520 for the two words related to the topic keywords that became the punch words of the joke. As described below, the wordplay score of the completed joke is used to compare the funniness of the joke with that of other jokes and to assess the method's confidence in the joke.

Calculation of Wordplay Score

Figure 6:
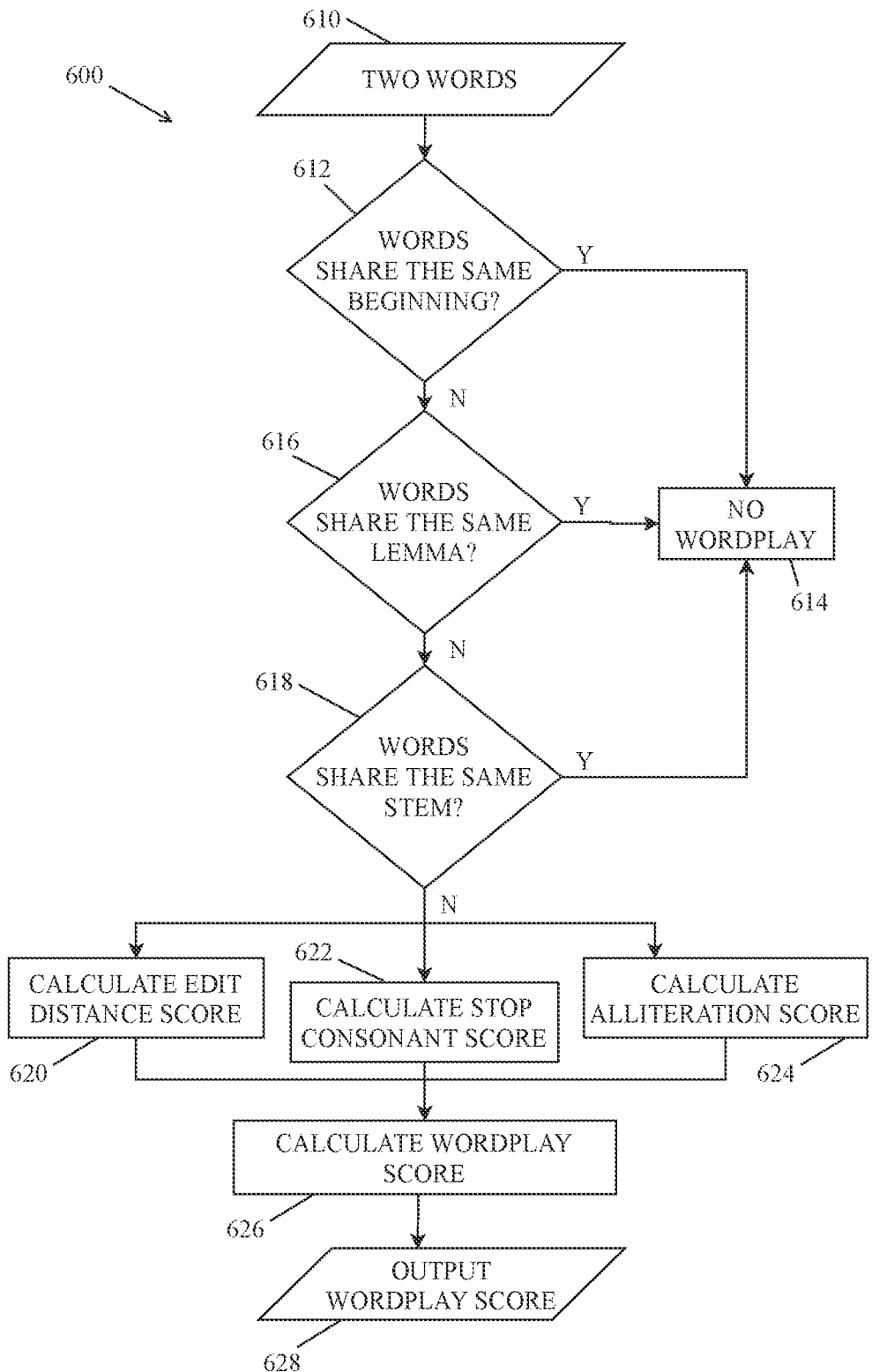
FIG. 6 illustrates a flowchart of an example of a method for calculating a score for the wordplay between two words or phrases using the system of FIG. 14.

These systems for generating and recognizing jokes utilize a method for calculating a score for the wordplay between two words or phrases. FIG. 6 shows an exemplary embodiment of a method 600 for calculating a score for the wordplay between two words or phrases. Wordplay between words or phrases, when it occurs in punch word(s), can contribute to the humorous effect of a joke because it is surprising in the context of the joke. Block 610 represents the two words for which the wordplay score is to be calculated; call them word A and word B.

A determination is made as to whether any of a set of excluding rules applies to the pair of words. One example of an excluding rule, at decision step 612, involves what can be called the beginning of each word, by non-limiting example the first 75% of each word (in other implementations it could be the first 5%, 10%, 15%, 20%, 25%, 30%, 35%, 40%, 45%, 50%, 55%, 60%, 65%, 70%, etc., of each word). If word A starts with the beginning of word B or word B starts with the beginning of word A, that pair of words is determined in step 614 to have no wordplay. Other examples of excluding rules, in steps 616 and 618, involve the lemmas and stems of the two words. If the two words share the same lemma or the same stem, that pair of words is determined in step 614 to have no wordplay. Various stemmers and lemmatizers can be used to identify the stems and lemmas of the words. An exemplary embodiment might use the SNOWBALL STEMMER and the WORDNET LEMMATIZER in the NLTK. The reasons for these excluding rules are that in implementations for wordplay to have a humorous effect, it is desirable for the wordplay to elicit surprise in the audience, and the pairing of two words that are fundamentally the same word will generally not elicit surprise.

If the pair of words has not been excluded, a wordplay score is calculated for the pair. In an exemplary embodiment the wordplay score has three components. The first component, calculated in step 620, is the edit distance score, which is the edit distance between the two words. The shorter the edit distance is between the two words, the more surprising it may be to link the two words together in the joke as punch words and the funnier the joke may be.

If the two words are both in a pronunciation dictionary, the edit distance is calculated between the first pronunciation listed for each word in the pronunciation dictionary. If at least one of the words is not in the pronunciation dictionary, the edit distance between the words as spelled is calculated instead and a numerical penalty, by non-limiting example 0.5 (which in implementations may be set by the admin and may be any other value, for example 0.1, 0.2, 0.3, 0.4, 0.5, 0.6, 0.7, 0.8, 0.9, etc.), may be factored into the edit distance score. The reason for this numerical penalty is that an edit distance calculation based on how the words are spelled may overstate the degree to which the words are pronounced in a similar way. If the two words rhyme, a numerical bonus of, say, 1.5 (which in implementations may be set by the admin and may be any other value, for example 0.25, 0.5, 0.75, 1.0, 1.25, 1.5, 1.75, 2.0, etc.) may be factored into their edit distance score. The reason for this numerical bonus is that words that rhyme may in implementations have a greater humorous effect than words that do not rhyme, because words that rhyme end unexpectedly with the same sound(s). Any of various rhyming dictionaries may be used to determine whether the two words rhyme, by non-limiting example James Wenzel's PYTHON rhyming dictionary PHYME. In alternative embodiments, a rhyming dictionary or a collection of preset rules may be used to determine whether a rhyme is perfect, imperfect, or any other type of rhyme and may be used to assign a different numerical bonus to each type of rhyme. The edit distance score, with any penalty and bonus factored in, becomes one component of the wordplay score. To calculate the edit distance score, an exemplary embodiment might use the CMU Pronouncing Dictionary in the NLTK and any of various implementations of the Levenshtein distance algorithm.

A second component of the wordplay score in an exemplary embodiment, calculated in step 622, is the stop consonant score. The stop consonant score is the total number of stop consonants present in the pair of words as they are spelled, not including stop consonants present in words where the stop consonants are not pronounced as stop consonants. Stop consonants are "b," "d," "g," "k," "p," and "t." The presence of stop consonants in a punchline may in implementations increase the humorous effect of the punchline, so that the more stop consonants in the punch words, the funnier the joke may be. In an alternative embodiment, the stop consonant score may be the total number of stop consonant phonemes present in the pair of words as they are pronounced; a pronunciation dictionary such as the CMU Pronouncing Dictionary would be used in this embodiment.

A third component of the wordplay score in an exemplary embodiment, calculated in step 624, is the alliteration score, which measures the degree to which two words start with the same consonants, the same consonant sounds, or the same phonemes. In an exemplary implementation the alliteration score is 2 if the first phoneme of each of the two words is the same consonant sound, and the alliteration score rises to 3 if, in addition, the second phoneme of each of the two words is the same. These particular points awarded for alliteration are only examples and may be different in other embodiments, and in implementations these may be set by the admin. Alliteration in the punch words, the unexpected repetition of letters or phonemes, may add to the surprise caused by linking the punch words in the joke and may increase the humorous effect of the joke.

The score for the wordplay between the two words may also include additional components. By non-limiting example, the wordplay score may also include a score measuring the degree to which the two words have the same number of syllables, a score measuring the degree to which the two words end with the same phonemes or letters, or a score measuring the degree to which the two words share the same vowel sounds.

In step 626 the wordplay score for the pair of words is calculated and it is output in step 628. In an exemplary embodiment, the wordplay score for the pair of words is calculated as their edit distance score, minus their alliteration score, minus 75% of their stop consonant score. The full stop consonant score is not included in the wordplay score in implementations in order to keep the stop consonant score in balance with the other components of the wordplay score. These particular weights assigned to the various components of the wordplay score are only examples and may be different in other embodiments, and in implementations these may be set by the admin. In this embodiment, the lower the wordplay score, the better the wordplay.

Example of Generation of Joke of Type #1
Topic sentence: "Archaeologists in Egypt have discovered a pair of socks meant to be worn with sandals from 2,000 years ago."
Topic keywords selected: "Egypt," "socks"
Related words with the best wordplay score: "Mideast," "mittens"
Edit distance score: 4.0
Alliteration score: 3.0
Stop consonant score: 4.0
Wordplay score: 4.0–3.0–(0.75*4.0)=–2.0
Maximum acceptable wordplay score to output a joke: 0.0
Joke output: "Egypt socks? Then how about Mideast mittens?"

Figure 7:
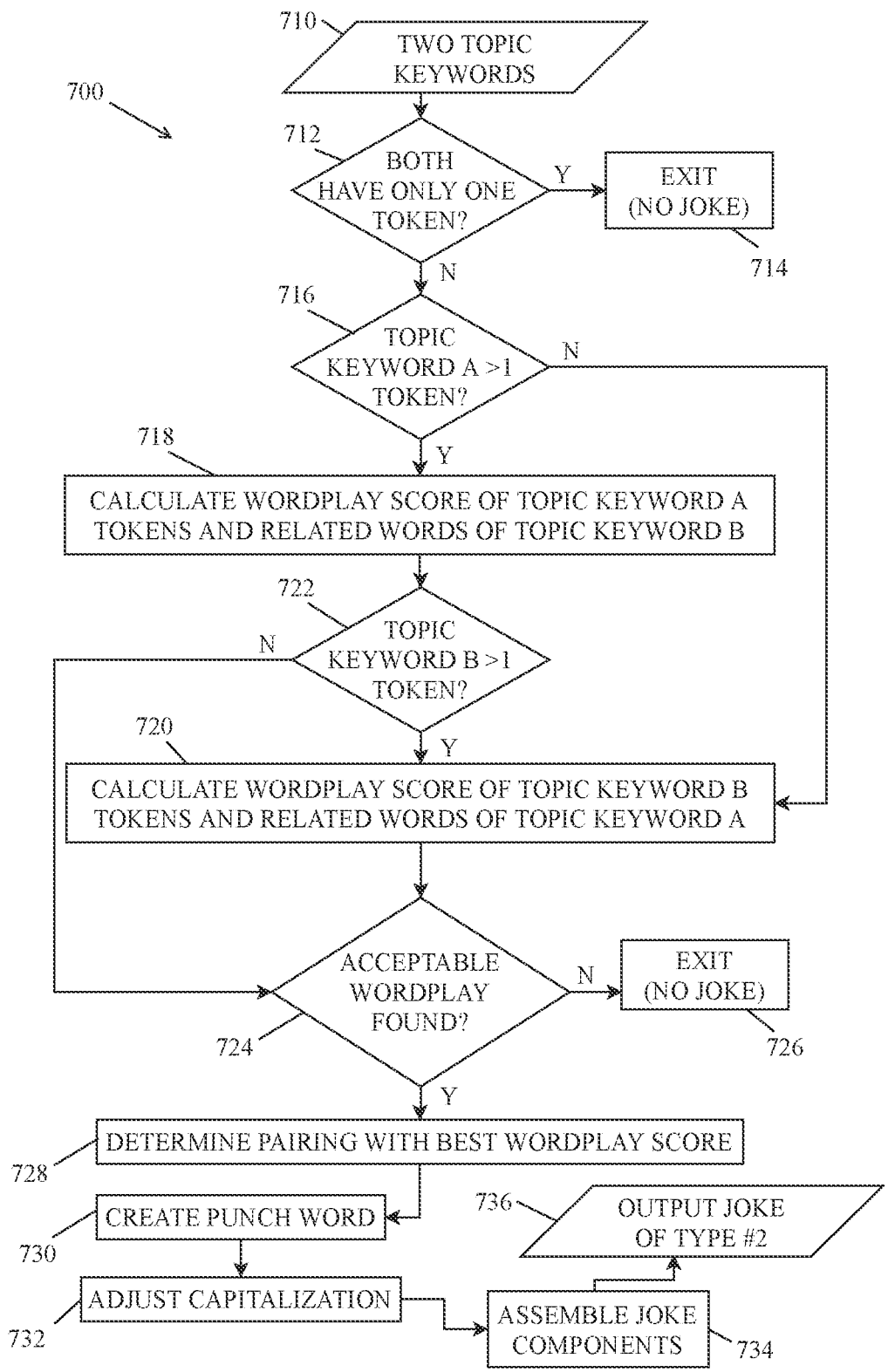
FIG. 7 illustrates a flowchart of an example of a method for generating a joke of a second type (Type #2) using the system of FIG. 14.

Generation of Joke of Type #2
In addition to a joke of Type #1, the two topic keywords selected as in FIG. 4 can also be used to generate a joke of Type #2 if at least one of the topic keywords is a string consisting of two or more tokens. Examples of such a string are "parole board," "United States," and "Santa Claus." FIG. 7 shows an exemplary embodiment of a method 700 of generating a second type of joke (Type #2).

Block 710 represents the two topic keywords that were outputted in step 446, i.e. topic keyword A and topic keyword B. Decision step 712 determines whether both topic keywords consist of only one token. In one exemplary embodiment, the NLTK has a word tokenizer that will enable the determination. If both topic keywords consist of only one token then the method exits, as shown at step 714, and the method will not attempt to generate a joke of Type #2.

Decision step 716 determines whether topic keyword A consists of more than one token. If it does, in step 718 a list is created of the top fifty, for example (which number may in implementations be set by the admin and may be any number greater than fifty, equal to fifty, or fewer than fifty), words that occur most frequently in contexts where topic keyword B is used. As in step 512, an exemplary embodiment might use the "most_similar" function of GOOGLE's pretrained WORD2VEC model trained on GOOGLE NEWS data to build the list of most similar words for topic keyword B, which we'll refer to as the topic keyword B related words. In other implementations, related words, associated words, or most similar words for the topic keyword, including words that occur most frequently in contexts where the topic keyword appears, may also be selected using any of the methods described for step 512. Then each of the tokens of topic keyword A is paired in turn with each topic keyword B related word, including topic keyword B itself, and the wordplay score of each pair is calculated as in FIG. 6. The pairing of the topic keyword A token and the topic keyword B related word with the best wordplay score is determined.

If topic keyword A consists of only one token then topic keyword B must consist of more than one token because it has been determined that both keywords do not consist of only one token. So if topic keyword A is determined in decision step 716 to consist of only one token, in step 720 a list is created of the top fifty, for example (which number in implementations may be set by the admin and may be any number greater than, fewer than, or equal to fifty), words that occur most frequently in contexts where topic keyword A is used. Again, as an example, the "most_similar" function of GOOGLE's pretrained WORD2VEC model trained on GOOGLE NEWS data may be used to build the list of most similar words for topic keyword A, which we'll refer to as the topic keyword A related words. In other implementations, related words, associated words, or most similar words for the topic keyword, including words that occur most frequently in contexts where the topic keyword appears, may also be selected using any of the methods described for step 512. Then each of the tokens of topic keyword B is paired in turn with each topic keyword A related word, including topic keyword A itself, and the wordplay score of each pair is calculated as in FIG. 6. The pairing of the topic keyword B token and the topic keyword A related word with the best wordplay score is determined.

Decision step 722 determines whether topic keyword B consists of more than one token. If topic keyword B does consist of more than one token then the best wordplay score is determined, in step 720, from among the pairings of all tokens of topic keyword B and topic keyword A related words, including topic keyword A itself. If topic keyword B consists of only one token then no pairing of the token of topic keyword B and the topic keyword A related words is evaluated in decision step 724.

Decision step 724 determines whether any pairing of topic keyword token and topic keyword related word has been found in step 718 and step 720 that has a wordplay score which is better than a certain preset threshold, which threshold may be determined by the admin in implementations and may be set to any desired value. If such a pairing has not been found, then the method exits as shown at step 726 and the method will not attempt to generate a joke of Type #2.

If at least one pairing of topic keyword token and topic keyword related word has been found with a wordplay score that is better than a certain preset threshold, then the pairing with the best wordplay score is determined in step 728. The topic keyword containing the token that is in the pairing that yielded the best wordplay score becomes the host string for the punch word to be created for a joke of Type #2.

The punch word for the joke of Type #2 is created in step 730. To create the punch word, the topic keyword related word in the pairing determined to have the best wordplay score is substituted in the host string for the token in the host string with which it was determined to have the wordplay.

In step 732 the word that was inserted into the host string in order to create the punch word has its first letter capitalized if necessary in order to match the capitalization of the token it replaced. Matching the capitalization ensures that the completed joke will read as much as possible like standard English.

The components of the joke of Type #2 are assembled in step 734. First in the joke may come the original host string, i.e. the host string before the word was inserted into it to create the punch word. The first letter of the original host string is capitalized because it starts a sentence. A question mark may be inserted after the original host string, and then the words "More like." Next in the joke comes the punch word that was created in step 730. Last may come a comma and then the words "am I right?" The result of this assembly process is the completed joke. These are representative examples, and other phrases conveying meaning similar to "More like" and "am I right" could be used in other implementations to create a joke of Type #2. In an alternative implementation, a bridge selected from a list stored in a database, as described for assembling a joke of Type #1, may be added between the original host string and the punch word to assemble the completed joke of Type #2. A filler word or filler words may also be added to the selected bridge as described earlier.

The completed joke of Type #2 is output in step 736. The wordplay score of the completed joke is the wordplay score that was calculated in step 728 for the topic keyword related word and topic keyword token that were used to create the punch word. As described below, the wordplay score of the completed joke is used to compare the funniness of the joke with that of other jokes and to assess the method's confidence in the joke.

Example of Generation of Joke of Type #2

Topic sentence: "A new study says eating egg yolks after the age of 40 is as bad for you as smoking."

Topic keywords selected: "egg yolks," "smoking"

Topic keyword tokens: "egg," "yolks"

The topic keyword token and topic keyword related word with the best wordplay score: "yolks," "smokes"

Edit distance score: 0.5 (This score includes a bonus of 1.5 because the words rhyme.)

Alliteration score: 0.0

Stop consonant score: 2.0

Wordplay score: 0.5−0.0−(0.75*2.0)=−1.0

Maximum acceptable wordplay score to output a joke: 0.0

Joke output: "Egg yolks? More like egg smokes, am I right?"

Generation of Joke of Type #3

The two topic keywords selected as in FIG. 4 can also be used to generate a joke of a third type (Type #3), in which the punch word is a portmanteau word. First a list of related words is compiled for topic keyword A and a separate list of related words is created for topic keyword B. As before, an exemplary embodiment might use the "most_similar" function of GOOGLE's pretrained WORD2VEC model trained on GOOGLE NEWS data to build the lists of related words, which may include noun-phrase chunks and verb-phrase chunks. In other implementations, related words, associated words, or most similar words for each topic keyword, including words that occur most frequently in contexts where the topic keyword appears, may also be selected using any of the methods described for step 512.

Then the punch word is created by substituting a word related to one topic keyword for one or more syllables of a word related to the other topic keyword with which it has adequate wordplay. The adequacy of the wordplay between the word being inserted and the syllable or syllables it is replacing is determined by calculating their wordplay score as shown in FIG. 6. After the punch word has been assembled, a bridge is created, including any filler word(s), and is used to connect the topic sentence to the punch word to complete the joke. In implementations the wordplay score of the completed joke is the wordplay score associated with the word and syllables that were substituted for one another to create the punch word.

Figure 8:
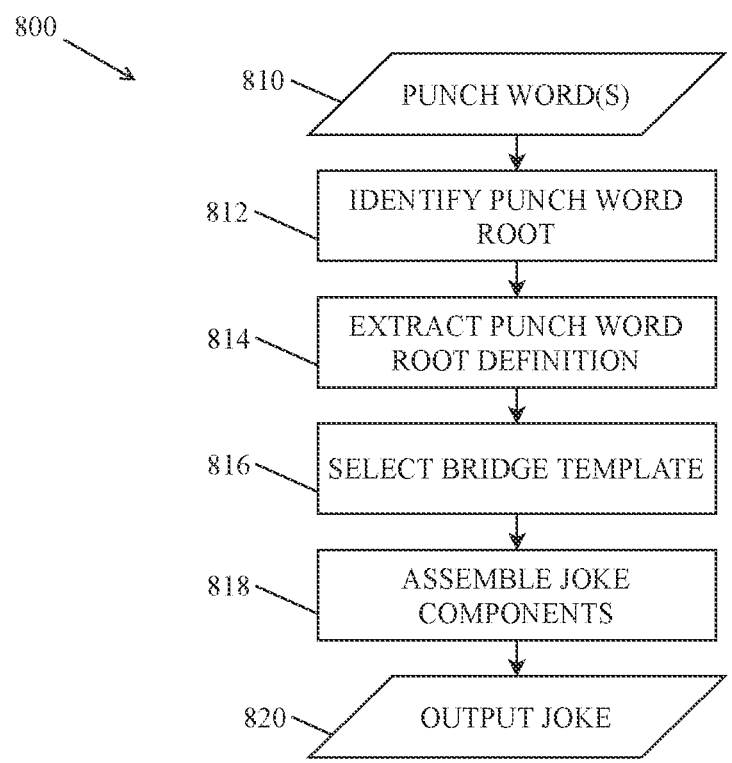
FIG. 8 illustrates a flowchart of an example of a method used to generate a joke of a third type (Type #3) and a joke of a fourth type (Type #4) using the system of FIG. 14.

FIG. 8 shows an exemplary embodiment of a method 800 of creating a bridge and outputting a joke of the third type (Type #3). Block 810 represents the punch word of the joke of Type #3. Step 812 identifies the punch word root, which in implementations is the topic keyword related word that comprises at least half of the punch word (though in other implementations it may comprise greater or less than half of the punch word and may be set by the admin). Step 814 extracts from a database or corpus of documents (internal to the system or a third party provided database/corpus accessed by the system through the Internet) the punch word root definition, which is a short phrase which defines the punch word root. To extract the punch word root definition, an exemplary embodiment might use the method described in U.S. Pat. No. 7,376,551 B2, "Definition Extraction," issued May 20, 2008, listing as first inventor Kevin R. Powell, the entire disclosure of which is incorporated herein by reference. In implementations step 816 selects a bridge template, possibly at random, from a list stored in a database. Each bridge template assigns the punch word root definition to the punch word.

Here are some non-limiting examples of bridge templates:

"So that means a new [punch word root definition] is [punch word]."

"So how about a new [punch word root definition]: [punch word]."

"Sounds like the new [punch word root definition] is [punch word]."

"They call the new [punch word root definition] [punch word]."

"And maybe a new [punch word root definition] could be [punch word]."

"That's why a new [punch word root definition] is [punch word]."

This list of bridge templates merely includes examples and is not exhaustive.

The punch word root definition and punch word are added to the selected bridge template in step 818, assembling and completing the joke. In other implementations, a bridge that does not incorporate a punch word root definition may be selected, possibly at random, from a list stored in a database and used in connection with the punch word to assemble the completed joke. A filler word or filler words may also be added to the selected bridge as described earlier. The completed joke is output in step 820.

Example 1 of Generation of Joke of Type #3

Topic sentence: "For the Olympics, the mayor of Rio wants Pokémon Go to come to Brazil."
Topic keywords selected: "Olympics," "Pokémon Go"
Words related to the topic keywords: "Zika" [the mosquito-borne virus], "Pikachu"
Punch word: "Zikachu"
Punch word root and definition: "Pikachu," "fictional creature"
Completion of joke with bridge: "So how about a new fictional creature: Zikachu."

Example 2 of Generation of Joke of Type #3

Topic sentence: "Dow Chemical is turning raw sewage into drinking water."
Topic keywords selected: "sewage," "drinking water"
Words related to the topic keywords: "poo," "Poland Spring"
Punch word: "Pooland Spring"
Punch word root and definition: "Poland Spring," "brand of bottled water"
Completion of joke with bridge: "They call the new brand of bottled water Pooland Spring."

Example 3 of Generation of Joke of Type #3

Topic sentence: "A new website for Disney fans who want to date is called Mouse Mingle."
Topic keywords selected: "Disney," "date"
Words related to the topic keywords: "Cinderella," "Tinder"
Punch word: "Tinderella"
Punch word root and definition: "Tinder," "online dating app"
Completion of joke with bridge: "And maybe a new online dating app could be Tinderella."

Example 4 of Generation of Joke of Type #3

Topic sentence: "America's national forests are being severely damaged by the illegal growing of marijuana."
Topic keywords selected: "national forests," "marijuana"
Words related to the topic keywords: "Smokey the Bear," "toke"
Punch word: "Tokey the Bear"
Punch word root and definition: "Smokey the Bear," "advertising icon"
Completion of joke with bridge: "That's why a new advertising icon is Tokey the Bear."

Generation of Joke of Type #4

The two topic keywords selected as in FIG. 4 can also be used to generate a joke of Type #4, in which the punch word is a word chunk such as a noun phrase chunk. First a list of related words and word chunks is compiled for topic keyword A and a separate list of related words and word chunks is created for topic keyword B. As before, an exemplary embodiment might use the "most_similar" function of GOOGLE's pretrained WORD2VEC model trained on GOOGLE NEWS data to build the lists of related words and word chunks. Related, associated, or most similar words and word chunks for each topic keyword, including words and word chunks that occur most frequently in contexts where the topic keyword appears, may also be selected using any of the methods described for step 512.

Then the punch words are created by substituting a word related to one topic keyword for one or more words contained in a word chunk related to the other topic keyword. The word being inserted and the word or words it replaces are the same part of speech—nouns or adjectives for example—and also have adequate wordplay. The adequacy of the wordplay between the word being inserted into the word chunk and the word or words it is replacing is determined by calculating their wordplay score as shown in FIG. 6.

After the punch words have been assembled, a bridge is created and is used to connect the topic sentence to the punch words to complete the joke. FIG. 8 shows an exemplary embodiment of the process of creating a bridge and outputting a joke. The punch word root definition and punch word are added to the selected bridge template in step 818, assembling and completing the joke. In other implementations, a bridge that does not incorporate a punch word root definition may be selected, possibly at random, from a list stored in a database and used in connection with the punch word to assemble the completed joke. A filler word or filler words may also be added to the selected bridge as described earlier. The completed joke is output in step 820. In implementations the wordplay score of the completed joke is the wordplay score associated with the words that were substituted for one another to create the punch words.

Example 1 of Generation of Joke of Type #4

Topic sentence: "Yesterday seven more cases of measles were linked to Disneyland."
Topic keywords selected: "measles," "Disneyland"
Words and word chunks related to the topic keywords: "rash," "Splash Mountain"
Punch words: "Rash Mountain"
Punch word root and definition: "Splash Mountain," "log-flume ride"
Completion of joke with bridge: "So that means a new log-flume ride is Rash Mountain."

Example 2 of Generation of Joke of Type #4

Topic sentence: "Two Wisconsin men were arrested in the theft of 100,000 diapers."
Topic keywords selected: "theft," "diapers"
Words and word chunks related to the topic keywords: "petty larceny," "potty"
Punch words: "potty larceny"
Punch word root and definition: "petty larceny," "crime"

Completion of joke with bridge: "They call the new crime potty larceny."

Example 3 of Generation of Joke of Type #4

Topic sentence: "A teacher was fired for leading third graders in the Nazi salute."
Topic keywords selected: "third graders," "Nazi salute"
Words and word chunks related to the topic keywords: "Duck, Duck, Goose," "goose-step"
Punch words: "Duck, Duck, Goose-step"
Punch word root and definition: "Duck, Duck, Goose," "children's game"
Completion of joke with bridge: "Sounds like the new children's game is Duck, Duck, Goose-step."

Confidence Ranking and Joke Output

Figure 9:
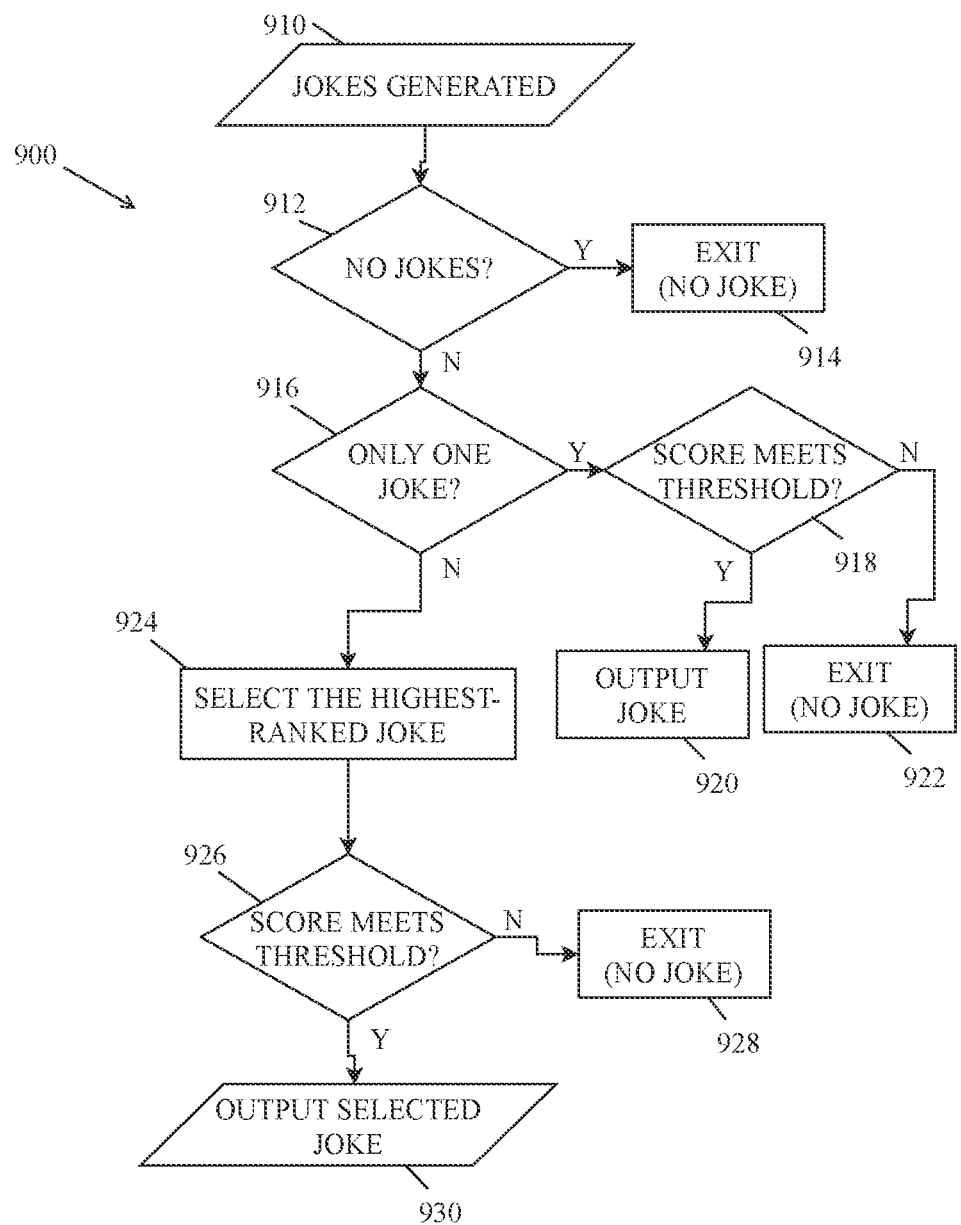
FIG. 9 illustrates a flowchart of a method of ranking and outputting one of multiple generated jokes using the system of FIG. 14.

In implementations methods for generating jokes may include generating multiple jokes using the same topic keywords and then determining which joke has the highest ranking and outputting that joke. For example, FIG. 9 shows an exemplary embodiment of a process (method) 900 of ranking and outputting one of multiple jokes generated by the above methods. Block 910 represents the jokes of Type #1, Type #2, Type #3, and/or Type #4 that were generated. In alternative embodiments, the bridge words for those jokes may have been generated by a machine learning language model as shown in FIGS. 10, 11, 12, and 13.

Decision step 912 determines whether the method has created any jokes. If the method has created no jokes then the method exits, as shown at step 914, and the method will not output a joke. Decision step 916 determines whether the method has created only one joke. If the method has created only one joke, step 918 tests whether the wordplay score of the joke meets a preset threshold (which in implementations may be set by the admin). If it does, that means the method has sufficient confidence in the joke and the joke is output in step 920. If the wordplay score of the joke does not meet the preset threshold then the method exits, as shown at step 922, and no joke is output.

In step 924 any jokes of Type #1, Type #2, Type #3, and/or Type #4 are ranked according to their wordplay score and the joke that is ranked highest is selected. Step 926 tests whether the wordplay score of the selected joke meets a preset threshold (which in implementations may be set by the admin). If the wordplay score of the selected joke does not meet the preset threshold then the method exits, as shown at step 928, and no joke is output. If the wordplay score of the selected joke does meet the preset threshold, that means the method has sufficient confidence in the selected joke and the selected joke is output in step 930.

Alternative Embodiment of Method Using Machine Learning

In generating the jokes of Type #1, Type #2, Type #3, and Type #4 as described above, bridges were added that incorporated pre-written word templates or pre-written word strings selected from lists stored in the one or more databases of the system (or stored in remote databases accessed by one or more servers of the system through the Internet). In alternative embodiments, the bridge for jokes of those types will not be pre-written or "canned" but will be generated by a language model such as a machine learning language model. A machine learning language model is a natural language processing model which learns to predict the next word in a sentence. Bridges generated by a machine learning language model may allow the jokes generated by the method to be more varied and therefore more natural-sounding in the context of a lengthy interaction with a user.

Figure 10:
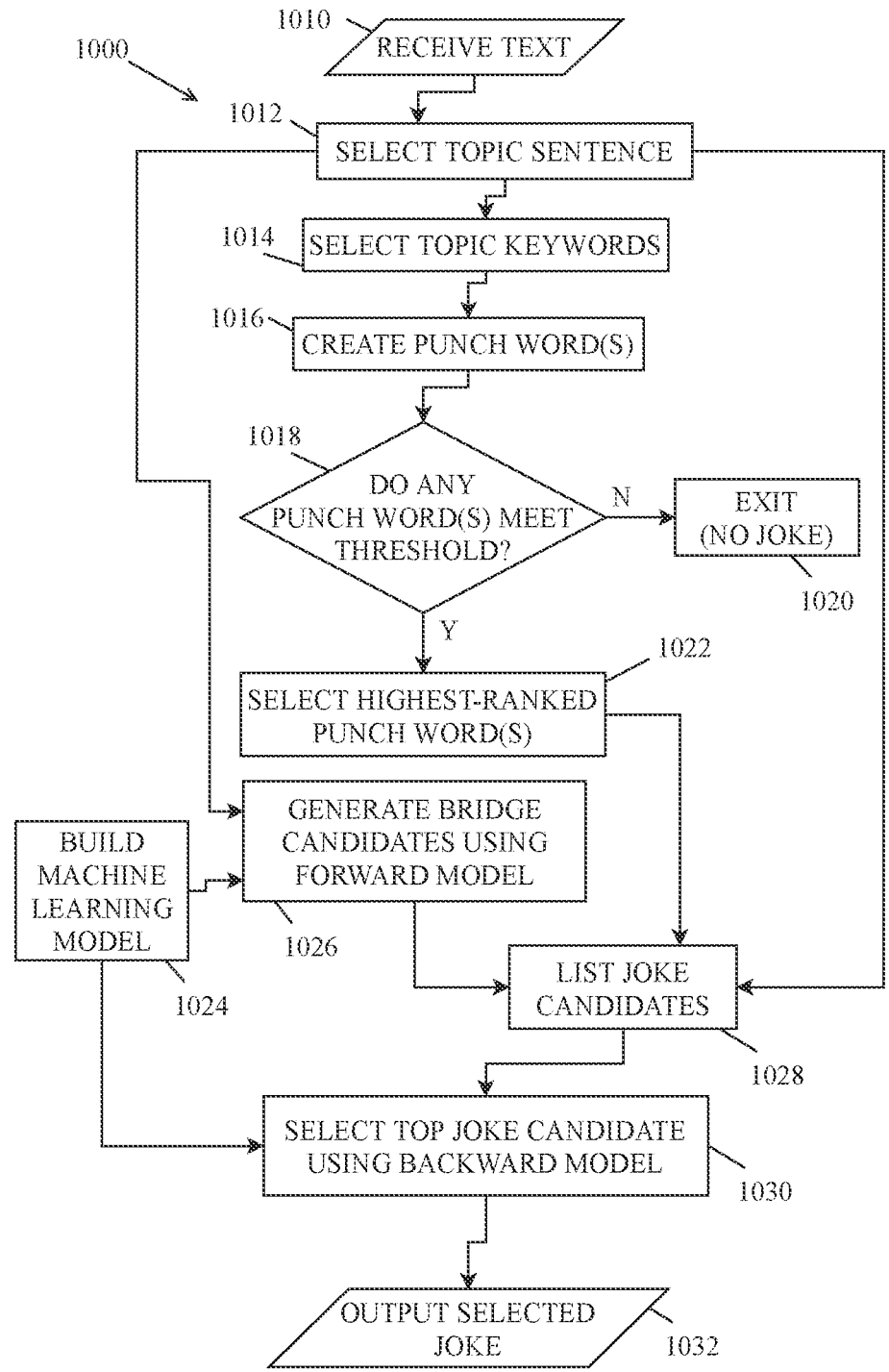
FIG. 10 illustrates a flowchart of an example of a machine learning method used for generating jokes using the system of FIG. 14.

FIG. 10 illustrates an example high-level flowchart of an alternative embodiment of a method 1000 for generating jokes, which jokes may be original, contextually integrated jokes based on text that has been obtained from an external source (such as the external sources described above, including any user devices and/or any news or other website from which the system may receive/gather information). At step 1010, the method receives text from a human interaction device and/or from a news source/website etc.; this process is the same process as that described for steps 310 through 314 inclusive. At step 1012, the method selects from that text a topic sentence from which the joke generation process will begin; this process is the same process as that described for steps 316 through 320 inclusive. From that topic sentence, a pair of topic keywords is selected in step 1014; this process is the same process as that described for steps 410 through 446 inclusive. From those topic keywords, a punch word or punch words which may trigger a laugh from the user are created in step 1016. These punch words may be created as described for steps 510 through 520 inclusive, as described for steps 710 through 730 inclusive, as described for the generation of a joke of Type #3 or of Type #4, or by any other process that creates a surprising or unexpected word or phrase based on the topic keyword(s) selected from a topic sentence. Decision step 1018 determines whether the wordplay score of any punch word(s) meets a preset threshold (which in implementations may be set by the admin). If the wordplay score of none of the punch word(s) meets the preset threshold then the method exits, as shown in step 1020, and no joke is output. If the wordplay score of any of the punch word(s) meets the preset threshold then step 1022 selects the punch word(s) with the highest-ranked wordplay score.

In step 1024 a machine learning language model is built. The forward version of the machine learning language model is used with a forward beam search strategy in step 1026 to generate a list of candidates for bridges that may naturally connect the topic sentence to the punch word(s). In step 1028, the topic sentence from step 1012, the list of bridge candidates from step 1026, and the punch word(s) selected in step 1022 are concatenated in that order to form a list of candidates for jokes. In step 1030 the backward version of the machine learning language model is used to select the top, most likely, joke candidate from the list of joke candidates compiled in step 1028. The top joke candidate is output in step 1032. In an exemplary embodiment, the text source output in step 1032 may then be used as the input to a text-to-speech converter such as, for example, GOOGLE CLOUD TEXT-TO-SPEECH, though in other implementations it could simply be visually displayed on a user interface of an end user's computing device/phone etc. The selected joke may accordingly be delivered in audio format or visual format to the user.

An alternative embodiment of the process outlined in FIG. 10 may use the forward version of the machine learning language model with a forward beam search strategy and the backward version of the machine learning language model with a backward beam search strategy and may alternately perform forward beam searches starting with the topic sentence and backward beam searches starting with the punch word(s), searching through all possible bridge candidates up to a maximum specified bridge length and determining which bridge candidate maximizes the probability of the entire joke.

Another alternative embodiment of the process outlined in FIG. 10 may use a bidirectional machine learning language model to perform the forward or backward searches. Still another alternative embodiment of the process outlined in FIG. 10 may use a pretrained machine learning language model to generate the bridge candidate(s) forward from the topic sentence, backward from the punch word(s), or in both directions. Before being used to generate the bridge candidate(s), the pretrained machine learning language model may be fine-tuned on an additional dataset or datasets, by non-limiting example, a dataset of jokes.

Figure 11:
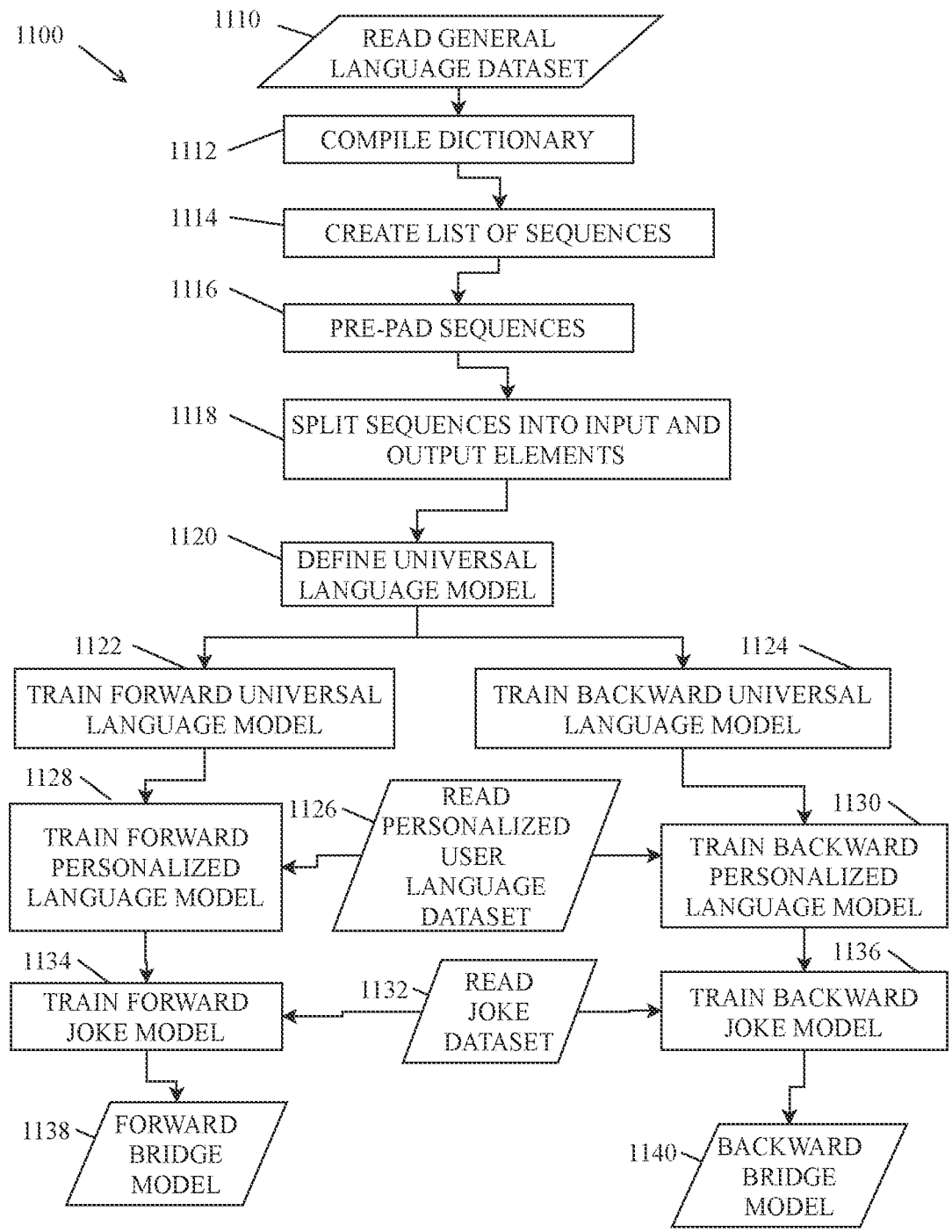
FIG. 11 illustrates a flowchart of an example of a method of building machine learning language models for use in joke generation methods using the system of FIG. 14.

To illustrate in more detail the process broadly outlined in FIG. 10, detailed examples of block diagrams that describe steps 1024 through 1032 of this alternative embodiment of the method follow. FIG. 11 shows an exemplary embodiment of step 1024, which is the process (method) 1100 of building the machine learning language model for the method of FIG. 10. Again, some or all of the following steps may be performed at the user device level using installed software and other aspects may be performed using the DB server and/or other servers of the system. In step 1110, a general (and in implementations a very large) language dataset is read into the system. In an exemplary embodiment, this dataset may be Stephen Merity's WIKITEXT-103 language modeling dataset, which is a collection of over 100 million words extracted from the set of verified Good and Featured articles on the English WIKIPEDIA websites. A general and very large dataset such as this may result in an English language model with the world knowledge and the deep understanding of grammar, semantics, and other elements of natural language that are useful for the method to generate effective bridges for jokes.

Once the very large language dataset is read into the system it is prepared for use in training a universal language model. In step 1112, in an exemplary embodiment, the dataset text is tokenized and a dictionary compiled which comprises the vocabulary of the dataset text and the integer index of each word in the vocabulary. In an exemplary embodiment, this text preprocessing and other tasks of building and training the language models and using them to generate jokes may be accomplished using the neural network library KERAS with the machine learning library TENSORFLOW as the backend engine. In step 1114, in an exemplary embodiment, the lines of dataset text are turned into sequences of index integers which are then used to create a list of separate sequences of varying length to be used in training the models. In step 1116, in an exemplary embodiment, the sequences in the list are pre-padded with zeroes so that they are all the same length as the longest sequence in the list. And in step 1118, in an exemplary embodiment, the pre-padded sequences are converted to the form necessary for use in training the language model. In an exemplary embodiment, the NUMPY library for PYTHON is used to create an array from the list of pre-padded sequences and each sequence is split into input and output elements, where the output element is the last element in the sequence and is converted to a binary class matrix marking the corresponding word in the vocabulary.

Now that the training data has been prepared, the universal language model is defined in step 1120. In an exemplary embodiment, the universal language model may be a unidirectional recurrent neural network (RNN) such as a long short-term memory network (LSTM). In an exemplary embodiment, the LSTM model may have an embedding layer, multiple LSTM layers, and an output layer that uses the softmax activation function, and may also have an argument which determines whether the model reverses the input sequences. In step 1122, the universal language model is trained using the prepared training data that has not been reversed. This yields a forward universal language model that can be used to predict the next word in a sentence. In step 1124, the universal language model is trained using the prepared training data that has been reversed. This yields a backward universal language model that can be used to predict the previous word in a sentence.

In an alternative embodiment, instead of building universal language models as described for steps 1110 through 1124 inclusive, where the word embeddings are learned by the models themselves during training, the method may use for universal language models a model or models with pretrained word embeddings that have been learned elsewhere. In an exemplary embodiment, the forward universal language model may have an embedding layer that has been loaded with an embedding matrix computed from the GLOVE (Global Vectors for Word Representation) model that has been trained on a year 2014 dump of English WIKIPEDIA websites and GIGAWORD 5; further learning by the forward universal language model would then take place on top of that pretrained embedding. In other alternative embodiments, a version of GOOGLE's BERT (Bidirectional Encoder Representations from Transformers) that has been pretrained on English WIKIPEDIA websites and BOOKSCORPUS, or a version of another pretrained language model, may be used as a forward universal language model or a backward universal language model.

In step 1126 a personalized user language dataset may be obtained, read into the system, and prepared as in steps 1112 through 1118 inclusive for use in performing transfer learning with the forward universal language model and/or with the backward universal language model. In an exemplary embodiment, the personalized user language dataset may be obtained by scraping the user's most frequently visited websites, websites in the user's online search and browsing history, social media posts made by the user, social media posts "liked" by the user, the user's email or text messages, the user's communications with an AI virtual assistant, and/or other personal data sources. In step 1128, the personalized user language dataset may be used to refine the forward universal language model, which may have been pretrained in step 1122 on the more general language dataset. In this way a personalized language model may be developed more quickly that can more skillfully predict words that reflect the user's knowledge base, beliefs, and attitudes. In step 1130, the personalized user language dataset may also be used in a similar way to refine the backward universal language model, which may have been pretrained in step 1124 on the more general language dataset.

In step 1132 a joke dataset may be obtained, read into the system, and prepared as in steps 1112 through 1118 inclusive for use in performing additional transfer learning with the forward personalized language model and/or with the backward personalized language model. In an exemplary embodiment, the joke dataset is obtained by scraping websites that aggregate jokes that have been performed in the opening monologues of late-night comedy/talk television shows. Those monologue jokes may be useful for training language models to generate jokes because the monologue jokes tend to be relatively short and tend to have structures that have been devised by professional comedy writers so as to maximize the humor potential of the jokes. In step 1134, the joke dataset may be used to fine-tune the forward personalized language model, which was built in step 1128, for the objective of building a forward joke model. This forward joke model, which may help to generate effective bridges for jokes, is output as the forward bridge model in step 1138. In step 1136, the joke dataset may also be used to fine-tune the backward personalized language model, which was built in step 1130, for the objective of building a backward joke model. This backward joke model, which may help to generate effective bridges for jokes, is output as the backward bridge model in step 1140. In alternative embodiments, the joke dataset may be used to train or fine-tune the forward universal language model, the backward universal language model, or any other language model used in the joke generation process.

Figure 12:
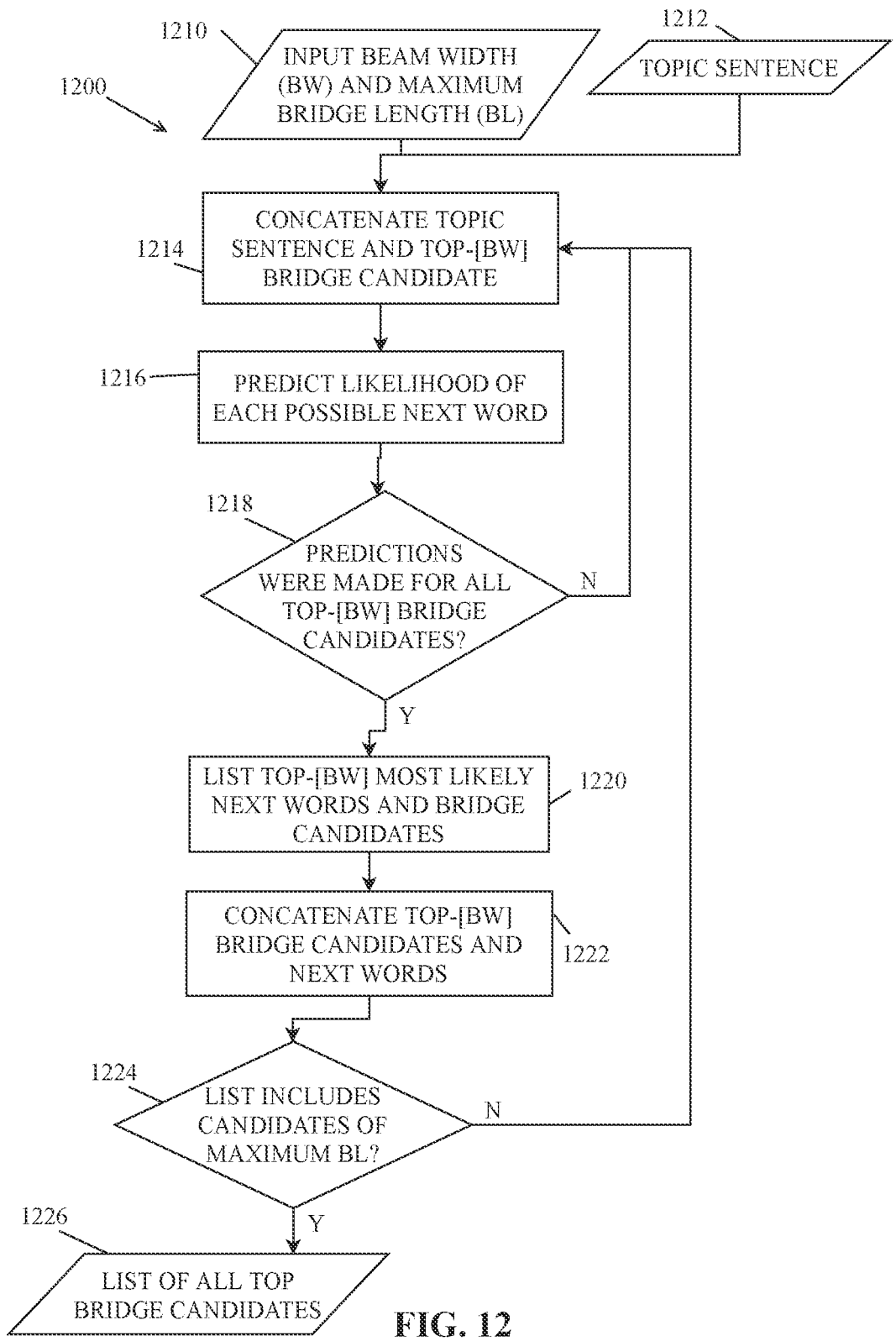
FIG. 12 illustrates a flowchart of an example of a method of using machine learning language models to generate bridge candidates using the system of FIG. 14.

Now that the forward bridge model and the backward bridge model have been built, they are used in the joke generation process as outlined in a high-level way in FIG. 10, steps 1026 through 1032 inclusive. To illustrate step 1026 in more detail, FIG. 12 shows an exemplary embodiment of the process (method) 1200 of using the forward bridge model to generate a list of some of the bridges most likely to follow a given topic sentence. A forward beam search strategy is used to return a list of the bridges that are predicted to be the most likely to follow a given topic sentence given a specified beam width and a specified maximum length of the bridge in words. In implementations, the beam width and the maximum bridge length in words may be preset or may be input by the admin in step 1210 using the admin computer. In step 1212, the topic sentence that was output at step 320 by the process shown in FIG. 3 is obtained. In step 1214, the topic sentence and one of the top-[beam width] bridge candidates are concatenated in the order of topic sentence first, then bridge candidate; if no bridge candidates have been identified yet at this point in the process, the topic sentence is not concatenated with anything. In step 1216, the forward bridge model is used to predict the probability that each word in the dictionary of the model will follow the concatenation of the topic sentence and the current top-[beam width] bridge candidate, if any. Decision step 1218 shows that steps 1214 and 1216 are repeated until the topic sentence and each of the top-[beam width] bridge candidates have been concatenated and the forward bridge model has been used to calculate the probability that each word in the model dictionary would follow each concatenation of topic sentence and top-[beam width] bridge candidate.

In step 1220, a list is made of the top-[beam width] most likely next words in the bridge as predicted by the forward bridge model, together with the bridge candidates that, when concatenated with the topic sentence, were used to predict those top-[beam width] most likely next words. In step 1222, each of the top-[beam width] most likely next words in the bridge is concatenated to the end of whichever bridge candidate was used to predict it, yielding a list of [beam width] new bridge candidates, which are added to a list of all top bridge candidates. Decision step 1224 shows that steps 1214 through 1222 inclusive are repeated, each time concatenating the topic sentence with top-[beam width] bridge candidates that are one word longer than the previous top-[beam width] bridge candidates, and each time adding [beam width] new bridge candidates to the list of all top bridge candidates; steps 1214 through 1222 inclusive are repeated until the length of each of the [beam width] newest bridge candidates that were added to the list of all top bridge candidates is the maximum bridge length. The list of all top bridge candidates generated by this process is output in step 1226; the number of bridge candidates on that list is equal to the product of the beam width and the maximum bridge length. The steps shown in FIG. 12 (as with steps shown in the other drawings) may be performed by one or more of the aforementioned servers of the system 1400.

Figure 13:
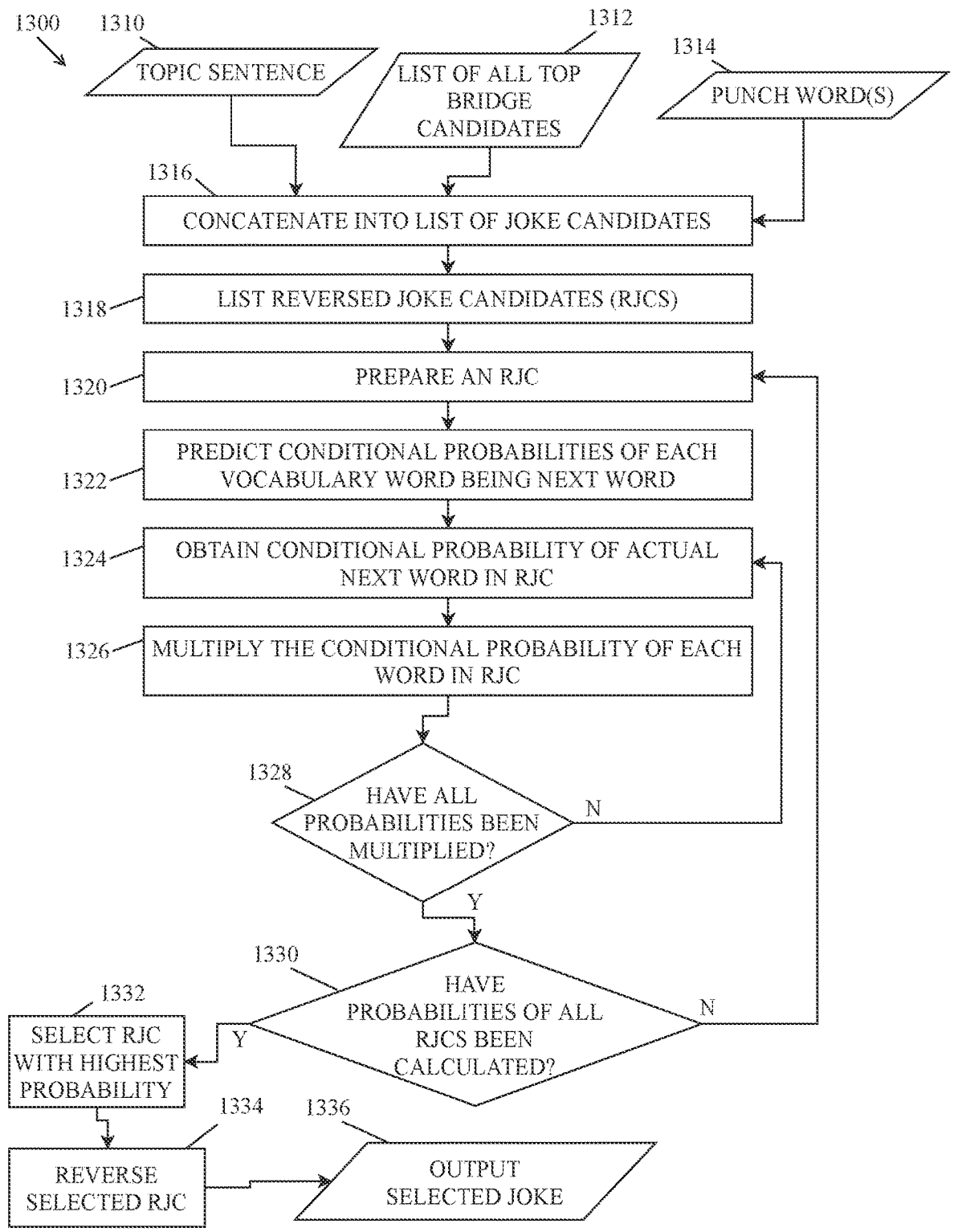
FIG. 13 illustrates a flowchart of an example of a method of outputting a best joke generated with machine learning using the system of FIG. 14.

Now to illustrate steps 1028 through 1032 in more detail, FIG. 13 shows an exemplary embodiment of the process (method) 1300 of using the backward bridge model to choose from the list of all top bridge candidates the best bridge to smoothly connect to the given topic sentence any punch word or punch words that were generated from the topic sentence using the methods as described earlier. Although in implementations the topic sentence, the top bridge candidates, and the punch word(s) may still all be in the form of sequences of index integers, "word" will be used at times instead of "index integer" throughout this description as a convenience.

The topic sentence that was output at step 320 by the process shown in FIG. 3 is obtained in step 1310. The list of all top bridge candidates that was output at step 1226 by the process shown in FIG. 12 is obtained in step 1312. And the punch word(s), if any, that were generated and selected by the process outlined in steps 1016 through 1022 inclusive are obtained in step 1314. In an alternative embodiment, when the punch word(s) have been created in the process of generating a joke of either Type #3 or Type #4, the associated punch word root may be used as the punch word(s) in steps 1314 through 1332 inclusive.

In step 1316, the topic sentence, the punch word(s), and each top bridge candidate in turn are concatenated in the order of topic sentence, bridge candidate, punch word(s), thereby forming a list of joke candidates. Each joke candidate in that list is reversed in step 1318, forming a list of reversed joke candidates.

In step 1320, one of the reversed joke candidates is taken from the list of reversed joke candidates and prepared for input into the backward bridge model that was output in step 1140. In an exemplary embodiment, the reversed joke candidate is prepared by pairing each word in the reversed joke candidate with the list of words preceding it in the reversed joke candidate, that list of words having been pre-padded with zeroes, and then converting the two elements of each pair into arrays using the NUMPY library for PYTHON.

In step 1322, the backward bridge model output in step 1140 is used to predict the conditional probability that each word in the vocabulary of the model will be the next word at each position in the reversed joke candidate, given the words that precede that position in that reversed joke candidate.

In step 1324, the conditional probability of occurrence of a word that is actually present in the reversed joke candidate, given the words that precede it in the reversed joke candidate, is obtained from the conditional probability predictions made by the backward bridge model in step 1322. In step 1326, the conditional probability obtained for the word in step 1324 is multiplied by the product of the conditional probabilities of occurrence of the words that precede it, using the chain rule for probability. The chain rule for probability may be represented as follows, where P is the probability of joint occurrence and $A_1, \ldots, A_n$ is an indexed collection of random variables, words in this case:

$$P(A_n, \ldots, A_1) = P(A_n | A_{n-1}, \ldots, A_1) * P(A_{n-1}, \ldots, A_1).$$

In an exemplary embodiment, the logs of the probabilities are added instead of the probabilities being multiplied because the probabilities may be very small. Decision step 1328 shows that steps 1324 and 1326 are repeated for each word in the reversed joke candidate until the probability of occurrence of the entire reversed joke candidate is computed using the chain rule for probability.

Decision step 1330 shows that steps 1320 through 1328 inclusive are repeated until the probability of occurrence of each and every reversed joke candidate has been calculated using the backward bridge model and the chain rule for probability. In step 1332, the reversed joke candidate that has the highest probability of occurrence is selected. This is the reversed joke candidate that contains the top bridge candidate that has been determined to most naturally link the given topic sentence to the given punch word(s). In step 1334 this highest-probability reversed joke candidate is reversed back to its forward state and a filler word or filler words may be added as described earlier. If a punch word root has been used as the punch word(s) in steps 1314 through 1332 inclusive, the punch word(s) are then substituted for the punch word root in the selected joke in step 1334. The selected joke is output in step 1336.

In an exemplary embodiment, text source 1336 may then be used as the input to a text-to-speech converter such as, for example, GOOGLE CLOUD TEXT-TO-SPEECH, or it may alternatively be displayed as text on a user interface of an end user's computing device/phone, etc. The selected joke may accordingly be delivered in audio format or visual format to the user. In implementations, the text-to-speech converter may be trained or fine-tuned so as to generate speech in a manner that may increase the funniness of the spoken joke. By non-limiting example, the text-to-speech converter may be trained or fine-tuned to generate output that incorporates certain acoustic, auditory, or prosodic features of spoken jokes such as the loudness of certain parts of the joke, the intonation of certain parts of the joke, the pauses at certain points in the joke, the speech rate of certain parts of the joke, the pitch of certain parts of the joke, and so forth. In implementations these acoustic, auditory, or prosodic features of spoken jokes may be learned or extracted from audio samples of people uttering jokes, or set by the admin, or obtained by some other means.

An alternative embodiment of the process outlined in FIG. 13 may use a language model such as, by non-limiting examples, a version of GOOGLE's BERT, a version of XLNET (from researchers at CARNEGIE MELLON University and GOOGLE), or a version of OPENAI's GPT-2 or GPT-3 to fill with a bridge the gap between the given topic sentence and any punch word(s) that were generated from the topic sentence using the methods as described earlier. A filler word or filler words may be added as described earlier to the bridge that was generated by the language model.

The methods disclosed herein are based on using wordplay to link two topic keywords and words related to them and thereby produce a humorous effect. Alternative implementations of these methods may link two topic keywords and words related to them in ways that do not depend on wordplay. As one example, the links between two topic keywords and words related to them could be created using reasoning informed by common knowledge and by the anticipated knowledge, beliefs, and attitudes of the intended audience of the joke to be generated. Exemplary embodiments might use the ALLEN INSTITUTE for AI's COMeT knowledge base construction engine or ATOMIC atlas of common sense reasoning or another machine reasoning system or language model to perform the reasoning tasks required to create links between two topic keywords and words related to them. Other embodiments might create a link between two topic keywords and words related to them by using a graph database, knowledge graph, relational database, or common sense knowledge base such as, by non-limiting example, CYC (created by Douglas Lenat). Still other implementations might use a language model like, by non-limiting examples, a version of GOOGLE's BERT or a version of OPENAI's GPT-3 to convert a topic sentence or sentences into a set of punch words, a set of bridge words, or a set of both bridge words and punch words, where the punch words or the bridge words may or may not depend on wordplay, or to generate as a single sequence a joke consisting of a topic sentence or sentences, a set of bridge words, and a set of punch words.

Figure 15:
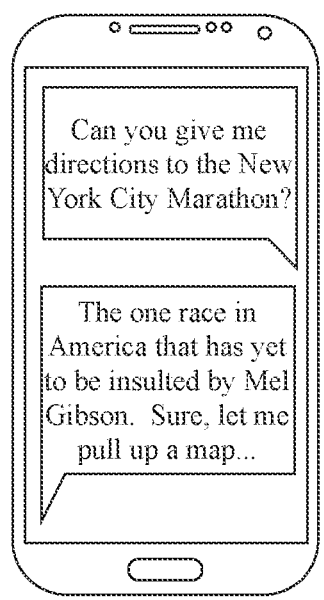
FIG. 15 illustrates an example of an interface of an end user computing device displaying a joke delivered by one or more elements of the system of FIG. 14.

The methods disclosed herein may be used for joke generation and recognition in a variety of settings. For example, the system in implementations may simply begin a joke with an introductory sentence (based on some news headline or the like) and then deliver the generated joke. This implementation could be used, for example, by a robot or some computing device delivering a standup comedy routine, where the routine is not necessarily affected by any audience input. In other implementations, however, the system may generate jokes in response to user input, for example a user speaking some sentence or group of sentences or asking some question either in audio or text format to APPLE's SIRI, GOOGLE ASSISTANT, AMAZON'S ALEXA, a chatbot, app, website, or the like, and the virtual assistant, chatbot, or the like delivering a joke in response (or a joke in addition to the requested information) in audio and/or text format. (This implementation could also be used for an interactive standup comedy routine.) An example of this is shown in FIG. 15, in which the user asks a virtual assistant (such as APPLE's SIRI, AMAZON'S ALEXA, or GOOGLE ASSISTANT) for directions to a marathon and the virtual assistant delivers a joke related to the request, but also provides a response to the request for information. In FIG. 15 this is shown as a typed interaction—the user typing a question and the virtual assistant responding similarly with a text response—but as indicated above in implementations such an interaction could be partially or fully in audio format, such as with the end user asking a question in audio format to the virtual assistant and/or the virtual assistant delivering the joke and/or the requested information in audio format (or some combination of audio and visual).

In this way the systems and methods could be used as a module to give a virtual assistant or chatbot a more engaging personality, which may make the user more comfortable when interacting with it. The systems and methods could also be used to give a social robot a sense of humor, which would make the robot more humanlike and enable the robot to be a more congenial companion, which would help reduce the user's loneliness and, in that way, may have significant health benefits. The systems and methods do not need to be used in standup comedy, virtual assistant, chatbot, or social robot settings, however, and may generate jokes for any type of setting. Still another implementation could be a humor-challenged user having a concealed earpiece and microphone which allow the user to deliver ad-libbed jokes based on his/her contextual setting and/or real-time dialogue, the generated jokes, or perhaps only the generated punch word (s), being presented to him/her discreetly via the earpiece. Such systems and methods could be used in all sorts of social gatherings, on dates, in public speaking, and so forth, and may allow the user to not only have an immediate boost of confidence but, over time, may assist the user in the long-term development of a better sense of humor.

Any implementation of the joke generating and recognizing systems may be integrated with an affective sensing system, an emotion detection system, or a sentiment analyzer, as a non-limiting example the SENTIMENT ANALYSIS application of GOOGLE CLOUD NATURAL LANGUAGE API, which would evaluate the user's emotional state and detect whether joke-making, laughter, or an amused reaction would be acceptable to the user at that particular time. If the affective sensing system, emotion detection system, or sentiment analyzer predicts that the user may not react favorably to a joke, laugh, or amused reaction at that time, the joke generating and recognizing systems might refrain from outputting to the user any joke, laugh, or amused reaction. The joke generating and recognizing systems may also refrain from outputting a joke, laugh, or amused reaction to the user if it predicts, based on previous interactions with the user or with similar users, that the user would not appreciate a joke, laugh, or amused reaction at that time.

As indicated to some extent above, a system implementing these joke generating and recognizing methods may include one or more or all of the following: any number of components communicatively coupled together, including one or more admin computing devices, one or more admin servers, one or more application servers, one or more database servers, one or more databases, one or more third party databases, one or more third party database servers, one or more third party application servers, one or more third party datasets or libraries, one or more web servers, a telecommunications network, one or more user devices including mobile phones, tablets, desktop computers, laptops, smart watches, smart speakers, smart glasses, robots, other human interface devices, and the like; each device/component may have its own computing elements including storage, computer processors, software, and additional components as described; and the different steps of the methods described herein may be divvied up between the different components in a variety of ways between the different servers, computing devices, and so forth, as determined by the practitioner of ordinary skill in the art.

In implementations methods for generating and recognizing jokes as described herein include generating and recognizing jokes that include the following elements organized in the following order: topic word(s)/keyword(s), bridge word(s), and punch word(s); or topic(s), bridge word(s), punch word(s).

In implementations methods and systems disclosed herein may be used to help provide a conversational chatbot with a sense of humor. In implementations the systems and methods may be used in connection with existing conversational capabilities of a virtual assistant (like APPLE'S SIRI, AMAZON'S ALEXA, or GOOGLE ASSISTANT). In other words, the methods/systems herein may be used as an add-on to the existing virtual assistant and use whatever interface the virtual assistant uses. In such an embodiment the methods/systems may enable the virtual assistant to ad-lib occasional jokes and output them to the user, and to recognize jokes and output laughs and amused reactions to the user, along with all the other output that the virtual assistant would normally be supplying. In other implementations, the systems and methods may be used as add-ons to an existing uni-modal or multi-modal dialogue system or chatbot, dialogue agent, entertainment chatbot, chit-chat chatbot, conversational model, conversational system, or conversational agent like, by non-limiting examples, GOOGLE's MEENA, FACEBOOK AI RESEARCH'S BLENDER, and MICROSOFT'S DIALOGPT. In such an embodiment, the methods/systems herein may enable the dialogue system or chatbot to ad-lib occasional jokes and output them to the user, and to recognize jokes and output laughs and amused reactions to the user, along with the other output that the chatbot would normally be supplying.

In places where the phrase "one of A and B" is used herein, including in the claims, wherein A and B are elements, the phrase shall have the meaning "A or B." This shall be extrapolated to as many elements as are recited in this manner; for example the phrase "one of A, B, and C" shall mean "A, B, or C," and so forth.

In places where the description above refers to specific embodiments of systems and methods for generating and recognizing jokes, one or more or many modifications may be made without departing from the spirit and scope thereof. Details of any specific embodiment/implementation/interface described herein may, wherever possible, be applied to any other specific implementation/embodiment/interface described herein.

Systems and Methods for Recognizing Jokes

Additional systems and methods for recognizing jokes will now be described. The following joke recognition methods can be implemented using joke recognizing systems such as those shown in FIGS. 1 and 14. Embodiments of systems for recognizing jokes may include one or more of the elements described above in the Summary section and in FIGS. 1 and 14 and the description of those figures herein.

Figure 16:
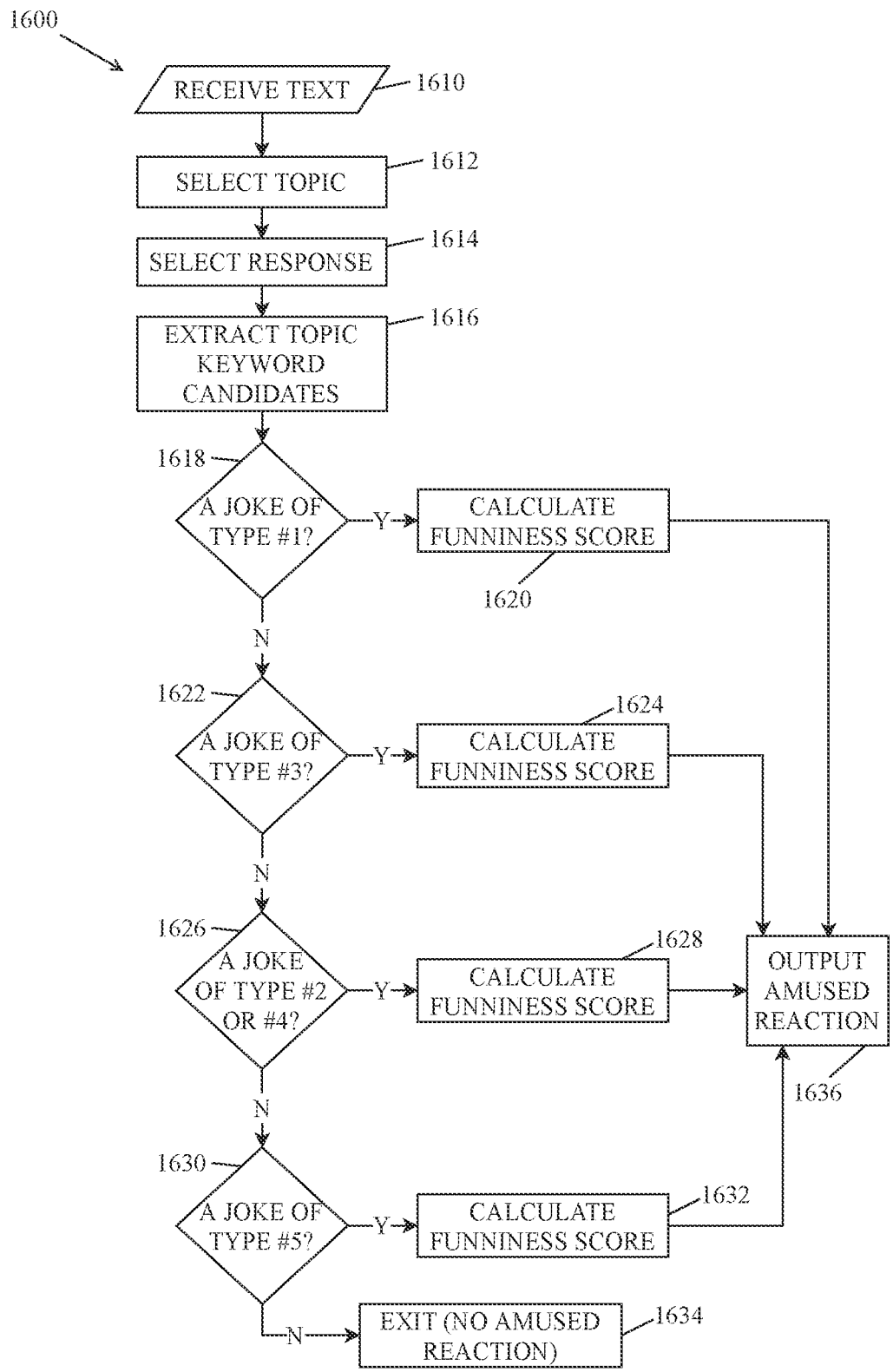
FIG. 16 illustrates a flowchart of an example of a method for recognizing and reacting to jokes using the system of FIG. 14.

FIG. 16 illustrates an example high-level flowchart of a method 1600 for recognizing jokes, which jokes may be based on text that has been received from sources external or internal to the server(s) of the system. In this exemplary embodiment, the jokes to be recognized comprise two parts, in this order: A) the topic; and B) the response, which is intended to surprise the intended audience for the response by introducing an inconsistency that turns out to be harmless and thereby to cause the audience to laugh. Both the topic and the response may be received from sources external or internal to the server(s) of system 1400 (for example from end user devices 1416, 1422, 1424, 1426, 1440, 1446, 1452, 1458, 1460, 1462, and/or from one or more websites and/or from one or more other text sources) or may be generated or supplied by one or more of the servers of the system in conjunction with the one or more data stores or databases 1408. As described in steps 310 and 312, in exemplary embodiments, the received text may be the output of a language model or the output of a speech-to-text converter such as GOOGLE CLOUD SPEECH-TO-TEXT, which would be the case if, in an exemplary embodiment, a user were speaking to one of the user interaction devices shown in FIG. 14 or if one of the interaction devices shown in FIG. 14 were receiving speech input from some other audio source.

At step 1610, one or more servers of the system receive text from external or internal sources, by non-limiting example text received from end user devices 1416, 1422, 1424, 1426, 1440, 1446, 1452, 1458, 1460, 1462, and/or from one or more websites and/or from one or more other text sources and/or text generated or supplied by one or more of the servers of the system in conjunction with the one or more databases 1408. At step 1612, the method selects from that received text a topic from which the joke recognition process will begin. In an exemplary embodiment, the topic consists of a sentence or sentences supplied by a user or supplied to a user, possibly by one or more of the servers of the system in conjunction with the one or more databases 1408. At step 1614, the method selects a response from the text received in step 1610, taking into account the topic selected in step 1612. In an exemplary embodiment, the response consists of a sentence or sentences that were received from the user immediately after the topic was supplied to the user. From the topic selected in step 1612, a list of topic keyword candidates is extracted in step 1616.

The process of extracting topic keyword candidates from a topic is as described in steps 410 through 430 inclusive. At decision step 1618, the method uses the topic, response, and topic keyword candidates to determine whether it recognizes a joke of Type #1. If it does, then the funniness score of the joke of Type #1 is calculated in step 1620 and an amused reaction is output in step 1636. If the method does not recognize a joke of Type #1, then at decision step 1622 the method uses the topic, response, and topic keyword candidates to determine whether it recognizes a joke of Type #3. If it does, then the funniness score of the joke of Type #3 is calculated in step 1624 and an amused reaction is output in step 1636. If the method does not recognize a joke of Type #3, then at decision step 1626 the method uses the topic, response, and topic keyword candidates to determine whether it recognizes a joke of Type #2 or a joke of Type #4. If it does, then the funniness score of the joke of Type #2 or Type #4 is calculated in step 1628 and an amused reaction is output in step 1636. If the method does not recognize a joke of Type #2 or Type #4, then at decision step 1630 the method uses the topic, response, and topic keyword candidates to determine whether it recognizes a joke of Type #5. If it does, then the funniness score of the joke of Type #5 is calculated in step 1632 and an amused reaction is output in step 1636. If the method does not recognize a joke of Type #5, then the method exits, as shown at step 1634, and the method will not output an amused reaction. To illustrate in more detail the method broadly outlined in FIG. 16, detailed examples of block diagrams that describe various steps in the method follow. Some or all of the steps shown in FIG. 16 (as with steps shown in the other drawings) may be performed at the user device level using installed software and other aspects may be performed using the DB server and/or other servers of the system 1400. The specific order here, of determining whether there is a joke of Type #1, then a joke of Type #3, etc., can be different in other implementations. For example in some implementations the system could first determine if there is a joke of Type #2 or #4, then whether there is a joke of Type #3, then whether there is a joke of Type #5, and so forth—any order is possible. In implementations the system could, in parallel, determine simultaneously whether there is a joke of any given type.

Recognizing a Joke of Type #1

Figure 17:
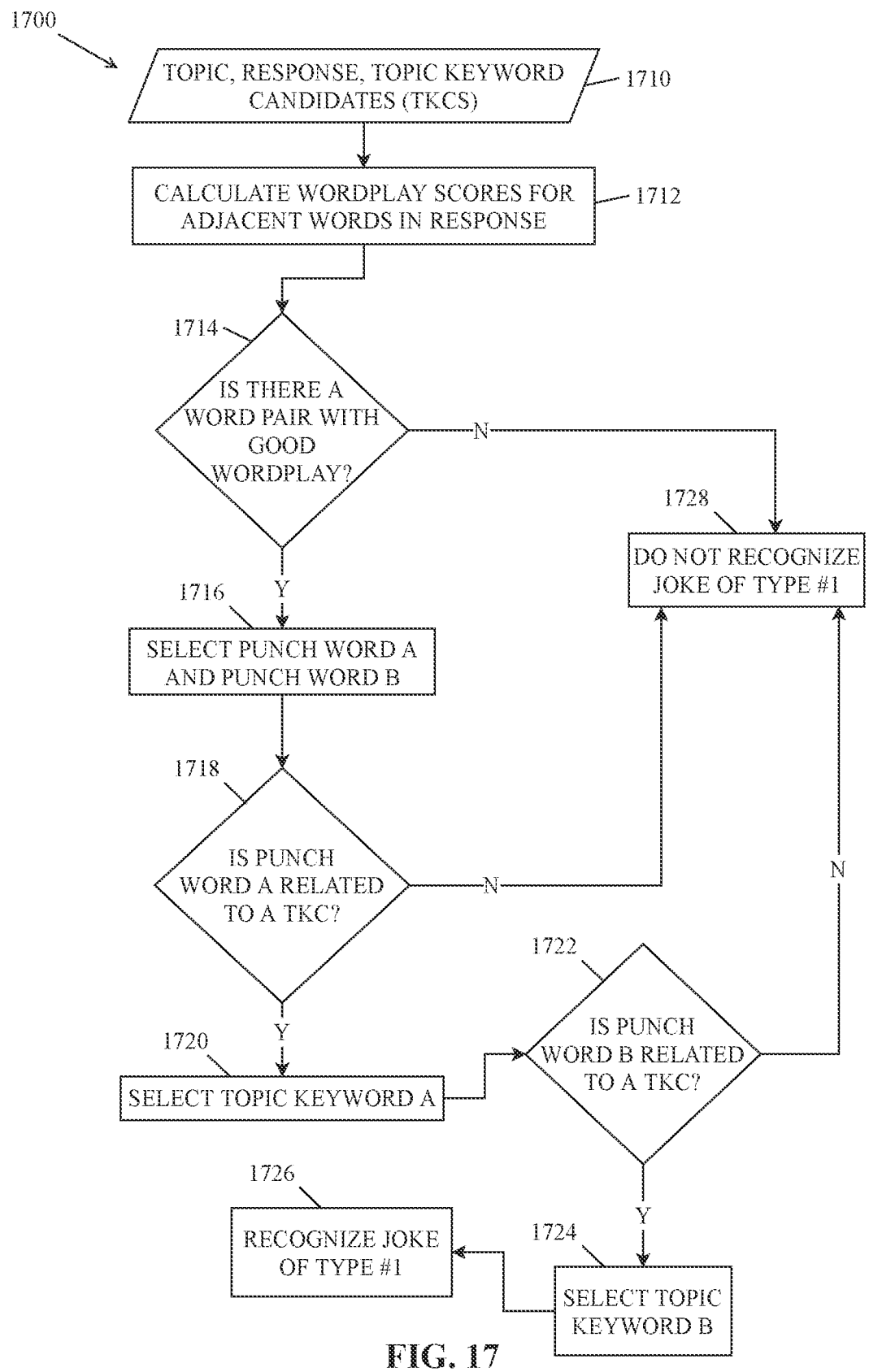
FIG. 17 illustrates a flowchart of an example of a method for recognizing a joke of a first type (Type #1) using the system of FIG. 14.

To illustrate in more detail decision step 1618, FIG. 17 shows a block diagram of a method 1700 to recognize a joke of Type #1. This method may be implemented, by non-limiting example, using software of the database server and/or other server(s) of the system and/or software installed on the end user device. As described in steps 510 through 530 inclusive, a joke of Type #1 incorporates a pair of adjacent words or adjacent word chunks that have wordplay. The surprise that results from making sense of the unexpected wordplay may induce a human to laugh.

Here is a sample joke of Type #1:

Topic: "More and more U.S. universities are offering degrees in *cannabis* science."

Response: "Maybe they should also offer degrees in meth math."

In an exemplary embodiment, block 1710 represents the topic, the response, and the topic keyword candidates that were selected in steps 1612, 1614, and 1616. At step 1712 the method uses natural language processing tools, by non-limiting example the tools included in the NATURAL LANGUAGE TOOLKIT (NLTK), to list every pair of adjacent words in the response; in implementations, a word may be a single word or a word chunk. The method then uses the process shown in FIG. 6 to calculate the wordplay score for each and every pair of adjacent words. At decision step 1714 the method determines whether any pair of adjacent words in the response has a wordplay score which is better than a certain preset threshold, which threshold may be determined by the admin in implementations and may be set to any desired value. If a pair of adjacent words has a wordplay score better than the threshold, then at step 1716 the method selects the pair of words with the best wordplay score better than the threshold to be punch word A and punch word B. If no pair of adjacent words has a wordplay score better than the threshold, then at step 1728 the method does not recognize a joke of Type #1.

Here is how these steps apply to the sample joke of Type #1:

Response: "Maybe they should also offer degrees in meth math."

Punch word A: "meth"; punch word B: "math"

At decision step 1718 the method uses natural language processing tools to pair punch word A with each topic keyword candidate in turn. The method then calculates a relatedness score for every pairing of punch word A and each of the topic keyword candidates and determines whether any pairing of punch word A and a topic keyword candidate has a relatedness score which is better than a certain preset threshold, which threshold may be determined by the admin in implementations and may be set to any desired value. As described in steps 432 through 440 inclusive, an exemplary embodiment may calculate a relatedness score by measuring how close the word vectors for punch word A and a topic keyword candidate are in an appropriate vector space by using, as a non-limiting example, the "similarity" function of GOOGLE's pretrained WORD2VEC model trained on GOOGLE NEWS data. Other embodiments of this system may calculate a relatedness score using other language models trained on other data corpuses, as described herein and in the drawings with respect to step 432. Still other embodiments of this system may calculate a relatedness score using any of the methods described herein and in the drawings with respect to step 512.

If no pairing of punch word A and a topic keyword candidate has a relatedness score which is better than a certain preset threshold, then in step 1728 the method does not recognize a joke of Type #1.

If a pairing of punch word A and a topic keyword candidate does have a relatedness score which is better than a certain preset threshold, then in step 1720 the method selects the topic keyword candidate in the pairing that has the best relatedness score to be topic keyword A.

Here is how these steps apply to the sample joke of Type #1:

Topic: "More and more U.S. universities are offering degrees in *cannabis* science."

Topic keyword candidates: "universities," "degrees," "*cannabis*," "science"

Punch word A: "meth"

Topic keyword A: "*cannabis*"

If a topic keyword A is selected, then in decision step 1722 the method uses natural language processing tools to pair punch word B with each of the remaining topic keyword candidates, the topic keyword candidates other than topic keyword A, in turn. The method then calculates a relatedness score for every pairing of punch word B and each of the remaining topic keyword candidates and determines whether any pairing of punch word B and a remaining topic keyword candidate has a relatedness score which is better than a certain preset threshold, which threshold may be determined by the admin in implementations and may be set to any desired value.

If no pairing of punch word B and a remaining topic keyword candidate has a relatedness score which is better than a certain preset threshold, then in step 1728 the method does not recognize a joke of Type #1.

If a pairing of punch word B and a remaining topic keyword candidate does have a relatedness score which is better than a certain preset threshold, then in step 1724 the method selects the remaining topic keyword candidate in the pairing that has the best relatedness score to be topic keyword B.

Here is how these steps apply to the sample joke of Type #1:

Remaining topic keyword candidates: "universities," "degrees," "science"

Punch word B: "math"

Topic keyword B: "science"

Because a topic keyword A and a topic keyword B have been selected, in step 1726 the method recognizes a joke of Type #1.

Calculating the Funniness Score for a Joke of Type #1

This system for recognizing jokes utilizes methods for calculating a score for the funniness of a joke. The funniness score of a joke may determine what type of laugh or other amused reaction is output by the system, as will be described below. Once a joke of Type #1 is recognized, the system calculates its funniness score in step 1620. The funniness score for a joke of Type #1 comprises several feature scores, each of which is weighted, which weights may be determined by the admin in implementations and may be set to any desired values. The weighted feature scores are combined to yield the funniness score. In an exemplary embodiment, the funniness score for a joke of Type #1 comprises, but is not limited to, these feature scores: length score, parallelism score, interest score, position score, clarity score, and wordplay score.

Length score: The method uses natural language processing tools to measure the length of the response in words. The shorter the response, the better the length score and the better the funniness score.

Parallelism score: The method calculates the degree to which the topic and the response share the same words and the same grammatical structure. To accomplish this, the method in an exemplary embodiment may use natural language processing tools, including a parser, to build syntax trees for the topic and the response and may then calculate the degree to which the syntax trees are similar by computing, by non-limiting example, the tree edit distance. The more the topic and response share the same words and the same grammatical structure, the better the parallelism score and the better the funniness score.

Interest score: The method calculates the degree to which topic keyword A and topic keyword B are related to each other as measured by their relatedness score, which may be calculated as described in decision step 1718. The less related that topic keyword A and topic keyword B are to each other, the more attention-getting they may be when appearing together in the topic, the better the interest score, and the better the funniness score. This process is related to step 440 through step 444 inclusive, in which two topic keywords are selected in part by calculating how dissimilar they are.

Position score: The method uses natural language processing tools to measure how close punch word A and punch word B are to the end of the response. The closer to the end, the better the position score and the better the funniness score. This process is related to that described above in relation to FIG. 2, in which jokes are assembled by placing the punch words at the end.

Clarity score: The method calculates the relatedness score between topic keyword A and punch word A and the relatedness score between topic keyword B and punch word B and uses both of those scores to get the clarity score; in an exemplary embodiment, an average of the two relatedness scores may be taken. The relatedness scores may be calculated as described in decision step 1718. The more closely related the punch words are to the topic keywords, the more understandable the joke, the better the clarity score, and the better the funniness score. This process is related to step 512, in which related words are listed that are most similar to each topic keyword.

Wordplay score: The method calculates the wordplay score between punch word A and punch word B using the process shown in FIG. 6. The better the wordplay, the better the wordplay score and the better the funniness score. This process is related to step 516 and step 520, in which punch words are selected using their wordplay score.

Recognizing a Joke of Type #3

Figure 18:
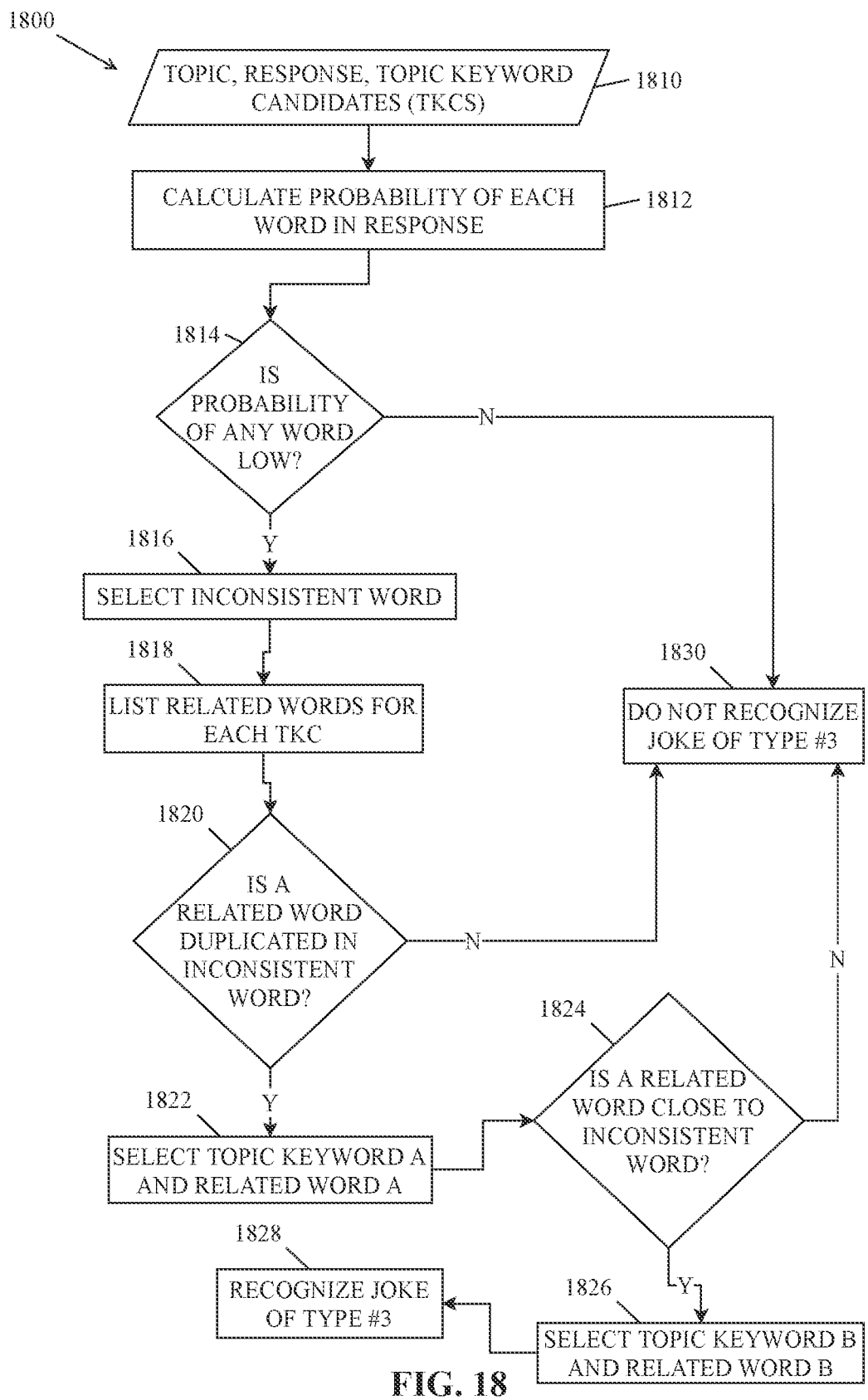
FIG. 18 illustrates a flowchart of an example of a method for recognizing a joke of a third type (Type #3) using the system of FIG. 14.

To illustrate in more detail decision step 1622, FIG. 18 shows a block diagram of a method 1800 to recognize a joke of Type #3. This method may be implemented, by non-limiting example, using software of the database server and/or other server(s) of the system and/or software installed on the end user device. As described above, a joke of Type #3 incorporates a portmanteau word. The surprise that results from making sense of the portmanteau word may induce a human to laugh.

Here is a sample joke of Type #3:

Topic: "A new website for Disney fans who want to date is called Mouse Mingle."

Response: "And maybe a new online dating app could be Tinderella."

In an exemplary embodiment, block 1810 represents the topic, the response, and the topic keyword candidates that were selected in steps 1612, 1614, and 1616. At step 1812 the method uses a language model to determine whether each word and word chunk in the response is in the dictionary of the language model, and also to calculate the probability of occurrence of each word or word chunk in the response, given the words that are already present in the topic and response.

At decision step 1814, the method determines whether the probability of occurrence of any word or word chunk in the response, given the words that are already present in the topic and response, is lower than a certain preset threshold, which threshold may be determined by the admin in implementations and may be set to any desired value. If the method determines that a word or word chunk in the response is not in the dictionary of the language model or has a probability of occurrence that is lower than the preset threshold, then at step 1816 the method selects that word or word chunk to be the inconsistent word. If there are multiple words or word chunks in the response that are not in the dictionary of the language model or that have a probability of occurrence lower than the threshold, then the method may include selecting the word or word chunks with the lowest probability of occurrence as the inconsistent word.

Here is how those steps apply to the sample joke of Type #3:

Response: "And maybe a new online dating app could be Tinderella."

Inconsistent word: "Tinderella"

An exemplary embodiment may calculate the probability of occurrence of each word or word chunk in the response, given the words that are already present in the topic and response, using a process similar to that shown and described with respect to FIG. 12 and FIG. 13. The language model used to calculate the probabilities of occurrence of words may be, by non-limiting examples, an N-gram language model, a recurrent neural network (RNN) language model, a long short-term memory network (LSTM) language model, a transformer-based language model like GOOGLE's BERT or OPENAI's GPT-2 or GPT-3, or any other language model that can predict the probability of occurrence of a word or word chunk given the context in which the word or word chunk appears.

If at decision step 1814 the method has determined that all words and word chunks in the response are in the dictionary of the language model and no words or word chunks in the response have a probability of occurrence that is lower than the preset threshold, then at step 1830 the method does not recognize a joke of Type #3.

Now that an inconsistent word has been selected at step 1816, at step 1818 the method begins the process of attempting to find links between the inconsistent word and the topic keyword candidates.

Here are those elements of the sample joke of Type #3:
Topic: "A new website for Disney fans who want to date is called Mouse Mingle."
Topic keyword candidates: "website," "Disney," "fans," "date," "Mouse Mingle"
Inconsistent word: "Tinderella"

At step 1818 the method carries out the following process for each and every topic keyword candidate. The method generates a list of the top fifty, for example (which number in implementations may be selected by the admin), words that are most closely related to the topic keyword candidate. We'll refer to those as the related words. This process is similar to that described with respect to step 512. To generate a list of the related words, methods including but not limited to those described with respect to decision step 1718 may be employed to calculate relatedness scores and to determine which words are the most closely related to the topic keyword candidate. Next the method looks up the pronunciation, the representation in phonemes, of each related word that is related to each topic keyword candidate. The method also looks up the pronunciation of the inconsistent word. To get the pronunciation of the words, a typical embodiment may use the CMU Pronouncing Dictionary.

At decision step 1820, the method uses any of a variety of natural language processing packages to determine whether the phoneme representation of any of the related words related to a topic keyword candidate is duplicated within the phoneme representation of the inconsistent word without duplicating the entire phoneme representation of the inconsistent word. If the phoneme representation of the inconsistent word or of a related word cannot be obtained, the method may alternatively determine whether the related word as it is spelled is duplicated within the inconsistent word as it is spelled without duplicating the entire inconsistent word as it is spelled.

The method carries out the process in step 1818 and decision step 1820 for each and every topic keyword candidate. If at step 1820 the method identifies a related word of a topic keyword candidate which has a phoneme representation or spelling that is duplicated within the phoneme representation or spelling of the inconsistent word without duplicating the phoneme representation or spelling of the entire inconsistent word, then at step 1822 the method selects the topic keyword candidate to which that related word is related to be topic keyword A, and selects the related word itself to be related word A. If at step 1820 the method does not identify a related word of a topic keyword candidate which has a phoneme representation or spelling that is duplicated within the phoneme representation or spelling of the inconsistent word without duplicating the phoneme representation or spelling of the entire inconsistent word, then at step 1830 the method does not recognize a joke of Type #3.

Here are those elements of the sample joke of Type #3:
Topic keyword candidates: "website," "Disney," "fans," "date," "Mouse Mingle"
Inconsistent word: Tinderella
Topic keyword A: date
Related word A: Tinder Now that a topic keyword A and a related word A have been selected at step 1822, the method begins the process of attempting to find a link between the inconsistent word and a different topic keyword candidate. At step 1824 the method uses the pronunciation of the inconsistent word and the lists of pronunciations of words related to the topic keyword candidates that were generated at step 1818 to determine whether the pronunciation of any word related to a topic keyword candidate other than topic keyword A is close enough to the pronunciation of the inconsistent word. The pronunciation of a related word is close enough to the pronunciation of the inconsistent word if the edit distance between those two pronunciations is less than a certain preset threshold, which threshold may be determined by the admin in implementations and may be set to any desired value. This calculation of edit distance is similar to that described with respect to step 620.

In alternative embodiments, other methods may be used to calculate how close the pronunciation of a related word and the inconsistent word, or of any two words, are to each other and whether the two pronunciations are close enough. By non-limiting example, a related word and the inconsistent word may be divided into phonemes using the CMU Pronouncing Dictionary and a phoneme vector space and pronunciation embeddings may be used to determine whether the pronunciation of the related word is close enough in cosine distance to the pronunciation of the inconsistent word.

If the phoneme representation of the inconsistent word or of a related word cannot be obtained, the method may alternatively determine whether the related word as it is spelled is close enough in terms of edit distance to the inconsistent word as it is spelled.

The method carries out the process in decision step 1824 for each and every topic keyword candidate other than topic keyword A. If at decision step 1824 the method identifies a related word of a topic keyword candidate which has a phoneme representation or spelling that is close enough to the phoneme representation or spelling of the inconsistent word, then at step 1826 the method selects the topic keyword candidate to which that related word is related to be topic keyword B, and selects the related word itself to be related word B. If at decision step 1824 the method does not identify a related word of a topic keyword candidate which has a phoneme representation or spelling that is close enough to the phoneme representation or spelling of the inconsistent word, then at step 1830 the method does not recognize a joke of Type #3.

Here are those elements of the sample joke of Type #3:
Remaining topic keyword candidates: "website," "Disney," "fans," "Mouse Mingle"

Inconsistent word: Tinderella
Topic keyword B: Disney
Related word B: Cinderella
Edit distance between inconsistent word and related word B: 1

Because a topic keyword A and a topic keyword B have been selected, in step 1828 the method recognizes a joke of Type #3.

Calculating the Funniness Score for a Joke of Type #3

Once a joke of Type #3 is recognized, the method calculates its funniness score in step 1624. The funniness score for a joke of Type #3 is calculated by weighting feature scores in a fashion similar to the funniness score for a joke of Type #1 and in implementations may comprise, but is not limited to, these feature scores: length score, parallelism score, interest score, position score, clarity score, and wordplay score. The length score, the parallelism score, and the interest score are calculated as described for a joke of Type #1.

Position score: The method uses natural language processing tools to measure how close the inconsistent word is to the end of the response. The closer to the end, the better the position score and the better the funniness score.

Clarity score: The method calculates the relatedness score between topic keyword A and related word A and the relatedness score between topic keyword B and related word B and uses both of those scores to get the clarity score. In implementations the clarity score may be an average of these two relatedness scores. The more closely related the topic keywords are to the related words, the more understandable the joke, the better the clarity score, and the better the funniness score.

Wordplay score: The method uses the process shown and described with respect to FIG. 6 to calculate the wordplay score between the inconsistent word and related word B. The better the wordplay, the better the wordplay score and the better the funniness score.

Recognizing a Joke of Type #2 or a Joke of Type #4

As described above, a joke of Type #2 and a joke of Type #4 each include a word chunk that incorporates an inconsistent word or inconsistent words and is related to elements of the topic. The surprise that results from making sense of the inconsistency may induce a human to laugh. The systems and methods for recognizing a joke of Type #2 are very similar to those for recognizing a joke of Type #4. Therefore, as a convenience, this description will only describe the systems and methods for recognizing a joke of Type #4.

Figure 19:
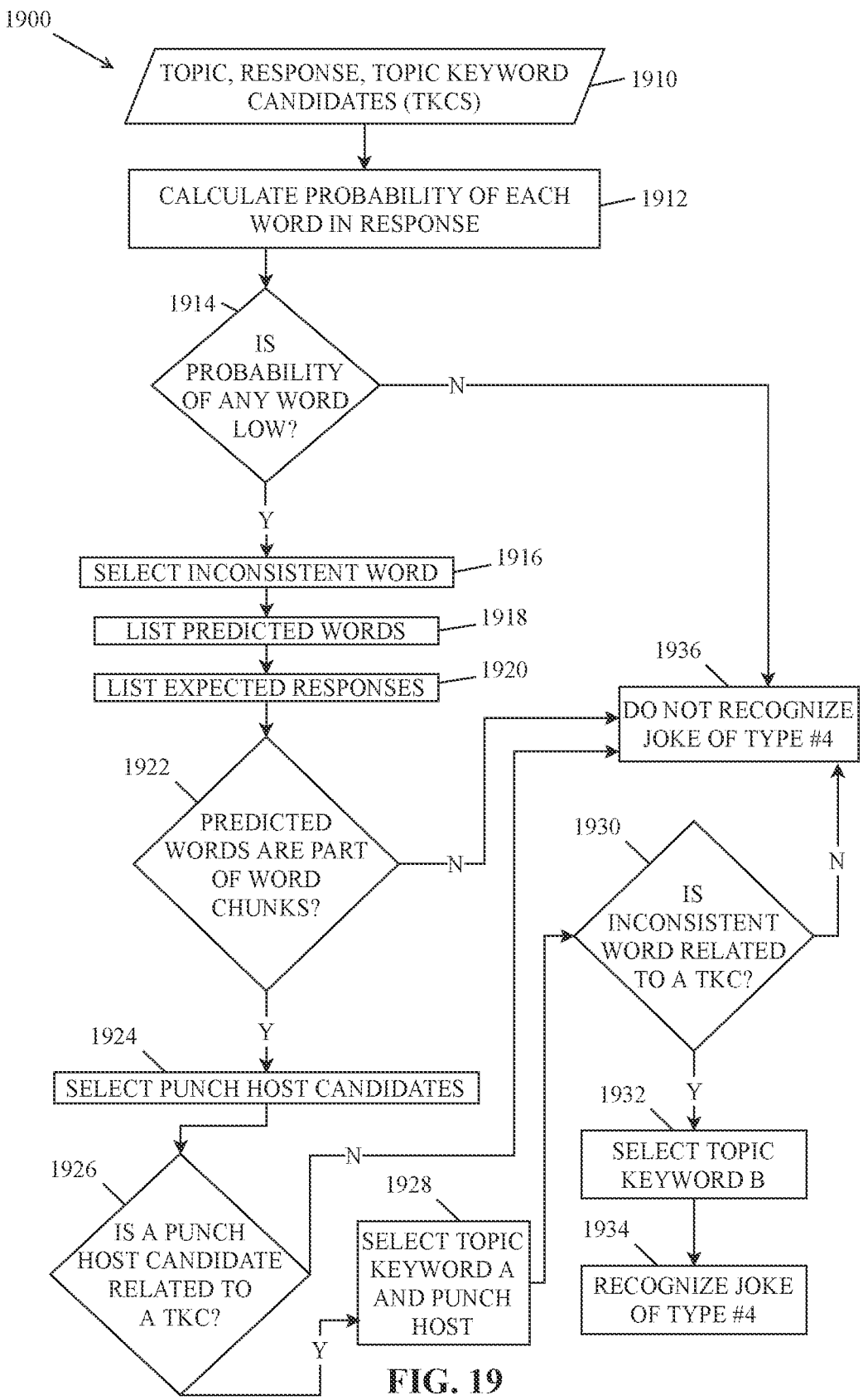
FIG. 19 illustrates a flowchart of an example of a method for recognizing a joke of a fourth type (Type #4) using the system of FIG. 14.

To illustrate in more detail decision step 1626, FIG. 19 shows a block diagram of a method 1900 to recognize a joke of Type #4. This method may be implemented, by non-limiting example, using software of the database server and/or other server(s) of the system and/or software installed on the end user device.

Here is a sample joke of Type #4:

Topic: "Yesterday seven more cases of measles were linked to Disneyland."

Response: "So that means a new log-flume ride is Rash Mountain."

In an exemplary embodiment, block 1910 represents the topic, the response, and the topic keyword candidates that were selected in steps 1612, 1614, and 1616. At step 1912 the method uses a language model to determine whether each word and word chunk in the response is in the dictionary of the language model, and also to calculate the probability of occurrence of each word or word chunk in the response, given the words that are already present in the topic and response.

At decision step 1914, the method determines whether the probability of occurrence of a word or word chunk in the response, given the words that are already present in the topic and response, is lower than a certain preset threshold, which threshold may be determined by the admin in implementations and may be set to any desired value. If the method determines that a word or word chunk in the response is in the dictionary of the language model and has a probability of occurrence that is lower than the preset threshold, then at step 1916 the method selects that word or word chunk to be the inconsistent word. If there are multiple words or word chunks having a probability of occurrence lower than the threshold, the method may include selecting the word or word chunk with the lowest probability of occurrence as the inconsistent word. If at decision step 1914 the method has determined that all of the words and word chunks in the response are in the dictionary of the language model and none of the words and word chunks in the response has a probability of occurrence that is lower than the preset threshold, then at step 1936 the method does not recognize a joke of Type #4. Exemplary embodiments may calculate the probability of occurrence of each word or word chunk in the response, given the words that are already present in the topic and response, using a language model such as those described for steps 1812 and 1814.

Here is how those steps apply to the sample joke of Type #4:

Response: "So that means a new log-flume ride is Rash Mountain."

Inconsistent word: "Rash"

Now that an inconsistent word has been selected at step 1916, at step 1918 the method generates a list of the top fifty, for example (which number in implementations may be selected by the admin), words that are the likeliest to occupy the position in the response that is currently occupied by the inconsistent word, given the words in the topic and response that are already present. We'll refer to those words as the predicted words. To generate the predicted words, any language model may be used that can predict likely words or word chunks given the context in which the words or word chunks are to appear, by non-limiting example, a language model such as those described for steps 1812 and 1814.

At step 1920 the method substitutes each predicted word, in turn, for the inconsistent word in the response, forming a list of what we'll refer to as expected responses.

Here is how steps 1918 and 1920 apply to the sample joke of Type #4:

Response: "So that means a new log-flume ride is Rash Mountain."

Inconsistent word: "Rash"

Predicted words: "Splash," "Space," "Thunder," etc.

Expected responses: "So that means a new log-flume ride is Splash Mountain," "So that means a new log-flume ride is Space Mountain," "So that means a new log-flume ride is Thunder Mountain," etc.

In decision step 1922, the method uses any of a variety of natural language processing packages or a language model such as, by non-limiting example, one of the models described for steps 1812 and 1814 to determine whether each predicted word is part of a word chunk, including a word chunk that is a named entity, in the context of its corresponding expected response and the topic. If one or more predicted words is part of such a word chunk, then in step 1924 each word chunk that contains a predicted word is selected to be a punch host candidate. If none of the predicted words is part of such a word chunk, then then at step 1936 the method does not recognize a joke of Type #4.

In decision step 1926 the method uses natural language processing tools to pair each punch host candidate with each topic keyword candidate in turn. The method then calculates a relatedness score for every pairing of punch host candidate and topic keyword candidate and determines whether any such pairing has a relatedness score which is better than a certain preset threshold, which threshold may be determined by the admin in implementations and may be set to any desired value. The relatedness scores may be calculated using any of various methods including, but not limited to, those described for decision step 1718. If no pairing between a punch host candidate and a topic keyword candidate has a relatedness score which is better than the preset threshold, then at step 1936 the method does not recognize a joke of Type #4. It is pointed out here that this threshold, and any other, may be set in a way so that if the pairing (or other operation) meets or exceeds (or meets or is lower than, as the case may be) the threshold, the requirement is met.

If a pairing between a punch host candidate and a topic keyword candidate does have a relatedness score which is better than the preset threshold, then in step 1928 the punch host candidate in that pairing is selected to be the punch host and the topic keyword candidate in that pairing is selected to be topic keyword A.

Here are those elements of the sample joke of Type #4:

Punch host candidates: "Splash Mountain," "Space Mountain," "Thunder Mountain," etc.

Topic keyword candidates: "cases," "measles," "Disneyland"

Punch host: "Splash Mountain"

Topic keyword A: "Disneyland"

If more than one pairing between a punch host candidate and a topic keyword candidate has a relatedness score which is better than the preset threshold, the method selects that pairing in which the wordplay between the inconsistent word and the predicted word in the punch host candidate is the best as determined by their wordplay score, which is calculated as described with respect to FIG. 6. As before, the punch host candidate in that pairing with the best wordplay is selected to be the punch host and the topic keyword candidate in that pairing with the best wordplay is selected to be topic keyword A.

In decision step 1930 the method uses natural language processing tools to pair the inconsistent word with each of the remaining topic keyword candidates, the topic keyword candidates other than topic keyword A, in turn. The method then calculates a relatedness score for every pairing of the inconsistent word and each of the remaining topic keyword candidates and determines whether any pairing of the inconsistent word and a remaining topic keyword candidate has a relatedness score which is better than a certain preset threshold, which threshold may be determined by the admin in implementations and may be set to any desired value.

If no pairing of the inconsistent word and one of the remaining topic keyword candidates has a relatedness score which is better than a certain preset threshold, then in step 1936 the method does not recognize a joke of Type #4. If a pairing of the inconsistent word and one of the remaining topic keyword candidates does have a relatedness score which is better than a certain preset threshold, then in step 1932 the method selects the remaining topic keyword candidate in the pairing that has the best relatedness score to be topic keyword B.

Here are those elements of the sample joke of Type #4:

Remaining topic keyword candidates: "cases," "measles"

Inconsistent word: "Rash"

Topic keyword B: "measles"

Because a topic keyword A and a topic keyword B have been selected, in step 1934 the method recognizes a joke of Type #4.

Calculating the Funniness Score for a Joke of Type #4

Once a joke of Type #4 is recognized, the method calculates its funniness score in step 1628. The funniness score for a joke of Type #4 is calculated by weighting feature scores in a fashion similar to the funniness score for a joke of Type #1 and may comprise, but is not limited to, these feature scores: length score, parallelism score, interest score, position score, clarity score, and wordplay score. The length score, the parallelism score, and the interest score are calculated as described for a joke of Type #1.

Position score: The method uses natural language processing tools to measure how close the inconsistent word is to the end of the response. The closer to the end, the better the position score and the better the funniness score.

Clarity score: The method calculates the relatedness score between topic keyword A and the punch host and the relatedness score between topic keyword B and the inconsistent word and uses those scores to get the clarity score. In implementations the clarity score may be the average of the two relatedness scores. The more closely related that topic keyword A is to the punch host and that topic keyword B is to the inconsistent word, the more understandable the joke, the better the clarity score, and the better the funniness score.

Wordplay score: The method uses the process shown and described with respect to FIG. 6 to calculate the wordplay score between the inconsistent word and the predicted word that it replaced in the punch host. The better the wordplay, the better the wordplay score and the better the funniness score.

Recognizing a Joke of Type #5

Figure 20:
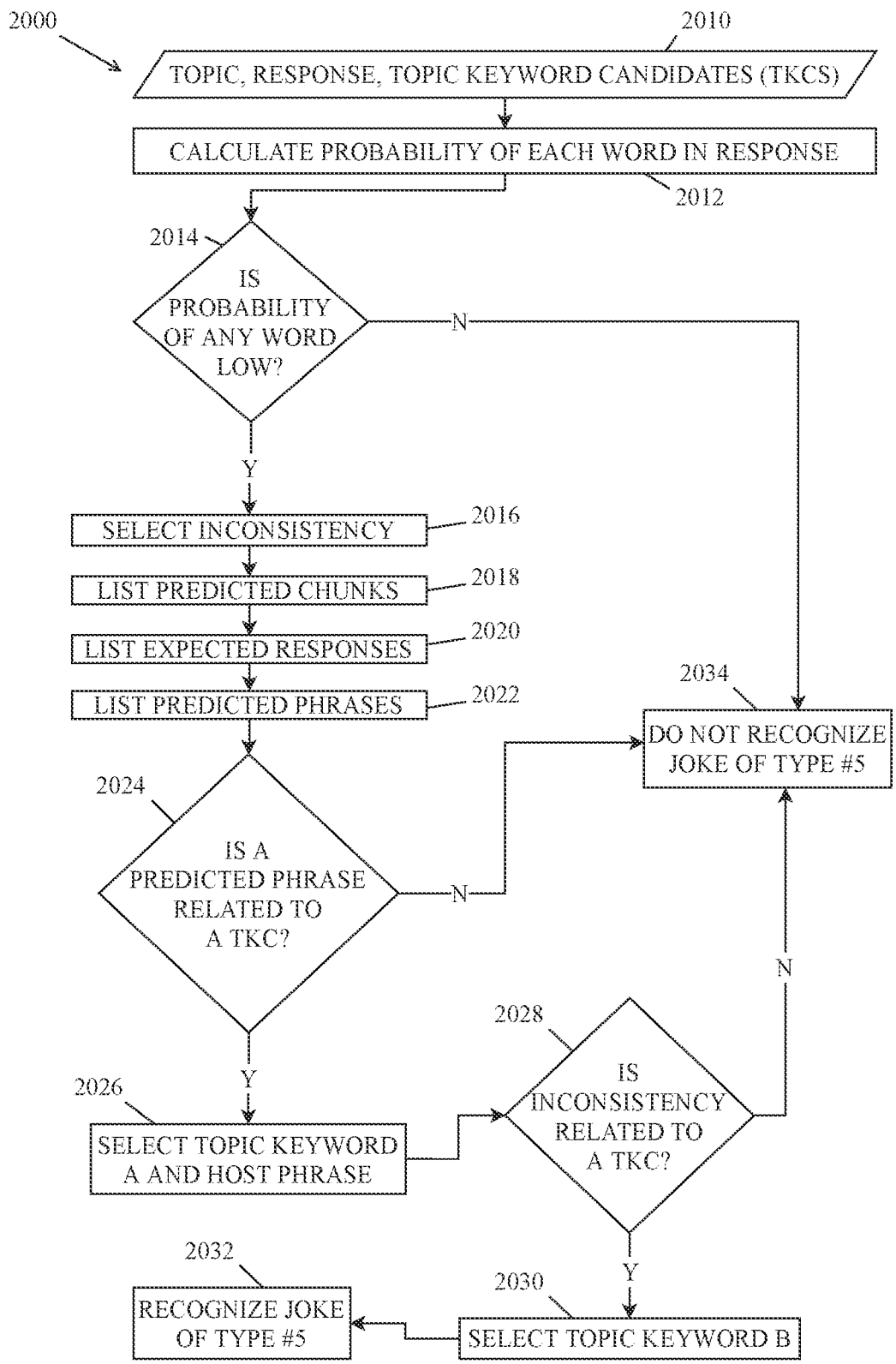
FIG. 20 illustrates a flowchart of an example of a method for recognizing a joke of a fifth type (Type #5) using the system of FIG. 14.

To illustrate in more detail decision step 1630, FIG. 20 shows a block diagram of a method 2000 to recognize a joke of Type #5. This method may be implemented, by non-limiting example, using software of the database server and/or other server(s) of the system and/or software installed on the end user device. A joke of Type #5 incorporates a span of text that is inconsistent with common knowledge. The surprise that results from making sense of the inconsistency may induce a human to laugh. Jokes of this type are described above in connection with generating jokes that depend on reasoning informed by common knowledge.

"Common knowledge" as used in this description is intended to include anything that most people in the intended audience for a joke know without having to look it up, including but not limited to common sense, common sense reasoning, common sense knowledge, background knowledge, conventional knowledge, world knowledge, common beliefs, widely known information, widely held beliefs, generally accepted attitudes, generally accepted opinions, generally accepted theories, generally accepted judgments, generally accepted predictions, generally accepted explanations, generally accepted characterizations, generally accepted properties, conventional wisdom, and the like.

Here is a sample joke of Type #5:

Topic: "The release of the new James Bond movie has been postponed because of the coronavirus."

Response: "Yeah, they're adding a scene where Q gives Bond a special wristwatch that shoots hand sanitizer."

In an exemplary embodiment, block 2010 represents the topic, the response, and the topic keyword candidates that were selected in steps 1612, 1614, and 1616. At step 2012 the method calculates the probability that each word or word chunk in the response, given the words that are already present in the topic and response, is consistent with common knowledge.

At decision step 2014, if the method determines that the probability that a word or word chunk in the response is consistent with common knowledge is lower than a certain preset threshold, which threshold may be determined by the admin in implementations and may be set to any desired value, then at step 2016 the method selects that word or word chunk to be the inconsistency. If at decision step 2014 the method determines that the probability that all words and word chunks in the response are consistent with common knowledge is higher than a certain preset threshold, which threshold may be determined by the admin in implementations and may be set to any desired value, then at step 2034 the method does not recognize a joke of Type #5.

Determining the probability that a word or word chunk is consistent with common knowledge may be accomplished using a common knowledge model. The common knowledge model may be, as non-limiting examples, a neural language model such as OPENAI's GPT-3 or a machine learning model trained on language data, visual data, or other data from the real world.

In alternative implementations, determining the probability that a word or word chunk is consistent with common knowledge may be accomplished using a common knowledge model built on a common sense knowledge base like, by non-limiting examples, CYC (created by Douglas Lenat), CONCEPTNET (from the MIT Media Lab), or the ALLEN INSTITUTE for AI's ATOMIC. In other implementations, the common knowledge model may be built on a common sense reasoning system like, by non-limiting example, COMeT, from the ALLEN INSTITUTE for AI, or on another common sense reasoning system or language model. These systems and models were also mentioned above in connection with generating jokes that depend on reasoning informed by common knowledge.

In the case of the response in the sample joke of Type #5 above, the method at step 2016 selects the word chunk "hand sanitizer" to be the inconsistency because of three facts of common knowledge: 1) In the James Bond movies, the character Q gives Bond harmless-looking items that are actually dangerous; 2) A special wristwatch is a harmless-looking item; but 3) A special wristwatch that shoots hand sanitizer is not dangerous.

Now that an inconsistency has been selected at step 2016, at step 2018 the method generates a list of the top fifty, for example (which number in implementations may be selected by the admin), words or word chunks that are the likeliest to occupy the position in the response that is currently occupied by the inconsistency, given the words in the topic and response that are already present. We'll refer to those highest-likelihood words or word chunks as the predicted chunks. To generate the predicted chunks, the method may use: a language model, by non-limiting examples those models described for steps 1812 and 1814; a common knowledge model, by non-limiting examples those models described for step 2012 and decision step 2014; or models of both types.

At step 2020 the method substitutes each predicted chunk, in turn, for the inconsistency in the response, forming a list of what we'll refer to as expected responses.

At step 2022 the method uses a language model, a common knowledge model, or both types of models to determine whether each predicted chunk is all or part of a phrase in the context of the expected response of which it is a part. Any phrase of which a predicted chunk is a part is listed as a predicted phrase.

Here is how steps 2018, 2020, and 2022 apply to the sample joke of Type #5:

Response: "Yeah, they're adding a scene where Q gives Bond a special wristwatch that shoots hand sanitizer."

Inconsistency: "hand sanitizer"

Predicted chunks: "bullets," "tear gas," "poison darts," etc.

Expected responses: "Yeah, they're adding a scene where Q gives Bond a special wristwatch that shoots bullets," "Yeah, they're adding a scene where Q gives Bond a special wristwatch that shoots tear gas," "Yeah, they're adding a scene where Q gives Bond a special wristwatch that shoots poison darts," etc.

Predicted phrases: "a special wristwatch that shoots bullets," "a special wristwatch that shoots tear gas," "a special wristwatch that shoots poison darts," etc.

At decision step 2024 the method uses natural language processing tools to pair each predicted phrase with each topic keyword candidate in turn. The method then calculates a relatedness score for every pairing of predicted phrase and topic keyword candidate and determines whether any such pairing has a relatedness score which is better than a certain preset threshold, which threshold may be determined by the admin in implementations and may be set to any desired value.

The relatedness scores may be calculated using any of various methods including, but not limited to, those described for decision step 1718, step 2012, and/or decision step 2014. By non-limiting example, the relatedness scores may be calculated using OPENAI's GPT-3 to determine the degree to which each predicted phrase is textually entailed by each topic keyword candidate. In an alternate implementation, the relatedness scores may be calculated using a document embedding model such as, by non-limiting example, GOOGLE's DOC2VEC to compute the cosine similarity between the vector representations of each predicted phrase and each topic keyword candidate.

If at decision step 2024 no pairing between a predicted phrase and a topic keyword candidate has a relatedness score which is better than the preset threshold, then at step 2034 the method does not recognize a joke of Type #5.

If at decision step 2024 at least one pairing between a predicted phrase and a topic keyword candidate does have a relatedness score which is better than the preset threshold, then in step 2026 the predicted phrase in the pairing with the best relatedness score is selected to be the host phrase and the topic keyword candidate in the pairing with the best relatedness score is selected to be topic keyword A.

Here is how steps 2024 and 2026 apply to the sample joke of Type #5:

Topic keyword candidates: "release," "James Bond," "movie," "coronavirus"

Predicted phrases: "a special wristwatch that shoots bullets," "a special wristwatch that shoots tear gas," "a special wristwatch that shoots poison darts," etc.

Host phrase: "a special wristwatch that shoots bullets"

Topic keyword A: "James Bond"

At decision step 2028 the method uses natural language processing tools to pair the inconsistency with each of the remaining topic keyword candidates, the topic keyword candidates other than topic keyword A, in turn. The method then calculates a relatedness score for every pairing of the inconsistency and each of the remaining topic keyword candidates and determines whether any such pairing has a relatedness score which is better than a certain preset threshold, which threshold may be determined by the admin in implementations and may be set to any desired value.

If no pairing of the inconsistency and one of the remaining topic keyword candidates has a relatedness score which is better than a certain preset threshold, then in step 2034 the method does not recognize a joke of Type #5. If a pairing of the inconsistency and at least one of the remaining topic keyword candidates does have a relatedness score which is better than a certain preset threshold, then in step 2030 the remaining topic keyword candidate in the pairing with the best relatedness score is selected to be topic keyword B. The relatedness scores are calculated as described for decision step 2024.

Remaining topic keyword candidates: "release," "movie," "coronavirus"

Inconsistency: "hand sanitizer"

Topic keyword B: "coronavirus"

Because a topic keyword A and a topic keyword B have been selected, in step 2032 the method recognizes a joke of Type #5.

Calculating the Funniness Score for a Joke of Type #5

Once a joke of Type #5 is recognized, the method calculates its funniness score in step 1632. The funniness score for a joke of Type #5 is calculated by weighting feature scores in a fashion similar to the funniness score for a joke of Type #1 and may comprise, but is not limited to, these feature scores: length score, parallelism score, interest score, position score, clarity score, and wordplay score. The length score, the parallelism score, and the interest score are calculated as described for a joke of Type #1.

Position score: The method uses natural language processing tools to measure how close the inconsistency is to the end of the response. The closer to the end, the better the position score and the better the funniness score.

Clarity score: The method calculates the relatedness score between topic keyword A and the host phrase and the relatedness score between topic keyword B and the inconsistency and uses those scores to get the clarity score. In implementations the clarity score may be the average of the two relatedness scores. The more closely related that topic keyword A is to the host phrase and that topic keyword B is to the inconsistency, the more understandable the joke, the better the clarity score, and the better the funniness score.

Wordplay score: The method uses the process shown and described with respect to FIG. 6 to calculate the wordplay score between the inconsistency and the predicted chunk that it replaced in the host phrase. The better the wordplay, the better the wordplay score and the better the funniness score.

Other Methods of Recognizing Jokes

Alternate implementations of these systems may recognize jokes using other methods. In an exemplary implementation, a system may use a language model, by non-limiting example OPENAI's GPT-3, that has been trained, fine-tuned, prompted, and/or primed with a dataset of topic/response pairs in which each response is a gold standard joke response to its corresponding topic. Such a dataset may be, by non-limiting example, a corpus of jokes written in the style of late-night television comedy monologue jokes. This trained, fine-tuned, prompted, and/or primed language model may be used to determine the degree to which a given response is entailed by the topic with which it is paired, or the likelihood that a next sentence prediction task would predict a given response to the topic with which it is paired, and thus may be used to recognize whether the topic/response pair is a joke.

Outputting an Amused Reaction

At step 1636 the system outputs a laugh or some other amused reaction indicating that it recognized a joke. The size and type of the laugh or other amused reaction depends on the funniness score calculated in step 1620, step 1624, step 1628, or step 1632.

In an exemplary implementation, here are ranges of funniness scores and the corresponding laughs and amused reactions that the system may output:

Given a funniness score in the low range, the system may output the audible and/or visible equivalent of a small laugh, and/or the audible and/or visible equivalent of an amused verbal reaction such as, by non-limiting examples, "Good one," "Nice," "I see what you did there," and so forth.

Given a funniness score in the middle range, the system may output the audible and/or visible equivalent of a medium-sized laugh, and/or the audible and/or visible equivalent of a very amused verbal reaction such as, by non-limiting examples, "That's great," "That's really funny," "I love it," and so forth.

Given a funniness score in the high range, the system may output the audible and/or visible equivalent of a big laugh, and/or the audible and/or visible equivalent of an extremely amused verbal reaction such as, by non-limiting examples, "Hilarious!", "That's hysterical!", "That's awesome!", and so forth.

As part of its amused reaction to a joke, the system may also repeat the punch words, the inconsistent word, the inconsistency, or another unexpected element of the joke response to indicate that its amused reaction is not random but instead arises from a humanlike understanding of what makes that particular joke funny. By non-limiting example, referring to the sample joke of Type #1 above and its joke response "Maybe they should also offer degrees in meth math," the system may output the audible or visible equivalent of an amused reaction like "Ha-ha-ha! 'Meth math.' That's really funny."

Any user interfaces used for methods of joke recognition may be similar to other user interfaces disclosed herein. For example, a user interface such as that shown in FIG. 15 could be used, wherein a first text from the user comprises a first communication and a second text from the user comprises a second communication, and the system determines that the user's second communication comprises a joke or punchline relative to the first communication. As another example, the system could send a text or notification (first communication) to the user through a user interface such as that of FIG. 15 and the user could respond with a second communication, the second communication comprising a joke or punchline that is recognized by the system. As another example, the user or the system could provide an audio communication (first communication) and a communication from the user (second communication) could be recognized by the system as comprising a joke or punchline. Any of these communications could be done through a smart assistant or the like.

Thresholds of the specific ranges (low range, middle range, and high range, for example) for funniness scores may be set to any value and may be determined, for example, by an admin. As a non-limiting example, funniness scores may range from zero to one, with a score between 0.0 and 0.3 being in the low range, a score between 0.3 and 0.6 being in the middle range, and a score between 0.6 and 1.0 being in the high range. This is just one example among many that could be given.

In implementations where the term "beyond" is used relative to a threshold, it could mean below or above the threshold.

The systems and methods disclosed herein may include a system reviewing a lot of text (like the transcript of a speech) or listening to a lot of audio (like the audio track of a TV show) and finding jokes in it by evaluating each sentence as a possible joke response to the previous sentence. In implementations, for example, the system could watch a comedy TV show and laugh in the right places.

In implementations the system itself may supply a first communication (as an example, a news item), then a joke response to that first communication, then a laugh response (if the joke response is funny enough). In that way the system might generate a two-person comedy routine all by itself. The user would just listen to it and enjoy it.

A user is also able to utter a joke to the system and get a laugh (or other indication of joke recognition) in response. But the user could also watch a TV sitcom alongside the system (e.g., with the user's mobile phone nearby) and hear the system laugh at the jokes being uttered by the characters on TV; in that case, the human is using the system for companionship but isn't actively inputting utterances to it himself.

The system can also recognize and laugh at jokes that it generated itself. For example, the system could be chit-chatting with a user (audio or text), generate a communication that was not intended as a joke, but which is recognized by the system to be/include a joke/punchline, and laugh (or provide another indication of joke recognition) at its own communication.

In implementations a communication "provided to" a virtual assistant or chatbot or the like may simply be audio that the virtual assistant/chatbot receives or overhears, not necessarily a communication that is directed to it. For example, a microphone of a user interface could pick up audio of a conversation or TV or radio show or the like, and the audio could be processed in part or received in part by the virtual assistant or chatbot or the like during the joke recognition methods. In such instances, even if the audio is not directed toward the virtual assistant or chatbot or the like, for the purposes of this disclosure it is nevertheless provided to the virtual assistant or chatbot or the like.

In places where the phrase "one of A and B" is used herein, including in the claims, wherein A and B are elements, the phrase shall have the meaning "A and/or B." This shall be extrapolated to as many elements as are recited in this manner; for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of systems and methods for generating and recognizing jokes, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited in the claim, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

There are examples above of jokes which include two separate communications. For example, the system could provide a communication to the user and the user, in response, could provide a joke or punchline, and the system could acknowledge the joke or punchline. The system could receive a communication from the user and, in response, provide a joke or punchline to the user (and may additionally provide an indication to the user that it recognizes its own communication as a joke or punchline). The system could provide a communication to the user, then follow it up with another communication which includes a joke or punchline (and may follow this up with a third communication which indicates that the system recognizes its own communication as a joke or punchline). In these examples there are at least two communications, a first communication from either the user or system, and a second communication from the user or system, and the second communication includes a joke or punchline relative to the first communication. In such examples the first and second communications are distinct and are not part of a common communication or signal.

In implementations, however, the system could be used to provide or recognize jokes and punchlines that are provided using only a single communication. For example, the user or system could provide a single communication to the other, which includes a joke or punchline, and the system may or may not then provide an indication that it recognizes that the single communication included a punchline. One example of this is a one-line joke (or one-liner). The system could provide a communication to the user as follows: "I think if drug dealers go to college they should major in meth math." Such a communication includes at least one topic ("drug dealers" and/or "college") and includes a punchline/joke ("meth math") relative to the topic. After providing this, the system could provide the following indication to the user: "Ha-ha! 'Meth math.' That's funny." In this example the system could calculate a funniness score in part based on the wordplay between two words in a single communication: "meth" and "math."

As another example, the user could provide a communication to the system as follows: "If I ever start a dating website for DISNEY fans I'm going to call it Tinderella." Such a communication includes at least one topic ("dating website" and/or "DISNEY") and includes a punchline/joke ("Tinderella") relative to the topic. After receiving this communication, the system could provide the following indication to the user: "Ha-ha! 'Tinderella.' Good one." In this example the system could calculate a funniness score in part based on a system-detected wordplay between "Tinderella" (a first word in the single communication) and "Cinderella" (another word not in the single communication but related to a second word, "DISNEY," in the single communication). For one-liners (or single-sentence jokes) such as this, the system may calculate a higher or better funniness score if the sentence is shorter, if "Tinderella" is closer to the end of the sentence (or at the end of the sentence), and so forth.

The above examples are one-liners, but there are other examples where the system could produce or recognize a joke or punchline that is not in a single line/sentence, but is still in a single communication. For example, the system could send a single text that says: "Do you know what drug dealers should major in if they go to college? Meth math."

In this case there are two sentences, but they are both sent in a single communication (a text to the user). The system could calculate a funniness score and respond with an indication to the user that it recognizes a joke. As another example, the user could send a single text to the system that says: "I'm starting a dating website for DISNEY fans. I'll call it Tinderella." In this example there are again two sentences, but they are in a single communication. The system could calculate the funniness score and provide an indication that it recognizes a joke. The single communication could include more than two sentences, as well—for example the user could provide a monologue-style joke, with many sentences, but the punchline at the end, and the system may recognize and respond to the joke—in such a case, even though the single communication includes many sentences, it may still be sent as a single communication.

In the above examples the single communication which includes the topic and joke may also be said to, itself, comprise a first and a second communication. For example, the topic of the joke could be considered a first communication, and the punchline could be considered a second communication, but both could be comprised in a single communication. "If I ever start a dating website for DISNEY fans" could be a first communication, for example, and "I'm calling it Tinderella" could be a second communication, but both may be provided in a single communication from the system to the user or from the user to the system. Accordingly, the first communication and second communication (as those phrases are used herein, including in the claims), could be in some implementations comprised in a common, single communication, or they could be comprised in separate, distinct communications, as the case may be.

In implementations wherein the first communication and second communication are both comprised in a single communication, the "first communication" may be classified as a portion of the single communication which includes a topic or subject and the "second communication" may be classified as a portion of the single communication which includes a joke or punchline.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not imply that the claim requires a first (or so on) of that element—if the claim does not explicitly recite a "first" (or so on) of that element, the claim does not require a "first" (or so on) of that element.

What is claimed is:

1. A system for recognizing jokes, comprising:
one or more data stores; and
one or more servers communicatively coupled with the one or more data stores; wherein the one or more servers are configured to:
communicatively couple with a first computing device through a telecommunications network;
receive a first communication through a user interface of the first computing device;
determine, in response to receiving the first communication, whether the first communication comprises one of a joke and a punchline; and
initiate sending of one or more responses to the first computing device through the telecommunications network;
wherein the one or more responses are configured to initiate providing, through the user interface, an indication to the user that the first communication is recognized as one of a joke and a punchline; and
wherein determining that the first communication comprises one of a joke and a punchline comprises one of: determining that a wordplay score beyond a preset threshold exists between adjacent words or word chunks of the first communication, wherein the wordplay score is based on one or more of an edit distance score, a stop consonant score, an alliteration score, a score measuring a degree to which the adjacent words or word chunks comprise an identical number of syllables, a score measuring a degree to which the adjacent words or word chunks end with a common phoneme or letter, a score measuring a degree to which the adjacent words or word chunks share common vowel sounds, and a degree to which the adjacent words or word chunks rhyme; determining that the first communication comprises a portmanteau; determining that the first communication includes one or more words or word chunks that have a probability of occurrence below a predetermined threshold and that also have a calculated relatedness score, relative to one or more words or word chunks of an initial communication preceding the first communication, beyond a predetermined threshold; and calculating a probability of one or more words, word chunks or concepts in the first communication being consistent with usage patterns of less than half of an intended audience.

2. The system of claim 1, wherein the first communication received through the user interface comprises audio.

3. The system of claim 1, wherein the one or more servers are further configured to initiate sending one or more initial signals to the first computing device, the one or more initial signals configured to initiate providing, through the user interface, the initial communication to the user, wherein the first communication comprises a user response to the initial communication.

4. The system of claim 1, wherein the indication comprises one of an audio representation and a visual representation of laughter.

5. The system of claim 1, wherein the determination of whether the first communication comprises one of a joke and a punchline is based in part on calculating a probability of one of one or more words and one or more word chunks being in the first communication.

6. The system of claim 1, wherein the determination of whether the first communication comprises one of a joke and a punchline is based in part on one or more topic keyword candidates associated with one of the first communication and the initial communication.

7. The system of claim 6, wherein the determination of whether the first communication comprises one of a joke and a punchline is based in part on a generated list of one of one or more words and one or more word chunks related to at least one of the one or more topic keyword candidates.

8. A method for recognizing jokes, comprising:
providing one or more data stores;
providing one or more servers communicatively coupled with the one or more data stores; and
using the one or more servers:
communicatively coupling with a first computing device through a telecommunications network;
receiving a first communication provided through a user interface of the first computing device;

determining, in response to receiving the first communication, whether the first communication comprises one of a joke and a punchline;
calculating a funniness score using the one or more servers; and
initiating sending of one or more responses to the first computing device through the telecommunications network;
wherein the one or more responses are configured to initiate providing, through the user interface, an indication to the user that the first communication is recognized as one of a joke and a punchline; and
wherein the funniness score is based at least in part on one or more of: a length of one of the first communication and an initial communication preceding the first communication; how close one or more words are to an end of the first communication; a calculation of how closely related one or more words or word chunks of the first communication are semantically to one or more words or word chunks of the initial communication; a calculated wordplay score between one or more words or word chunks of the first communication or the initial communication and one or more other words or word chunks of one of the first communication and the initial communication, wherein the calculated wordplay score is based on one or more of an edit distance score, a stop consonant score, an alliteration score, a score measuring a degree to which the adjacent words or word chunks comprise an identical number of syllables, a score measuring a degree to which the adjacent words or word chunks end with a common phoneme or letter, a score measuring a degree to which the adjacent words or word chunks share common vowel sounds, and a degree to which the adjacent words or word chunks rhyme; a calculation of wordplay between one or more words or word chunks of the first communication or the initial communication and one or more words or word chunks not in the first communication and not in the initial communication but having a relatedness score, relative to one or more other words or word chunks of the first communication or initial communication, beyond a predetermined threshold; a calculation related to a degree to which the first communication and the initial communication share words and grammatical structure; and a calculation of how closely related one or more words or word chunks of the initial communication are semantically to one or more other words or word chunks of the initial communication.

9. The method of claim 8, wherein receiving the first communication comprises receiving a communication to one of a chatbot and a virtual assistant.

10. The method of claim 8, wherein receiving the first communication comprises receiving audio provided through the user interface.

11. The method of claim 8, further comprising, using the one or more servers, initiating sending of one or more initial signals to the first computing device, the one or more initial signals configured to initiate providing, through the user interface, the initial communication to the user, wherein the first communication comprises a user response to the initial communication.

12. The method of claim 8, wherein the indication comprises one of an audio representation and a visual representation of laughter.

13. A method for recognizing jokes, comprising:
using one or more servers, the one or more servers communicatively coupled with one or more data stores:
communicatively coupling with a first computing device through a telecommunications network;
one of providing a first communication to a user through a user interface of the first computing device and receiving the first communication through the user interface of the first computing device;
one of providing a second communication to the user through the user interface and receiving the second communication through the user interface;
determining, in response to providing or receiving the second communication, whether the second communication, in relation to the first communication, comprises one of a joke and a punchline; and
initiating sending of one or more responses to the first computing device through the telecommunications network;
wherein the one or more responses are configured to initiate providing, through the user interface, an indication to the user that the second communication is recognized as one of a joke and a punchline; and
wherein determining that the second communication comprises one of a joke and a punchline comprises one of: determining that a wordplay score beyond a preset threshold exists between adjacent words or word chunks of the second communication, wherein the wordplay score is based on one or more of an edit distance score, a stop consonant score, an alliteration score, a score measuring a degree to which the adjacent words or word chunks comprise an identical number of syllables, a score measuring a degree to which the adjacent words or word chunks end with a common phoneme or letter, a score measuring a degree to which the adjacent words or word chunks share common vowel sounds, and a degree to which the adjacent words or word chunks rhyme; determining that the second communication comprises a portmanteau; determining that the second communication includes one or more words or word chunks that have a probability of occurrence below a predetermined threshold and that also have a calculated relatedness score, relative to one or more words or word chunks of the first communication, beyond a predetermined threshold; and calculating a probability of one or more words, word chunks or concepts in the second communication being consistent with usage patterns of less than half of an intended audience.

14. The method of claim 13, wherein the first communication and the second communication each comprise a portion of a single communication.

15. The method of claim 13, further comprising calculating a funniness score using the one or more servers, wherein the funniness score is based at least in part on one or more of: a length of one of the first communication and second communication; how close one or more words are to an end of the second communication; a calculation of how closely related one or more words or word chunks of the second communication are semantically to one or more words or word chunks of the first communication; a calculated wordplay score between one or more words or word chunks of the first communication or the second communication and one or more other words or word chunks of one of the first communication and the second communication, wherein the calculated wordplay score is based on one or more of an edit distance score, a stop consonant score, an alliteration score, a score measuring a degree to which the adjacent words or word chunks comprise an identical number of syllables, a score measuring a degree to which the adjacent words or word chunks end with a common phoneme or letter, a score measuring a degree to which the adjacent words or word chunks share common vowel sounds, and a degree to which the adjacent words or word chunks rhyme; a calculation of wordplay between one or more words or word chunks of the first communication or the second communication and one or more words or word chunks not in the first communication and not in the second communication but having a relatedness score, relative to one or more other words or word chunks of the first communication or second communication, beyond a predetermined threshold; a calculation related to a degree to which the first communication and the second communication share words and grammatical structure; and a calculation of how closely related one or more words or word chunks of the first communication are semantically to one or more other words or word chunks of the first communication.

16. The method of claim 15, further comprising determining, based at least in part on the funniness score, which of a plurality of predetermined responses to initiate sending to the first computing device.

17. The method of claim 13, wherein determining that the second communication comprises one of a joke and a punchline is based at least in part on generating one or more expected communications and comparing one of the first communication and the second communication with the one or more expected communications.

18. The method of claim 13, wherein the indication repeats one or more words of the second communication.

19. The method of claim 8, wherein the determination of whether the first communication comprises one of a joke and a punchline is based in part on determining that a probability of one of a word and a word chunk being in the first communication is below a predetermined threshold.

20. The method of claim 13, wherein the adjacent words or word chunks also have a calculated relatedness score, relative to one or more words or word chunks of the first communication, beyond a predetermined threshold.

* * * * *